(12) United States Patent
Singaravelu et al.

(10) Patent No.: US 11,463,267 B2
(45) Date of Patent: Oct. 4, 2022

(54) NETWORK FUNCTION VIRTUALIZATION SYSTEM AND VERIFYING METHOD

(71) Applicant: NEC CORPORATION, Tokyo (JP)

(72) Inventors: Pradheepkumar Singaravelu, Chennai (IN); Sivabalan Arumugam, Chennai (IN); Anand Prasad, Tokyo (JP); Hironori Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 504 days.

(21) Appl. No.: 16/331,581

(22) PCT Filed: Apr. 18, 2017

(86) PCT No.: PCT/JP2017/015560
§ 371 (c)(1),
(2) Date: Mar. 8, 2019

(87) PCT Pub. No.: WO2018/047399
PCT Pub. Date: Mar. 15, 2018

(65) Prior Publication Data
US 2019/0253264 A1    Aug. 15, 2019

(30) Foreign Application Priority Data

Sep. 8, 2016    (IN) .............................. 201611030702

(51) Int. Cl.
*H04L 9/32*    (2006.01)
*H04L 9/08*    (2006.01)
*G06F 9/455*    (2018.01)

(52) U.S. Cl.
CPC .......... *H04L 9/3268* (2013.01); *H04L 9/0827* (2013.01); *H04L 9/0877* (2013.01);
(Continued)

(58) Field of Classification Search
CPC ... H04L 9/3268; H04L 9/0827; H04L 9/0877; H04L 9/321; H04L 9/3263; G06F 9/455
(Continued)

(56) References Cited

U.S. PATENT DOCUMENTS 5,761,306 A * 6/1998 Lewis ................ G06Q 20/3829
380/282
6,292,897 B1 * 9/2001 Gennaro .................. H04L 9/321
713/156
(Continued)

FOREIGN PATENT DOCUMENTS

CA    2798531 C  * 6/2014  .......... H04L 9/3073
CA    2875518 C  * 4/2018  .......... G06F 21/445
(Continued)

OTHER PUBLICATIONS

"Network Functions Virtualisation (NFV)", Network Functions Virtualisation—Update White Paper, European Telecommunications Standards Institute (ETSI), Issue 1, pp. 1-16, Oct. 15-17, 2013 [online], [Searched on Aug. 25, 2016], Internet, <URL: https://portal.etsi.org/NFV/NFV_White_Paper2.pdf>.
(Continued)

*Primary Examiner* — Shahriar Zarrineh
(74) *Attorney, Agent, or Firm* — Sughrue Mion, PLLC

(57) ABSTRACT

A network function virtualization system, comprises a request receiving unit that receives a request to a certificate of at least one of data exchanging parties; a private key generator that generates a first private key information using a second private key information stored in a hardware-based isolated secure execution environment, in response to the request; a public key extractor that extracts a public key information of the first private key information; a public key information storage unit that stores the public key information; and a verifying unit that is accessible from the request (Continued)

receiving unit and verifies the certificate using the public key information corresponding to the certificate.

8 Claims, 38 Drawing Sheets

(52) U.S. Cl.
CPC ............ *H04L 9/321* (2013.01); *H04L 9/3263* (2013.01); *G06F 9/455* (2013.01)

(58) Field of Classification Search
USPC ......................................................... 713/175
See application file for complete search history.

(56) References Cited

U.S. PATENT DOCUMENTS

| | | | | |
|---|---|---|---|---|
| 6,868,160 | B1* | 3/2005 | Raji | H04L 9/3247 380/282 |
| 7,028,187 | B1* | 4/2006 | Rosen | G06Q 20/02 380/44 |
| 7,103,911 | B2* | 9/2006 | Spies | H04L 47/10 380/277 |
| 7,650,494 | B2* | 1/2010 | Chen | G06F 7/725 380/30 |
| 7,747,851 | B1* | 6/2010 | Robinson | H04L 9/3265 713/156 |
| 8,259,947 | B2* | 9/2012 | Rose | H04L 9/3247 380/277 |
| 8,701,169 | B2* | 4/2014 | Campagna | H04L 9/0844 726/6 |
| 8,793,496 | B2* | 7/2014 | Burmester | H04L 63/08 713/172 |
| 8,925,055 | B2 | 12/2014 | Nair et al. | |
| 8,989,390 | B2* | 3/2015 | Gantman | G06F 21/602 380/286 |
| 9,043,604 | B2 | 5/2015 | Brickell et al. | |
| 9,246,886 | B2 | 1/2016 | Hueber et al. | |
| 9,281,949 | B2 | 3/2016 | Nair et al. | |
| 9,906,372 | B2* | 2/2018 | Jensen | H04W 12/48 |
| 10,630,473 | B2* | 4/2020 | Falk | H04L 9/0869 |
| 10,708,072 | B2* | 7/2020 | Le Saint | H04L 9/3268 |
| 10,970,684 | B1* | 4/2021 | Kurani | G06Q 20/227 |
| 2002/0007454 | A1* | 1/2002 | Tarpenning | G06F 21/10 713/156 |
| 2003/0056099 | A1* | 3/2003 | Asanoma | H04L 9/3234 713/172 |
| 2004/0006701 | A1* | 1/2004 | Kresina | H04L 9/3263 713/189 |
| 2004/0123098 | A1* | 6/2004 | Chen | G06F 7/725 713/155 |
| 2005/0044356 | A1* | 2/2005 | Srivastava | H04L 63/0281 713/163 |
| 2005/0086467 | A1* | 4/2005 | Asokan | H04L 9/3263 713/155 |
| 2006/0047966 | A1* | 3/2006 | Iwamura | H04L 9/14 713/176 |
| 2006/0153368 | A1* | 7/2006 | Beeson | H04L 9/3252 380/30 |
| 2007/0043948 | A1* | 2/2007 | Bugbee | H04L 9/3247 713/176 |
| 2008/0229104 | A1* | 9/2008 | Ju | H04L 9/3273 713/169 |
| 2009/0198997 | A1* | 8/2009 | Yeap | H04L 63/0823 713/155 |
| 2009/0259854 | A1 | 10/2009 | Cox et al. | |
| 2010/0040234 | A1* | 2/2010 | Alrabady | H04L 9/321 380/278 |
| 2011/0099367 | A1 | 4/2011 | Thom et al. | |
| 2011/0173452 | A1* | 7/2011 | Nan | H04L 9/3247 380/279 |
| 2011/0264917 | A1* | 10/2011 | Barthelemy | H04L 9/321 713/176 |
| 2012/0017086 | A1* | 1/2012 | Chu | H04L 63/0823 713/171 |
| 2012/0039474 | A1* | 2/2012 | Ho | H04L 9/0844 380/278 |
| 2012/0137137 | A1 | 5/2012 | Brickell et al. | |
| 2013/0091362 | A1* | 4/2013 | Poeluev | H04L 9/085 713/179 |
| 2013/0152180 | A1 | 6/2013 | Nair et al. | |
| 2013/0322621 | A1* | 12/2013 | Yoon | H04L 9/3066 380/44 |
| 2013/0339739 | A1 | 12/2013 | Hueber et al. | |
| 2014/0089659 | A1 | 3/2014 | Brickell et al. | |
| 2014/0219448 | A1* | 8/2014 | Froels | H04W 12/069 380/255 |
| 2014/0258711 | A1* | 9/2014 | Brannon | H04L 9/0825 713/156 |
| 2014/0281554 | A1* | 9/2014 | Maletsky | H04L 9/0869 713/175 |
| 2014/0380056 | A1* | 12/2014 | Buckley | H04L 9/3073 713/171 |
| 2015/0017953 | A1 | 1/2015 | Swink et al. | |
| 2015/0095648 | A1* | 4/2015 | Nix | H04L 63/061 713/170 |
| 2015/0106618 | A1 | 4/2015 | Nair et al. | |
| 2015/0143125 | A1* | 5/2015 | Nix | H04W 52/0216 713/171 |
| 2015/0242607 | A1* | 8/2015 | Morris | H04L 63/0407 713/186 |
| 2015/0256345 | A1* | 9/2015 | Vaid | H04L 9/3268 713/158 |
| 2016/0028549 | A1* | 1/2016 | Yuji | G06F 21/31 713/176 |
| 2016/0127333 | A1 | 5/2016 | Sood et al. | |
| 2016/0219029 | A1* | 7/2016 | Oshida | H04W 12/35 |
| 2016/0226913 | A1 | 8/2016 | Sood et al. | |
| 2016/0380768 | A1* | 12/2016 | Koike | H04L 9/30 380/277 |
| 2017/0012968 | A1* | 1/2017 | Feng | G06F 8/63 |
| 2017/0054565 | A1* | 2/2017 | Feng | H04L 9/3263 |
| 2017/0064554 | A1* | 3/2017 | Li | H04L 9/088 |
| 2017/0111176 | A1* | 4/2017 | Angus | H04L 63/0823 |
| 2017/0132574 | A1* | 5/2017 | Wu | H04W 4/80 |
| 2017/0251066 | A1 | 8/2017 | Lawrenson et al. | |
| 2019/0207913 | A1* | 7/2019 | Hwang | H04L 9/0819 |
| 2019/0253264 | A1* | 8/2019 | Singaravelu | H04L 9/0827 |

FOREIGN PATENT DOCUMENTS

| | | | | |
|---|---|---|---|---|
| CN | 101807991 | A | * 8/2010 | |
| CN | 1736055 | B | * 10/2010 | ............ H04L 9/0891 |
| CN | 103701833 | A | * 4/2014 | |
| CN | 103973449 | A | * 8/2014 | |
| CN | 105474601 | A | * 4/2016 | ......... H04L 63/0428 |
| CN | 105577637 | A | 5/2016 | |
| CN | 110650010 | A | * 1/2020 | ............ H04L 9/0822 |
| EP | 1582024 | B1 | * 9/2009 | ............ H04L 9/0891 |
| JP | 2009-252244 | A | 10/2009 | |
| JP | 2011155348 | A | * 8/2011 | |
| JP | 2013-509805 | A | 3/2013 | |
| JP | 2015018057 | A | * 1/2015 | |
| JP | 6700797 | B2 | * 5/2020 | |
| WO | WO-2007048967 | A2 | * 5/2007 | ............ H04L 9/0891 |
| WO | WO-2008146546 | A1 | * 12/2008 | ............ H04L 9/0869 |
| WO | 2015/143651 | A1 | 10/2015 | |
| WO | 2015/168913 | A1 | 11/2015 | |
| WO | 2016/037330 | A1 | 3/2016 | |
| WO | 2016/048206 | A1 | 3/2016 | |
| WO | 2016/126347 | A1 | 8/2016 | |

OTHER PUBLICATIONS

"Network Functions Virtualisation (NFV); Architectural Framework", ETSI GS NFV 002 V1.1.1, European Telecommunications Standards Institute (ETSI), Oct. 2013, pp. 1-21, [Searched on Aug. 25, 2016], Internet <URL: http://www.etsi.org/deliver/etsi_gs/nfv/001_099/002/01.01.01_60/gs_nfv002v010101p.pdf>.

(56) References Cited

OTHER PUBLICATIONS

Written Opinion for PCT/JP2017/015560, dated Jul. 4, 2017.
International Search Report for PCT/JP2017/015560, dated Jul. 4, 2017.
Communication dated Apr. 30, 2020, from the European Patent Office in Application No. 17724941.4.
Chinese Office Action for CN Application No. 201780055371.1 dated Jan. 13, 2021 with English Translation.
Chinese Office Action for CN Application No. 201780055371.1 dated Jul. 23, 2021 with English Translation.
"Technical Implementation of Digital Signature", edited by Zhu Xiaoli, New Electronic Commerce Course, China Science and Technology University Press, published on Jul. 31, 2012.
"Trusted Execution Environment Technoiogy" , edited by Science and Technology Department of People's Bank of China, Mar. 31, 2016.
Japanese Office Communication for JP Application No. 2019-513084 dated Sep. 21, 2021 with English Translation.

* cited by examiner

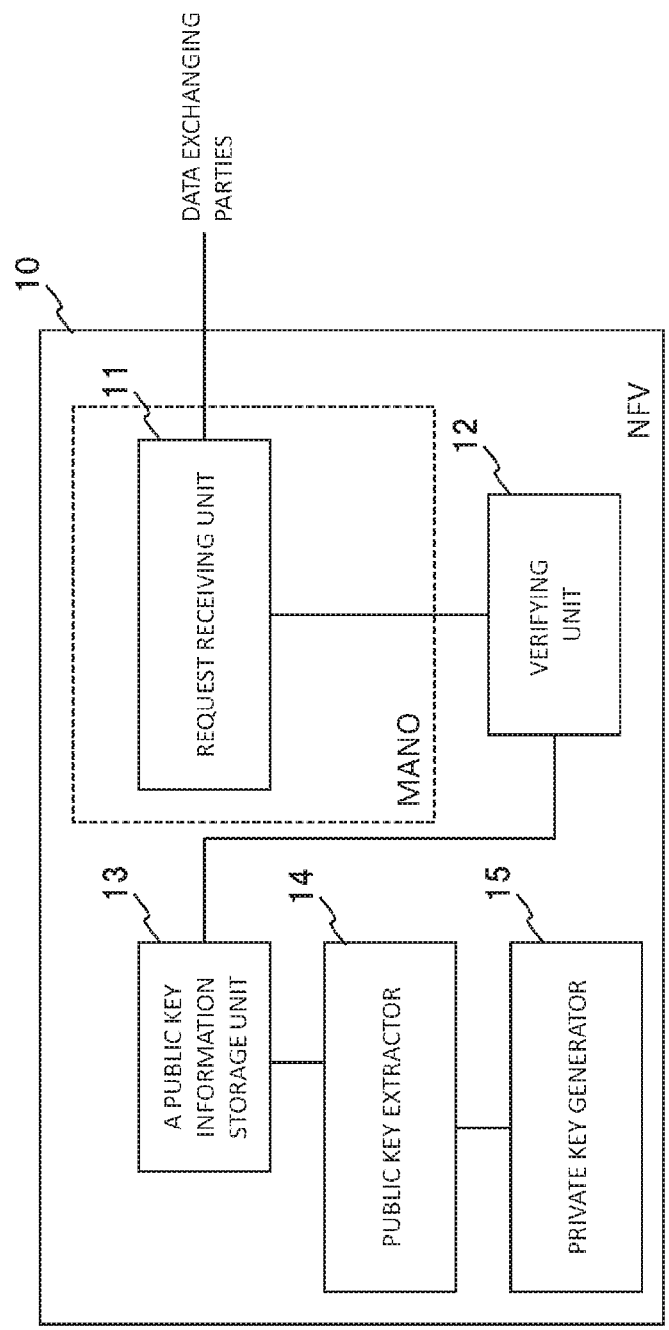
[Fig. 1]

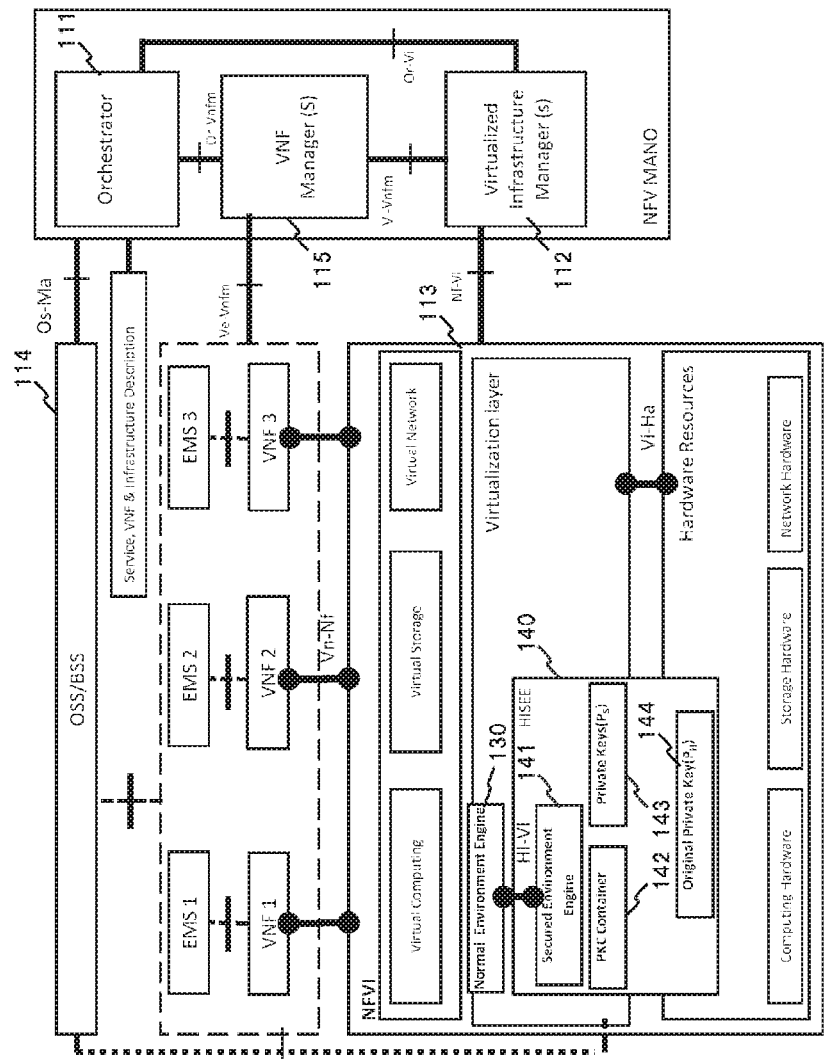
[Fig. 2]

[Fig. 3]
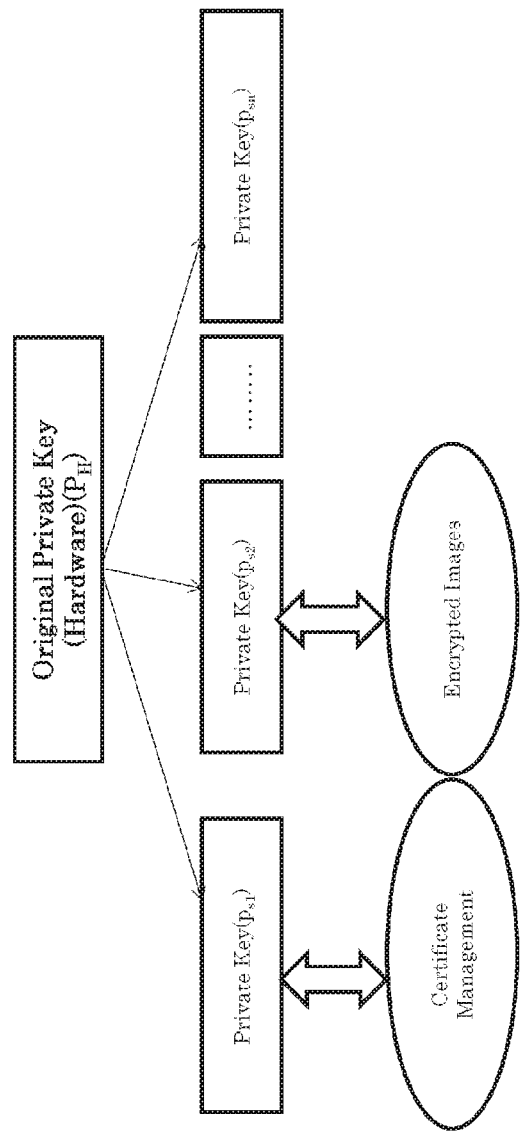

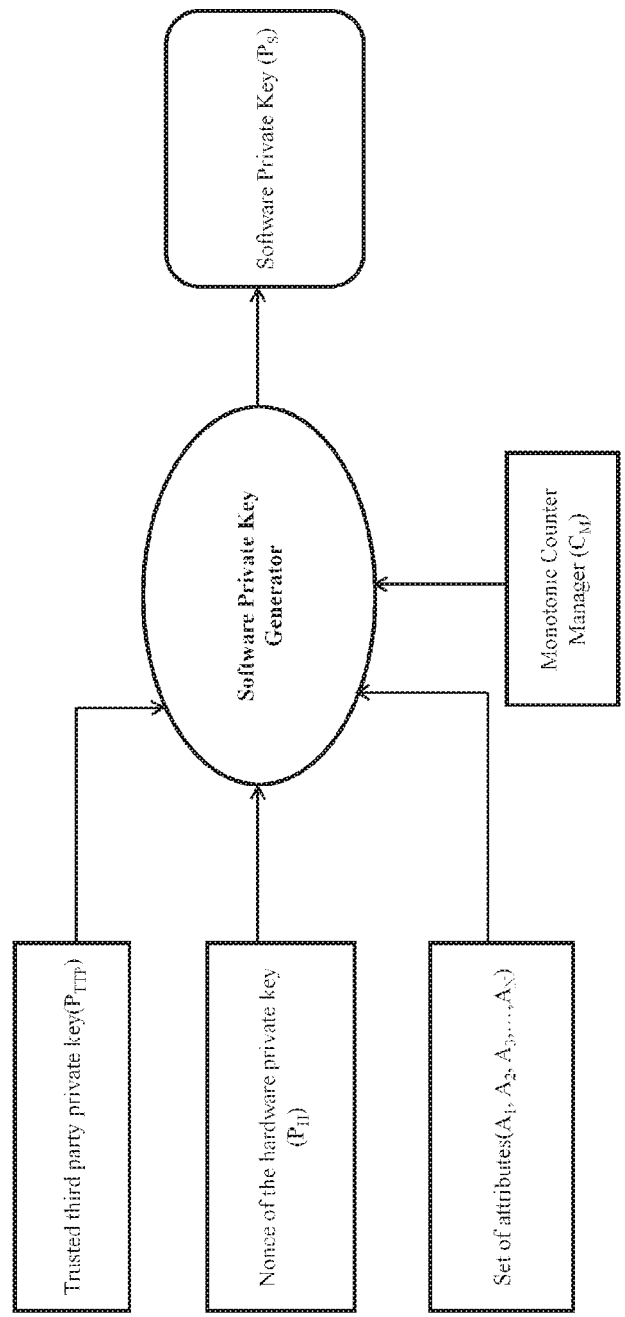
[Fig. 4]

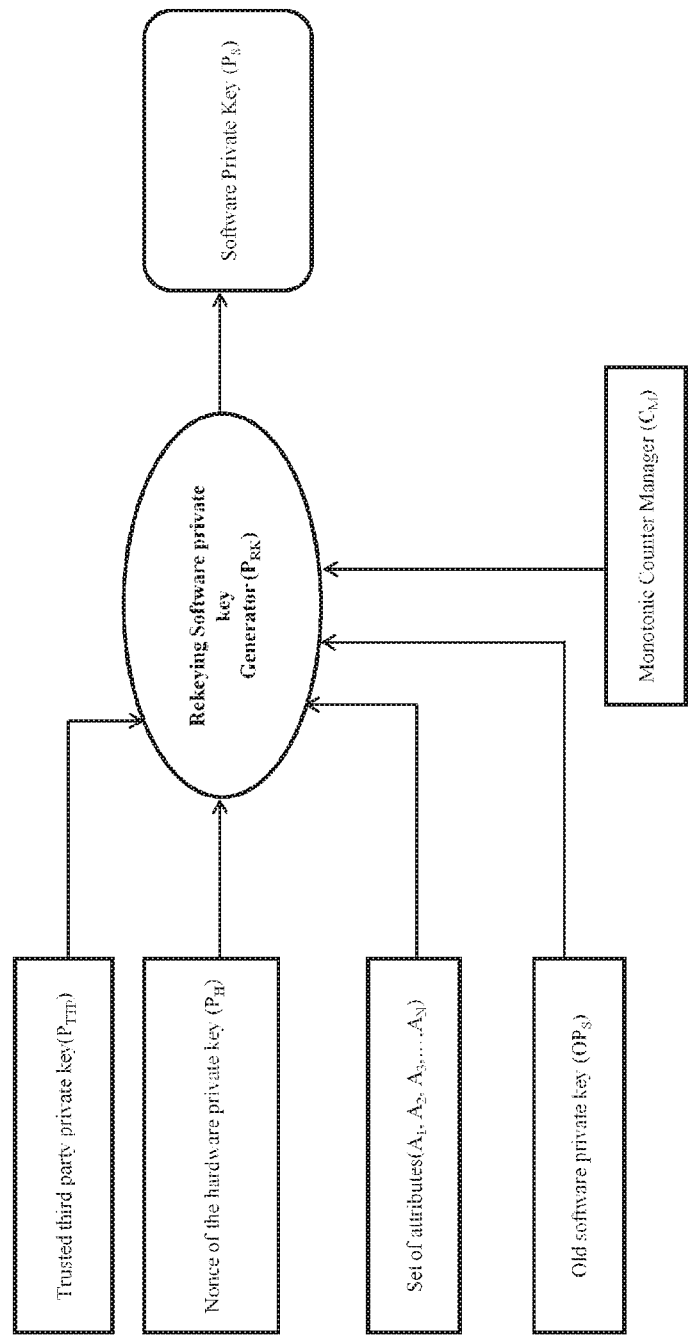
[Fig. 5]

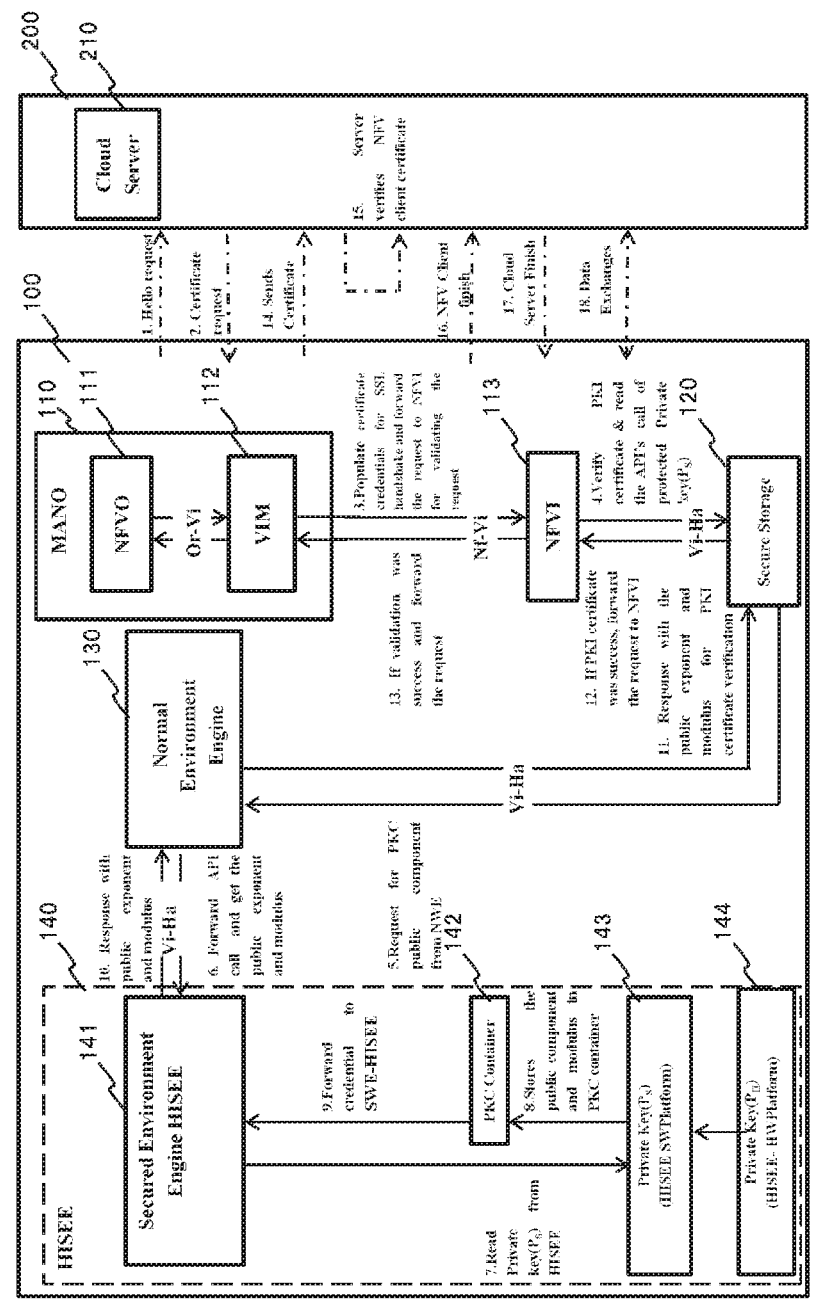
[Fig. 6]

[Fig. 7]
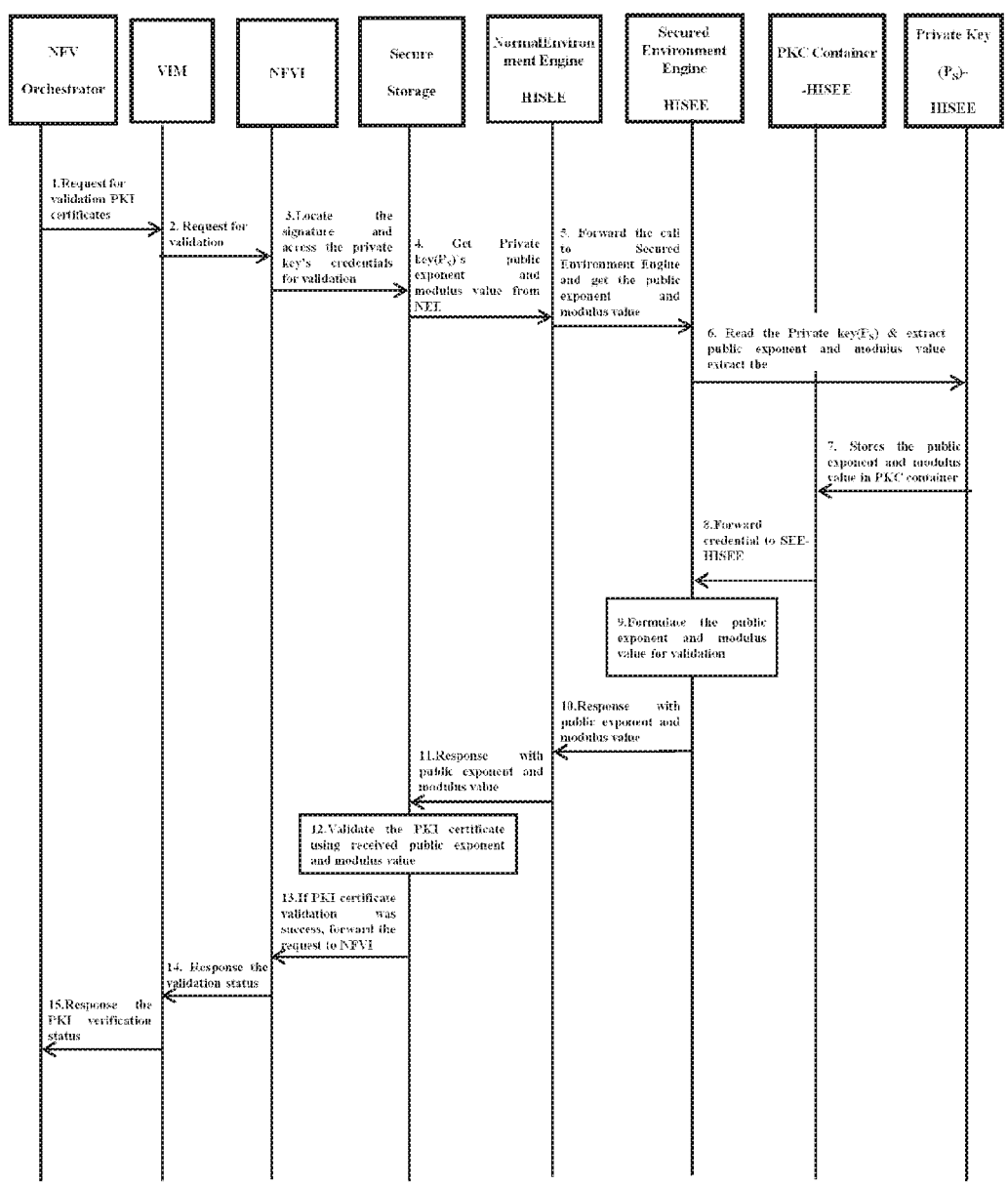

[Fig. 8]
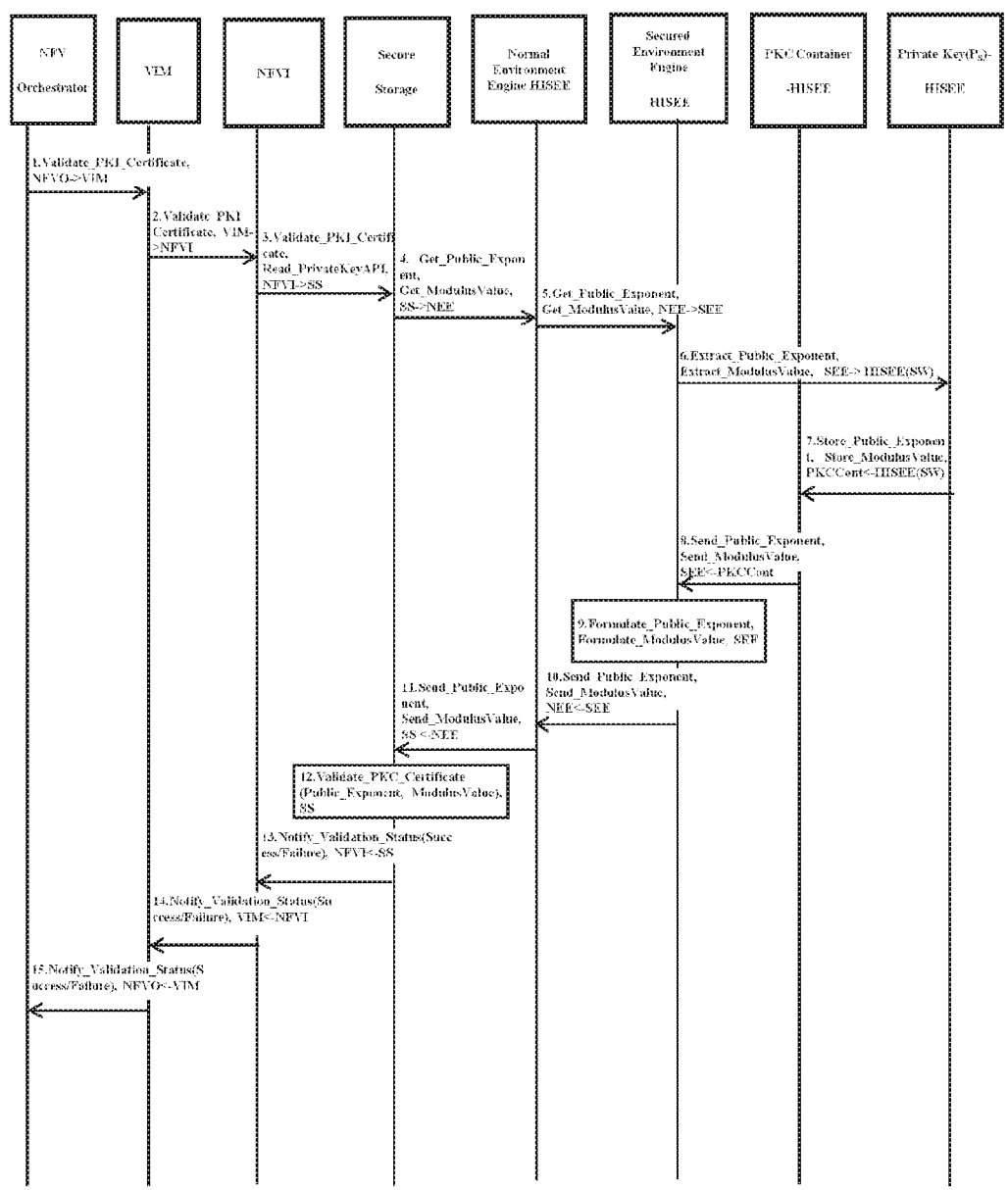

[Fig. 9]

| Sl.No | Message | Requirement | Direction |
|---|---|---|---|
| 1 | Validate_PKI_Certificate | Mandatory | NFVO->VIM |
| 2 | Validate_PKI_Certificate | Mandatory | VIM->NFVI |
| 3 | Validate_PKI_Certificate, Read_PrivateKeyAPI | Mandatory | NFVI->SS |
| 4 | Get_Public_Exponent, Get_ModulusValue | Mandatory | SS->NEE |
| 5 | Get_Public_Exponent, Get_ModulusValue | Mandatory | NEE->SEE |
| 6 | Extract_Public_Exponent, Extract_ModulusValue | Mandatory | SEE->HISEE(SW) |
| 7 | Store_Public_Exponent, Store_ModulusValue | Mandatory | PKCCont<-HISEE(SW) |
| 8 | Send_Public_Exponent, Send_ModulusValue | Mandatory | SEE<-PKCCont |
| 9 | Formulate_Public_Exponent, Formulate_ModulusValue | Mandatory | SEE |
| 10 | Send_Public_Exponent, Send_ModulusValue | Mandatory | NEE<-SEE |
| 11 | Send_Public_Exponent, Send_ModulusValue | Mandatory | SS<-NEE |
| 12 | Validate_PKI_Certificate(Public_Exponent, ModulusValue) | Mandatory | SS |
| 13 | Notify_Validation_Status(Success/Failure) | Mandatory | NFVI<-SS |
| 14 | Notify_Validation_Status(Success/Failure) | Mandatory | VIM<-NFVI |
| 15 | Notify_Validation_Status(Success/Failure) | Mandatory | NFVO<-VIM |

[Fig. 10]
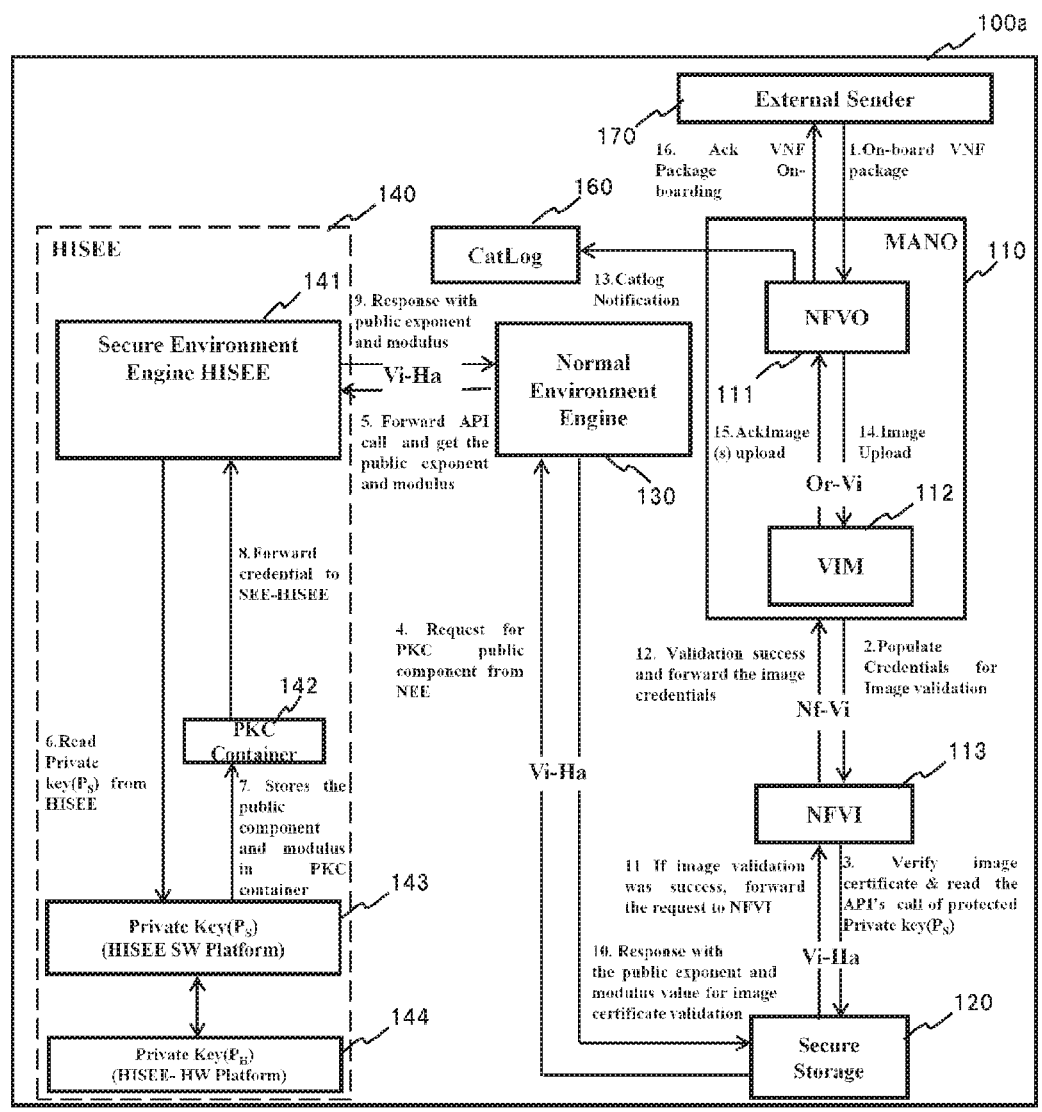

[Fig. 11]
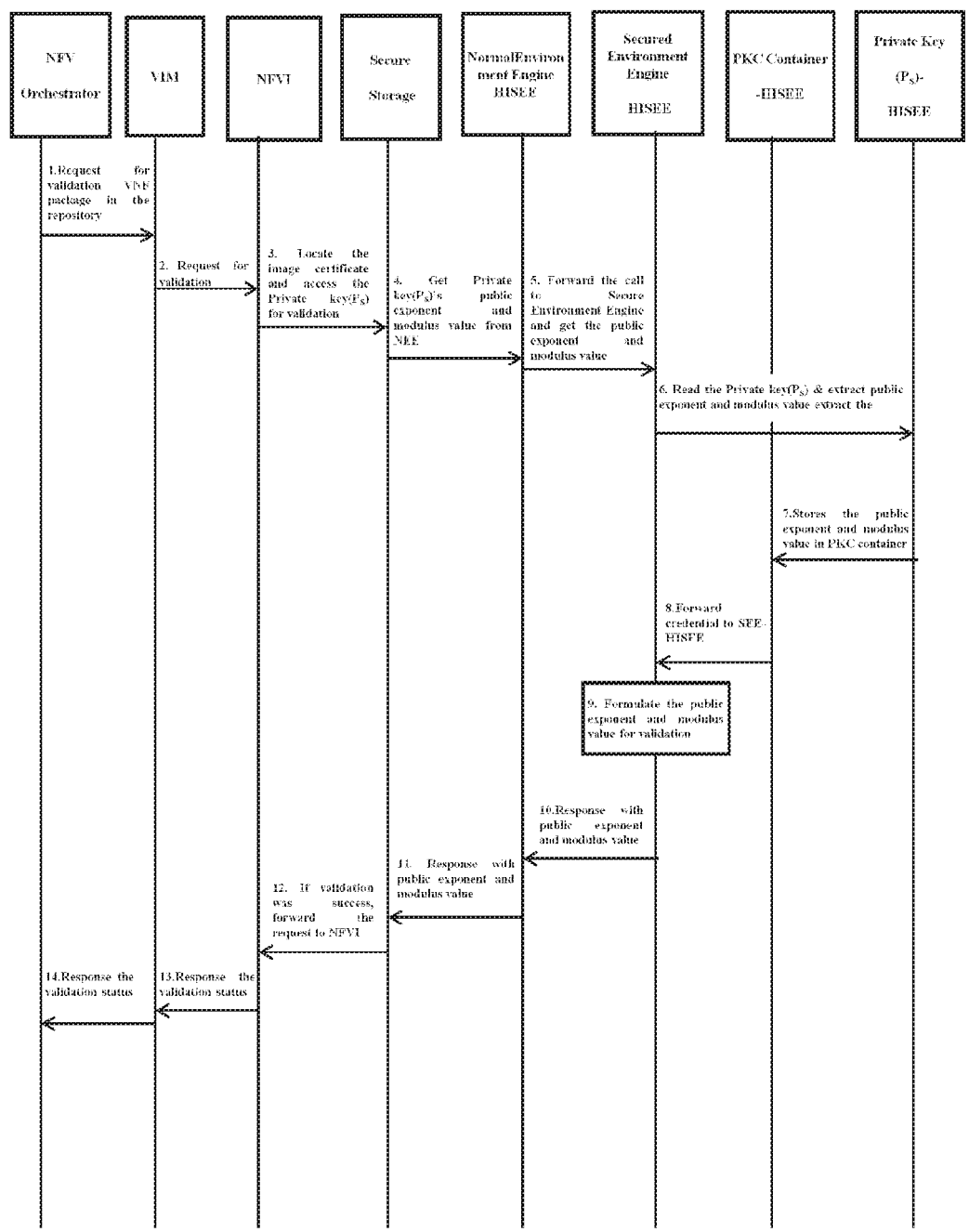

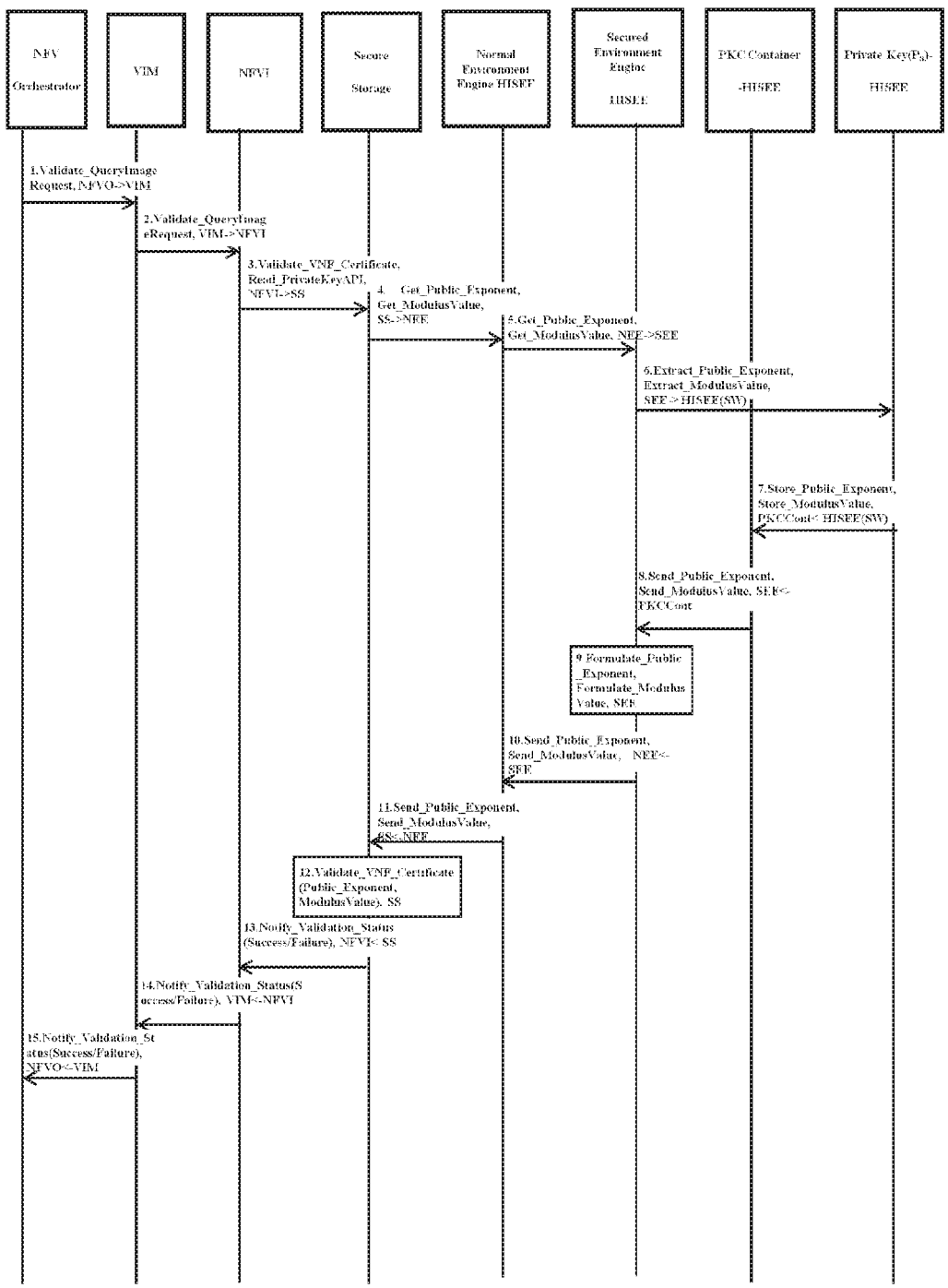
[Fig. 12]

[Fig. 13]

| Sl.No | Message | Requirement | Direction |
|---|---|---|---|
| 1 | Validate_QueryImageRequest | Mandatory | NFVO->VIM |
| 2 | Validate_QueryImageRequest | Mandatory | VIM->NFVI |
| 3 | Validate_VNF_Certificate, Read_PrivatekeyAPI | Mandatory | NFVI->SS |
| 4 | Get_Public_Exponent, Get_ModulusValue | Mandatory | SS->NEE |
| 5 | Get_Public_Exponent, Get_ModulusValue | Mandatory | NEE->SEE |
| 6 | Extract_Public_Exponent, Extract_ModulusValue | Mandatory | SEE->HISEE(SW) |
| 7 | Store_Public_Exponent, Store_ModulusValue | Mandatory | PKCCont<-HISEE(SW) |
| 8 | Send_Public_Exponent, Send_ModulusValue | Mandatory | SEE<-PKCCont |
| 9 | Formulate_Public_Exponent, Formulate_ModulusValue | Mandatory | SEE |
| 10 | Send_Public_Exponent, Send_ModulusValue | Mandatory | NEE<-SEE |
| 11 | Send_Public_Exponent, Send_ModulusValue | Mandatory | SS<-NEE |
| 12 | Validate_vNF_Certificate(Public_Exponent, ModulusValue) | Mandatory | SS |
| 13 | Notify_Validation_Status(Success/Failure) | Mandatory | NFVI<-SS |
| 14 | Notify_Validation_Status(Success/Failure) | Mandatory | VIM<-NFVI |
| 15 | Notify_Validation_Status(Success/Failure) | Mandatory | NFVO<-VIM |

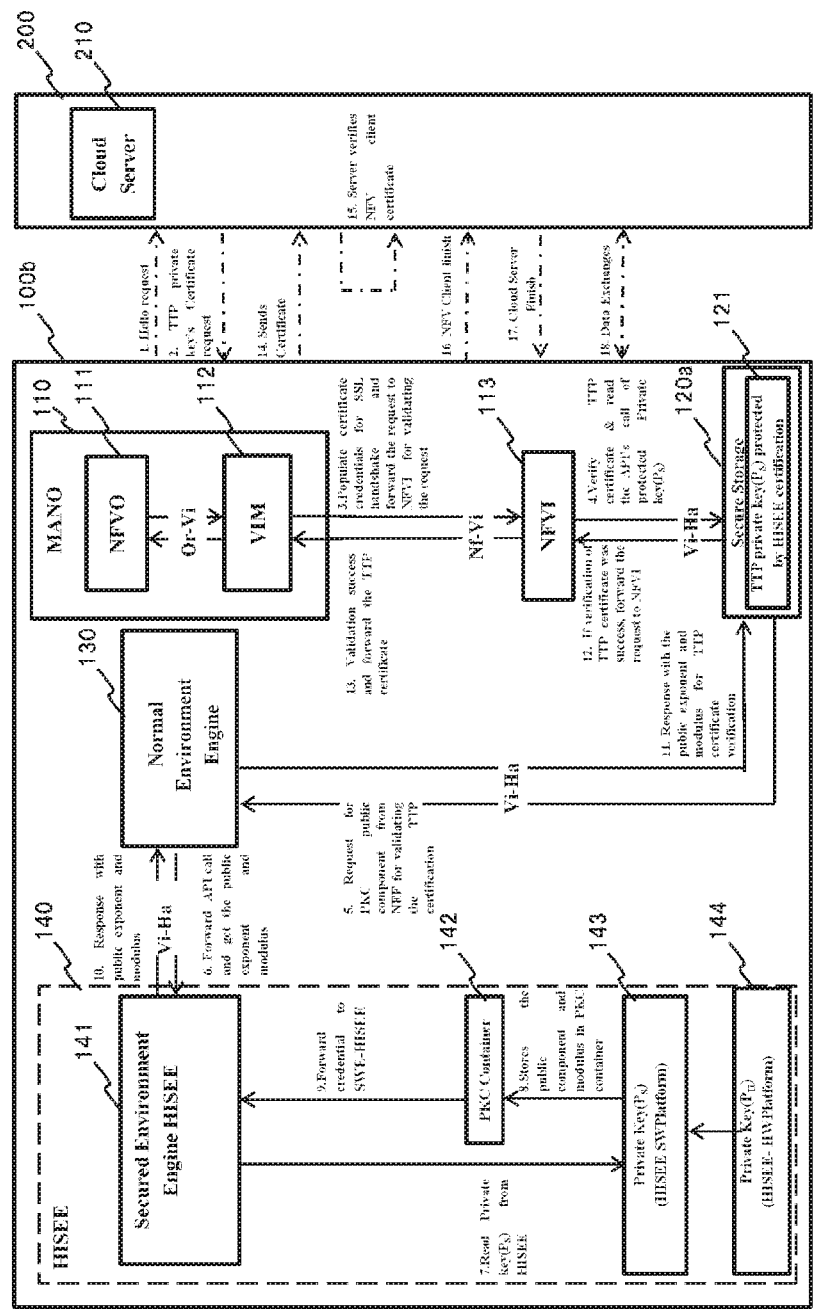
[Fig. 14]

[Fig. 15]
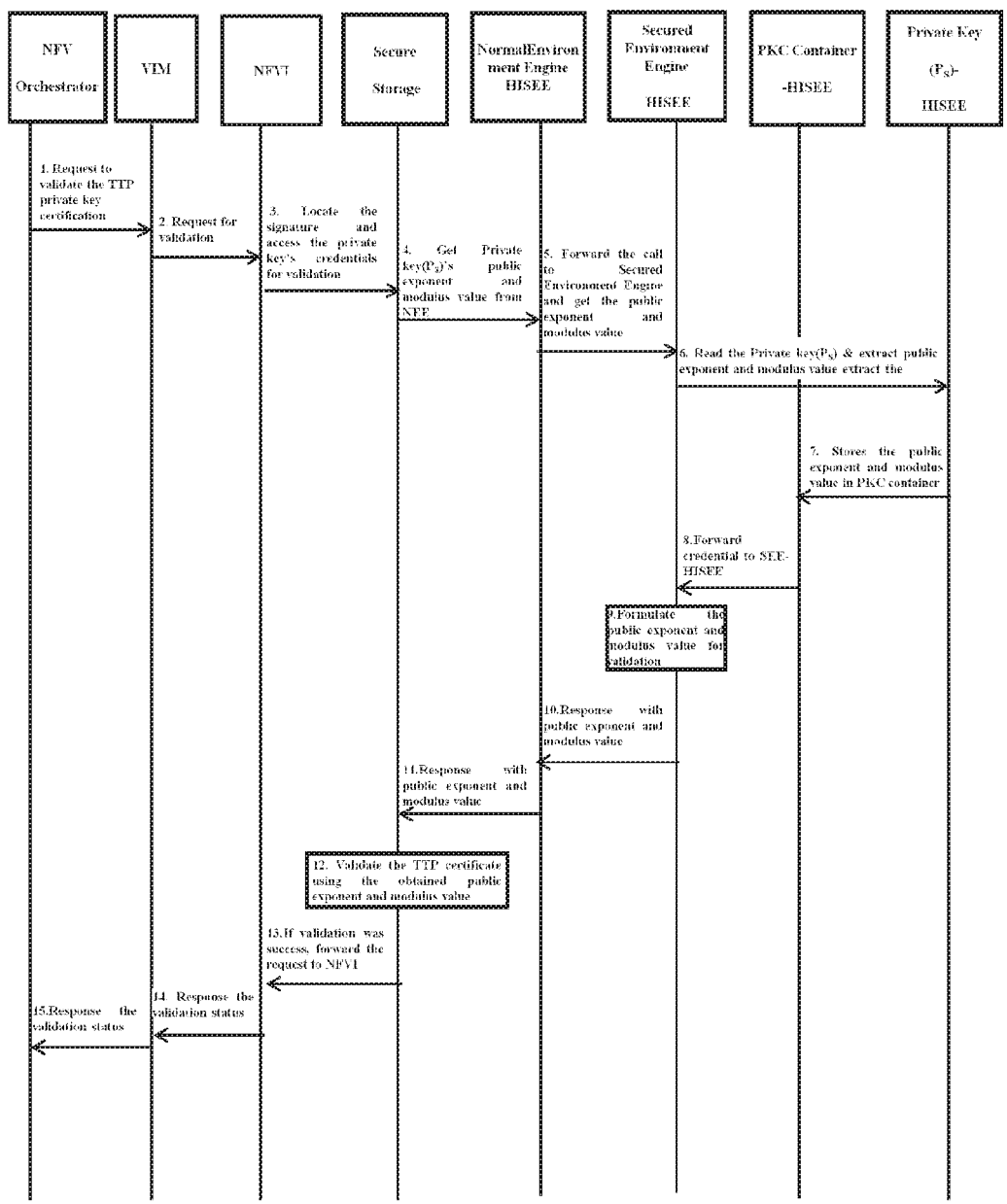

[Fig. 16]
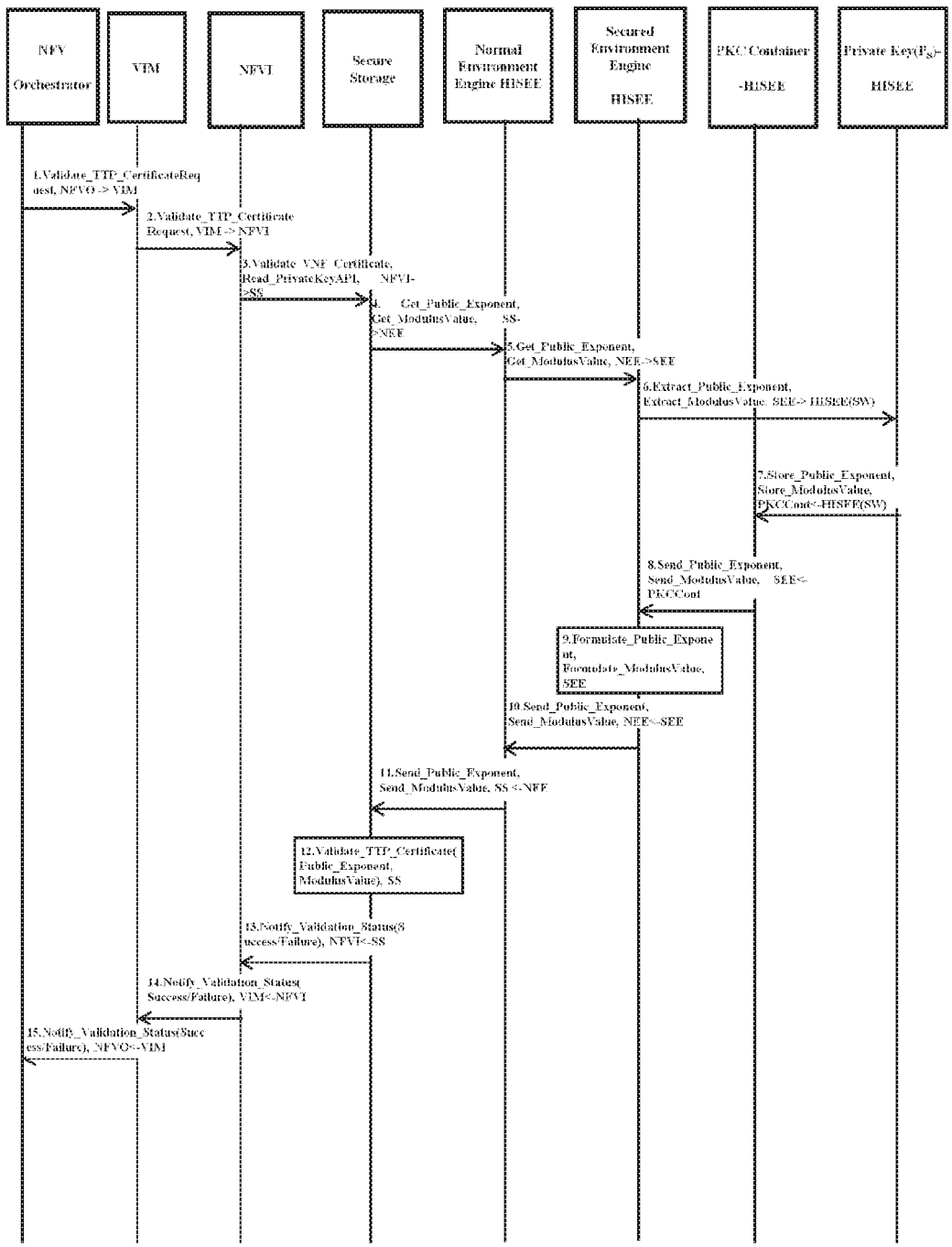

[Fig. 17]

| Sl.No | Message | Requirement | Direction |
|---|---|---|---|
| 1 | Validate_TTP_CertificateRequest | Mandatory | NFVO->VIM |
| 2 | Validate_TTP_CertificateRequest | Mandatory | VIM->NFVI |
| 3 | Validate_TTP_Certificate, Read_PrivateKeyAPI | Mandatory | NFVI->SS |
| 4 | Get_Public_Exponent, Get_ModulusValue | Mandatory | SS->NEE |
| 5 | Get_Public_Exponent, Get_ModulusValue | Mandatory | NEE->SEE |
| 6 | Extract_Public_Exponent, Extract_ModulusValue | Mandatory | SEE->HISEE(SW) |
| 7 | Store_Public_Exponent, Store_ModulusValue | Mandatory | PKCCont<-HISEE(SW) |
| 8 | Send_Public_Exponent, Send_ModulusValue | Mandatory | SEE<-PKCCont |
| 9 | Formulate_Public_Exponent, Formulate_ModulusValue | Mandatory | SEE |
| 10 | Send_Public_Exponent, Send_ModulusValue | Mandatory | NEE<-SEE |
| 11 | Send_Public_Exponent, Send_ModulusValue | Mandatory | SS<-NEE |
| 12 | Validate_TTP_Certificate(Public_Exponent, ModulusValue) | Mandatory | SS |
| 13 | Notify_Validation_Status(Success/Failure) | Mandatory | NFVI<-SS |
| 14 | Notify_Validation_Status(Success/Failure) | Mandatory | VIM<-NFVI |
| 15 | Notify_Validation_Status(Success/Failure) | Mandatory | NFVO<-VIM |

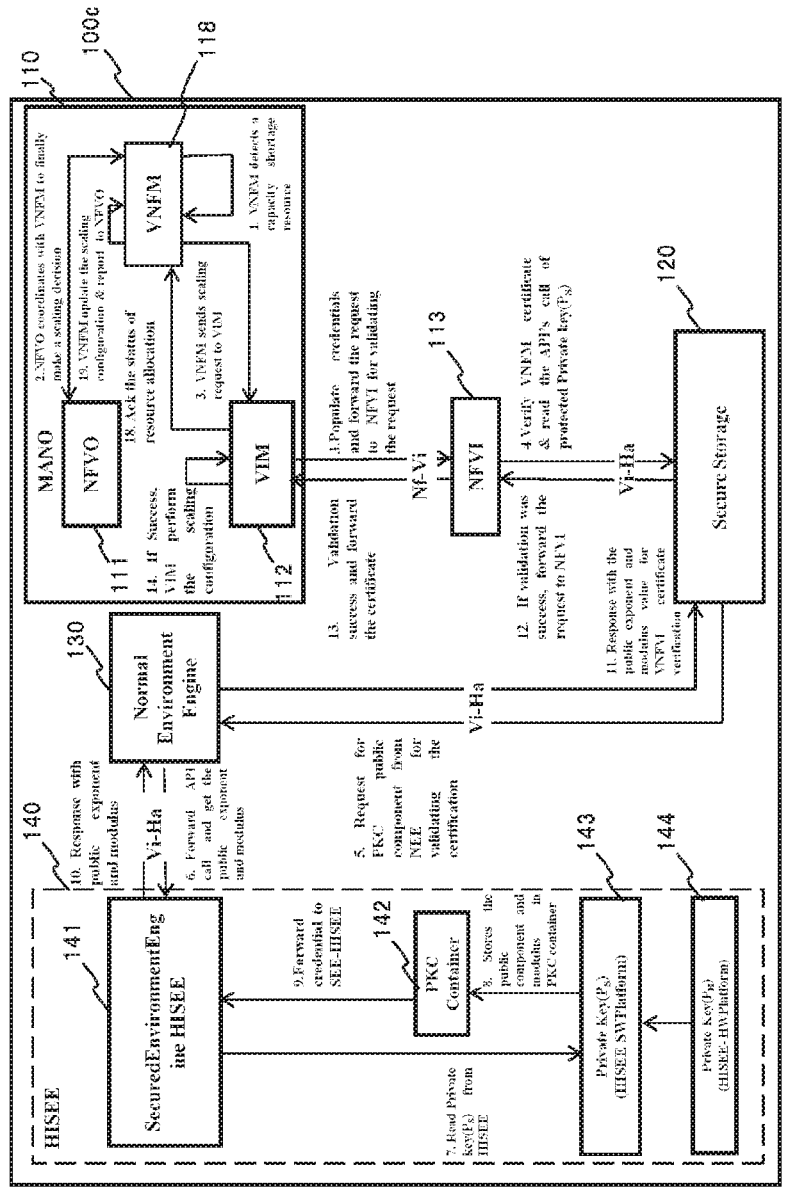
[Fig. 18]

[Fig. 19]
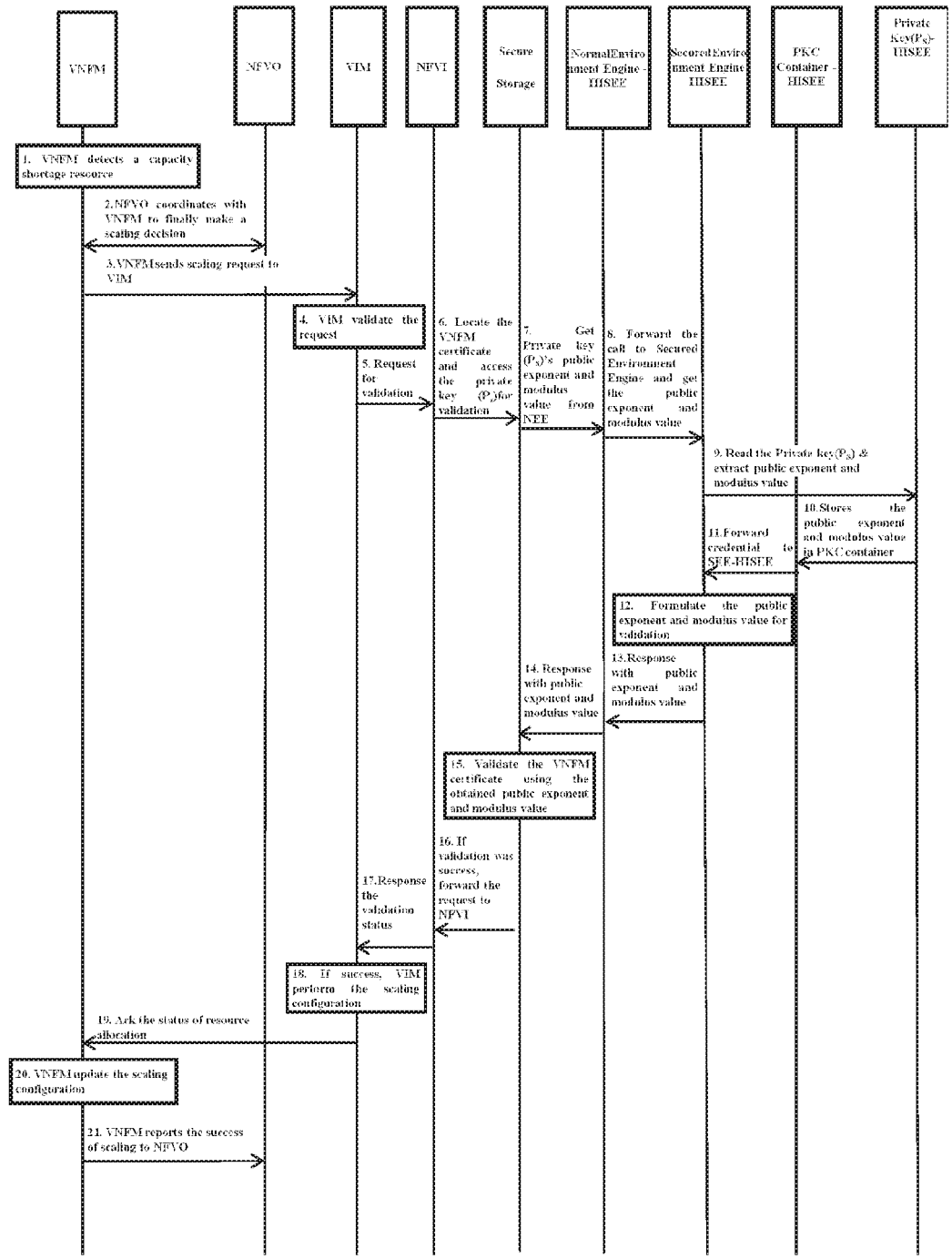

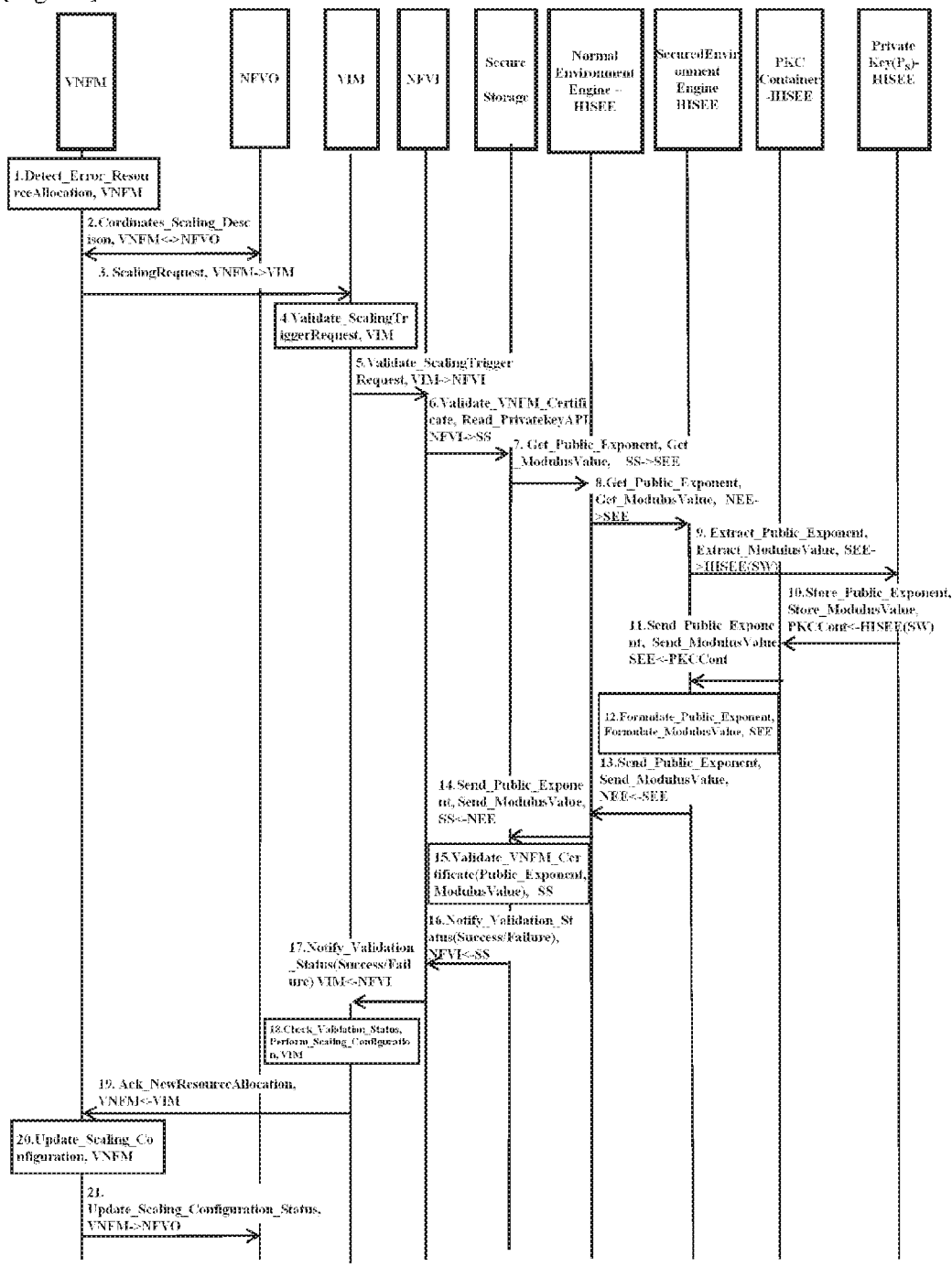
[Fig. 20]

[Fig. 21]

| Sl.No | Message | Requirement | Direction |
|---|---|---|---|
| 1 | Detect_Error_ResourceAllocation | Mandatory | VNFM |
| 2 | Coordinates_Scaling_Decision | Mandatory | VNFM<->NFVO |
| 3 | ScalingRequest | Mandatory | VNFM->VIM |
| 4 | Validate_ScalingTriggerRequest | Mandatory | VIM |
| 5 | Validate_ScalingTriggerRequest | Mandatory | VIM->NFVI |
| 6 | Validate_VNFM_Certificate, Read_PrivateKeyAPI | Mandatory | NFVI->SS |
| 7 | Get_Public_Exponent, Get_ModulusValue | Mandatory | SS->NEE |
| 8 | Get_Public_Exponent, Get_ModulusValue | Mandatory | NEE->SEE |
| 9 | Extract_Public_Exponent, Extract_ModulusValue | Mandatory | SEE->HiSEE(SW) |
| 10 | Store_Public_Exponent, Store_ModulusValue | Mandatory | PKCCont<->HiSEE(SW) |
| 11 | Send_Public_Exponent, Send_ModulusValue | Mandatory | SEE<-PKCCont |
| 12 | Formulate_Public_Exponent_Formulate_ModulusValue | Mandatory | SEE |
| 13 | Send_Public_Exponent, Send_ModulusValue | Mandatory | NEE<-SEE |
| 14 | Send_Public_Exponent, Send_ModulusValue | Mandatory | SS<-NEE |
| 15 | Validate_VNFM_Certificate(Public_Exponent, ModulusValue) | Mandatory | SS |
| 16 | Notify_Validation_Status(Success/Failure) | Mandatory | NFVI<-SS |
| 17 | Notify_Validation_Status(Success/Failure) | Mandatory | VIM<-NFVI |
| 18 | Check_Validation_Status, Perform_Scaling_Configuration | Mandatory | VIM |
| 19 | Ack_NewResourceAllocation | Mandatory | VNFM<-VIM |
| 20 | Update_Scaling_Configuration | Mandatory | VNFM |
| 21 | Update_Scaling_Configuration_Status | Mandatory | VNFM->NFVO |

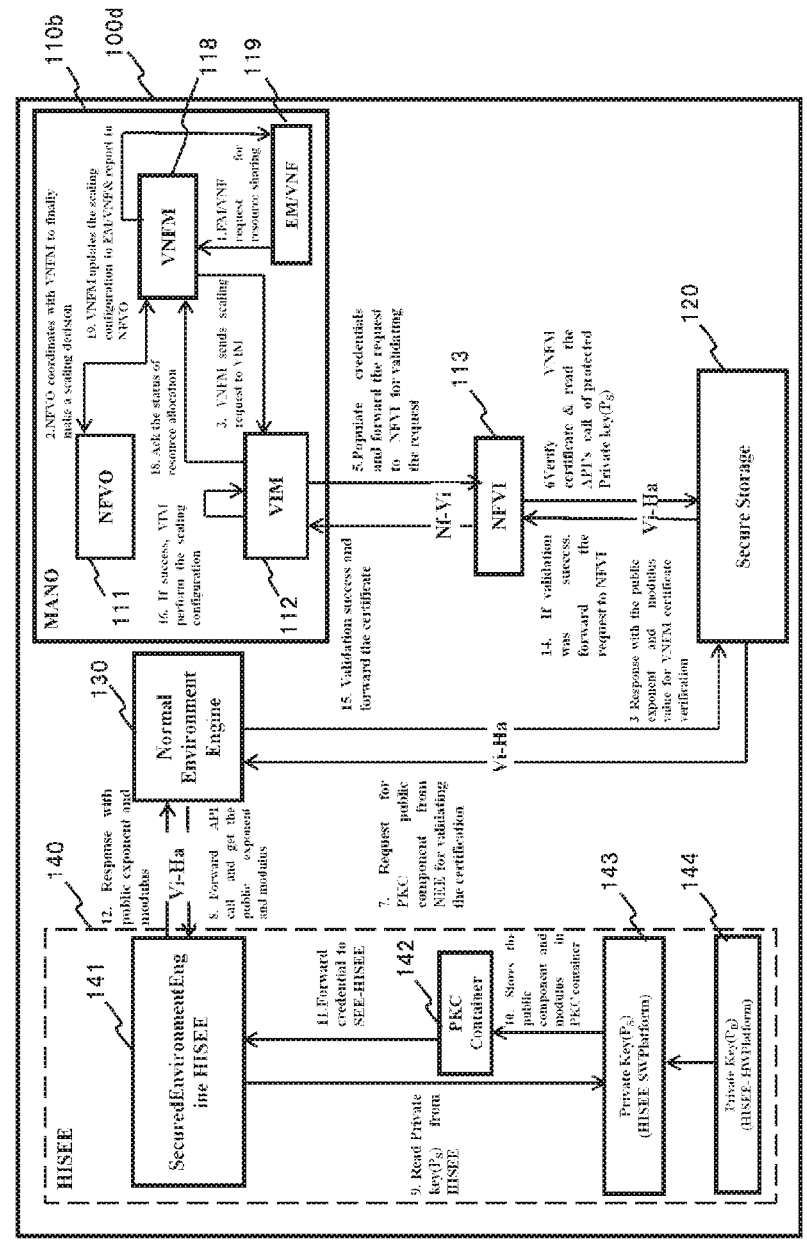
[Fig. 22]

[Fig. 23]
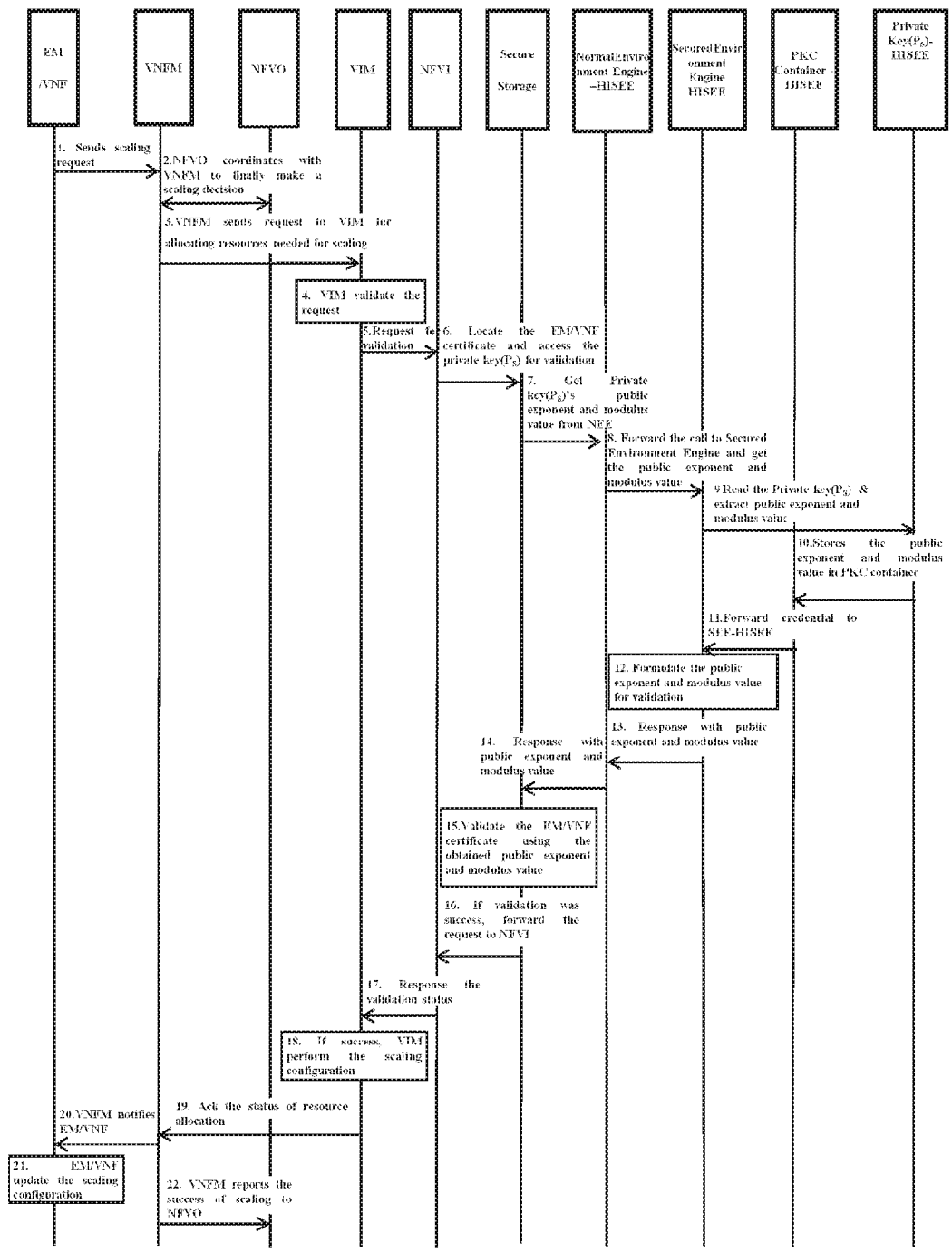

[Fig. 24]
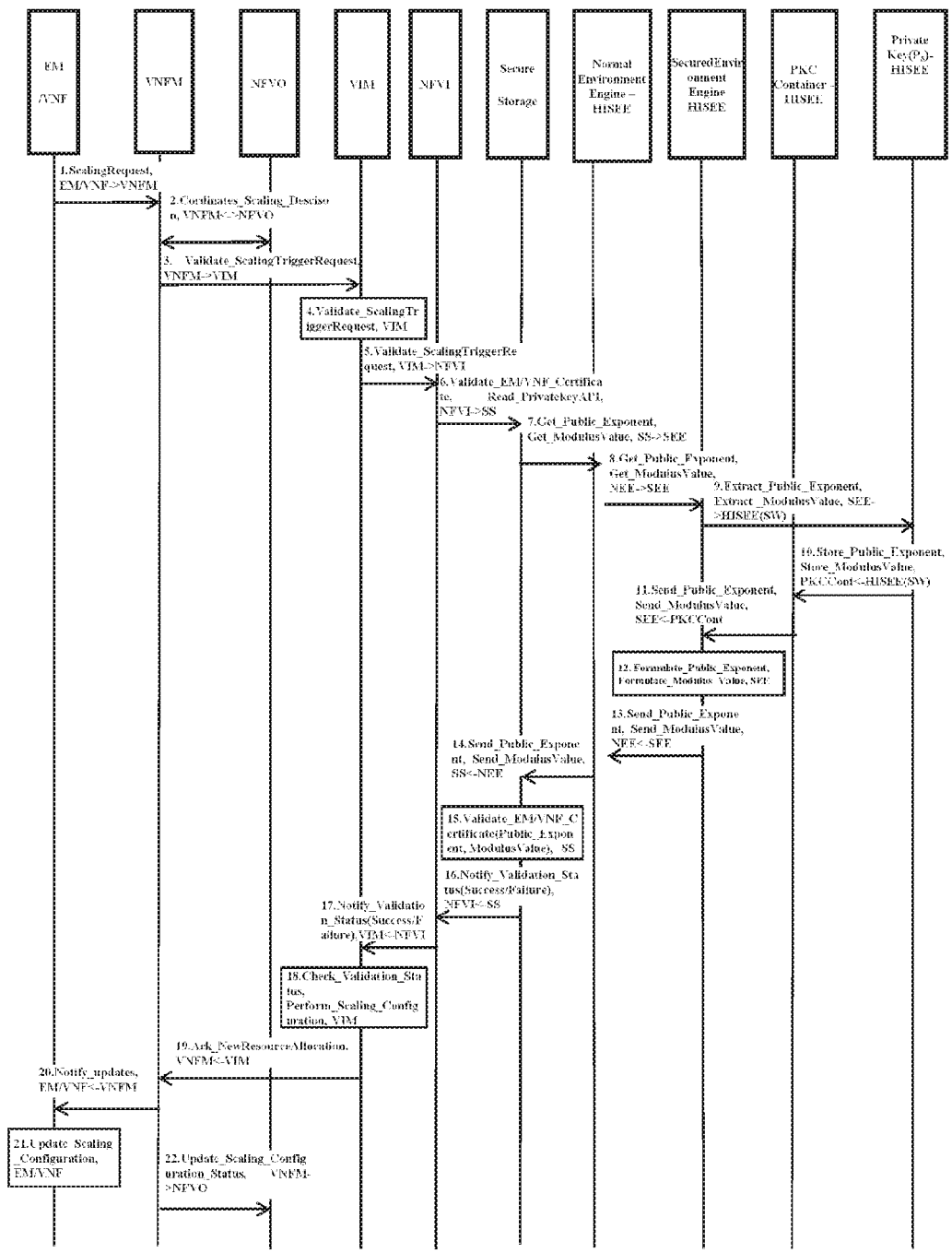

[Fig. 25]

| Sl.No | Message | Requirement | Direction |
|---|---|---|---|
| 1 | ScalingRequest | Mandatory | EM/VNF->VNFM |
| 2 | Cordinates_Scaling_Descision | Mandatory | VNFM<->NFVO |
| 3 | Validate_Scaling TriggerRequest | Mandatory | VNFM->VIM |
| 4 | Validate_Scaling TriggerRequest | Mandatory | VIM |
| 5 | Validate_Scaling TriggerRequest | Mandatory | VIM->NFVI |
| 6 | Validate_EM/VNF_Certificate, Read_PrivatekeyAPI, | Mandatory | NFVI->SS |
| 7 | Get_Public_Exponent, Get_ModulusValue | Mandatory | SS->SEE |
| 8 | Get_Public_Exponent, Get_ModulusValue | Mandatory | NEE->SEE |
| 9 | Extract_Public_Exponent, Extract_ModulusValue | Mandatory | SEE->HISEE(SW) |
| 10 | Store_Public_Exponent, Store_ModulusValue | Mandatory | PKCCont<-HISEE(SW) |
| 11 | Send_Public_Exponent, Send_ModulusValue | Mandatory | SEE<-PKCCont |
| 12 | Formulate_Public_Exponent, Formulate_ModulusValue | Mandatory | SEE |
| 13 | Send_Public_Exponent, Send_ModulusValue | Mandatory | NEE<-SEE |
| 14 | Send_Public_Exponent, Send_ModulusValue | Mandatory | SS<-NEE |
| 15 | Validate_EM/VNF_Certificate(Public_Exponent, ModulusValue) | Mandatory | SS |
| 16 | Notify_Validation_Status(Success/Failure) | Mandatory | NFVI<-SS |
| 17 | Notify_Validation_Status(Success/Failure) | Mandatory | VIM<-NFVI |
| 18 | Check_Validation_Status, Perform_Scaling_Configuration | Mandatory | VIM |
| 19 | Ack_NewResourceAllocation | Mandatory | VNFM<-VIM |
| 20 | Notifies_updates | Mandatory | EM/VNF<-VNFM |
| 21 | Update_Scaling_Configuration | Mandatory | EM/VNF |
| 22 | Update_Scaling_Configuration_Status | Mandatory | VNFM->NFVO |

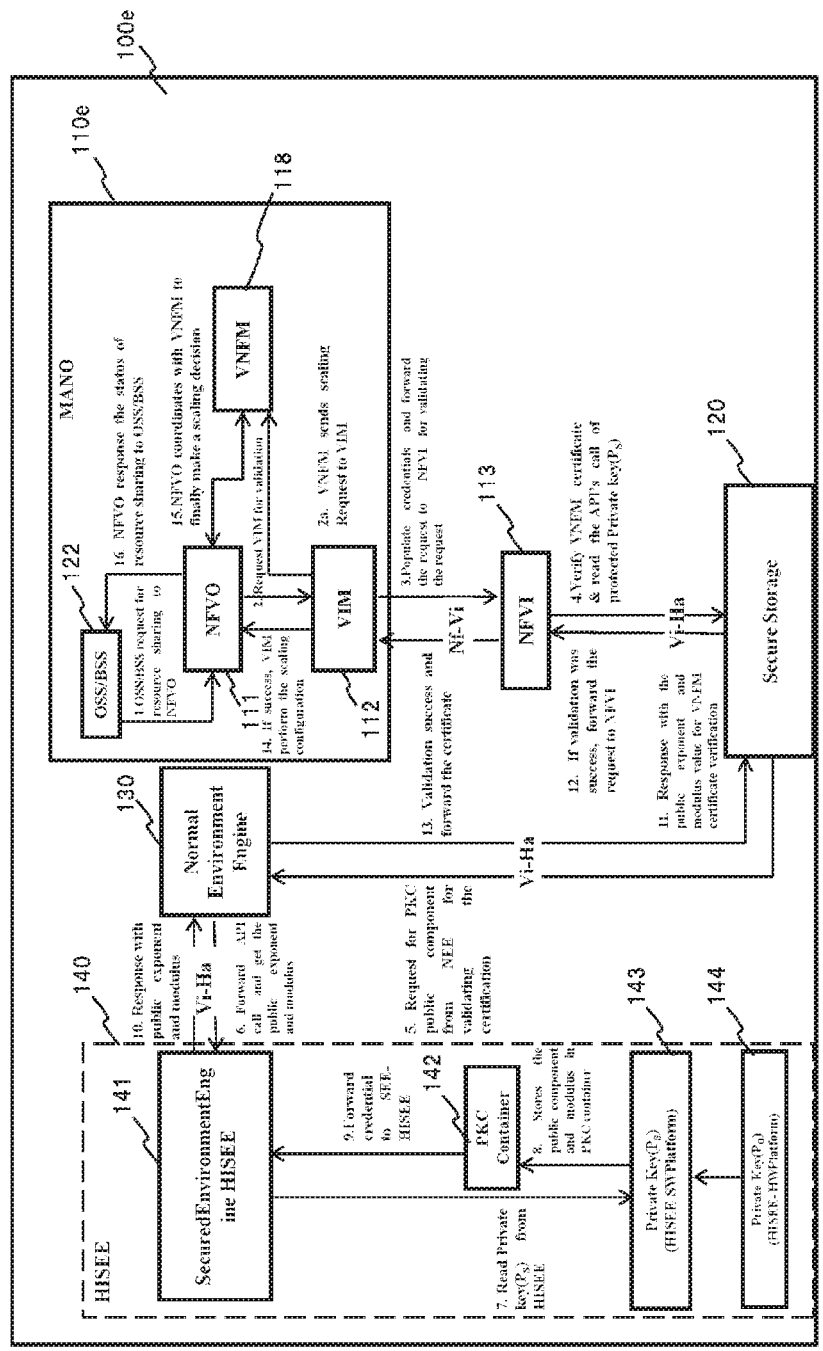
[Fig. 26]

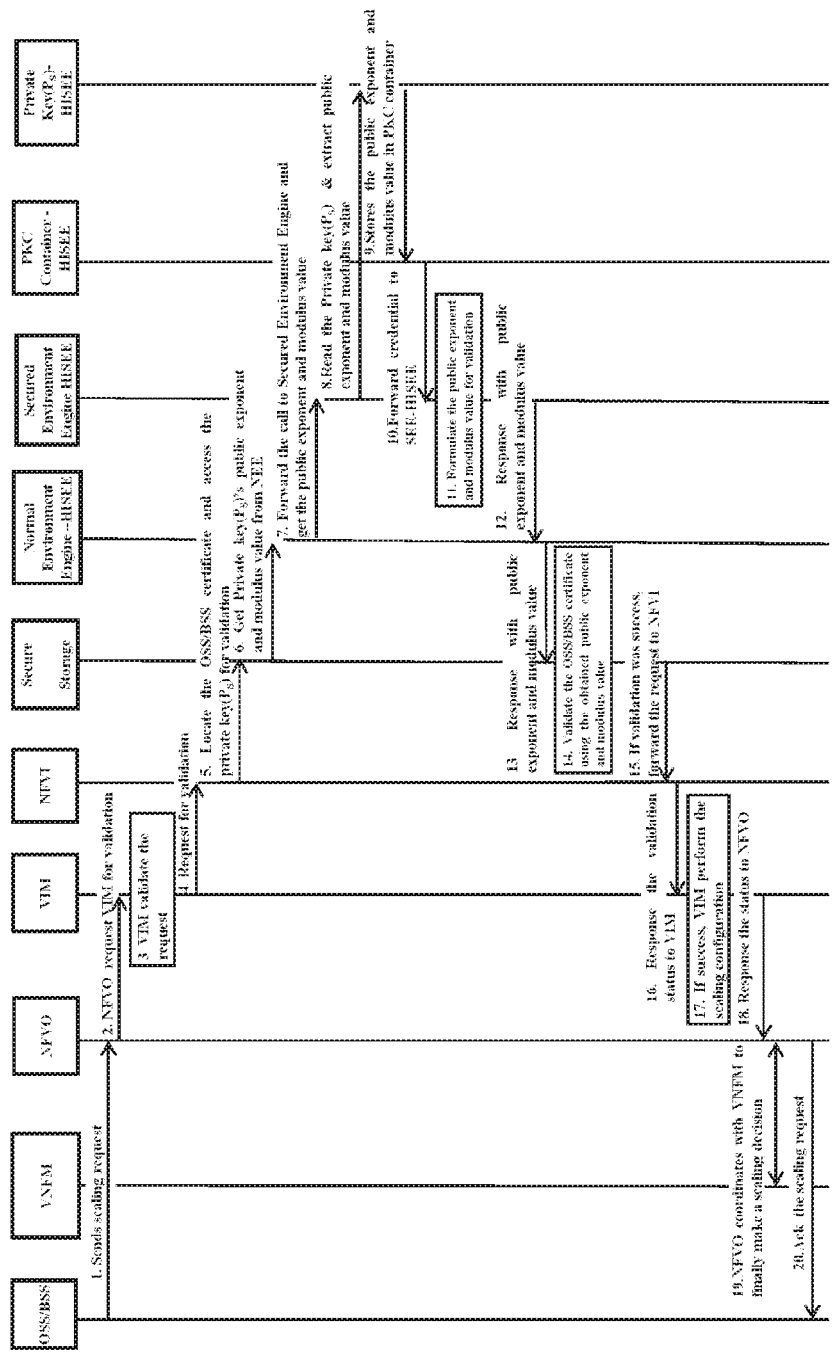
[Fig. 27]

[Fig. 28]
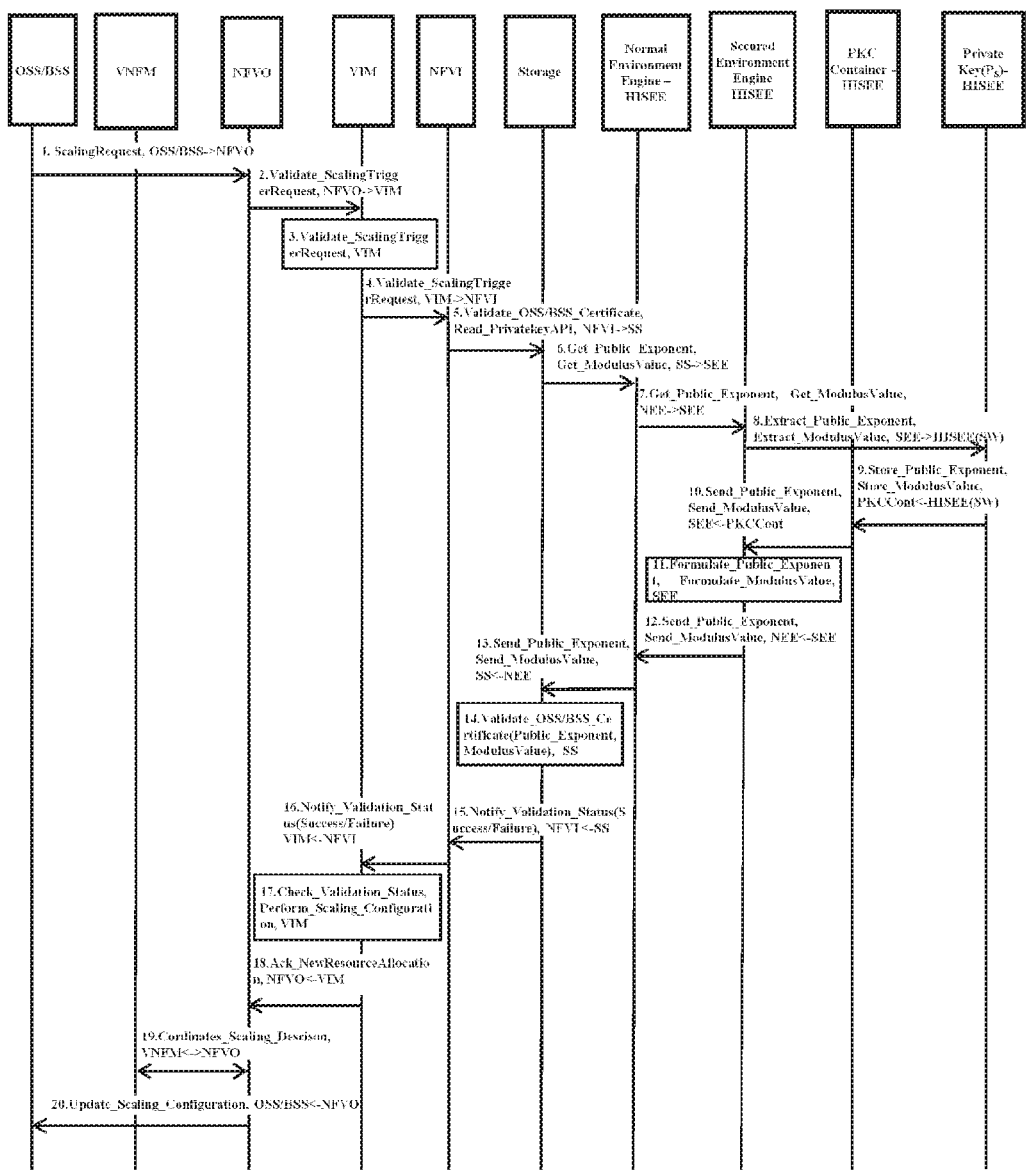

[Fig. 29]

| Sl.No | Message | Requirement | Direction |
|---|---|---|---|
| 1 | ScalingRequest | Mandatory | OSS/BSS->NFVO |
| 2 | Validate_ScalingTriggerRequest | Mandatory | NFVO->VIM |
| 3 | Validate_ScalingTriggerRequest | Mandatory | VIM |
| 4 | Validate_ScalingTriggerRequest | Mandatory | VIM->NFVI |
| 5 | Validate_OSS/BSS_Certificate, Read_PrivatekeyAPI | Mandatory | NFVI->SS |
| 6 | Get_Public_Exponent, Get_ModulusValue | Mandatory | SS->SEE |
| 7 | Get_Public_Exponent, Get_ModulusValue | Mandatory | NEE->SEE |
| 8 | Extract_Public_Exponent, Extract_ModulusValue | Mandatory | SEE->HiSEE(SW) |
| 9 | Store_Public_Exponent, Store_ModulusValue | Mandatory | PKCCcnt<->HiSEE(SW) |
| 10 | Send_Public_Exponent, Send_Modulus | Mandatory | SEE<-PKCCont |
| 11 | Formulate_Public_Exponent, Formulate_ModulusValue | Mandatory | SEE |
| 12 | Send_Public_Exponent, Send_ModulusValue | Mandatory | NEE<-SEE |
| 13 | Send_Public_Exponent, Send_ModulusValue | Mandatory | SS<-NEE |
| 14 | Validate_OSS/BSS_Certificate(Public_Exponent, ModulusValue) | Mandatory | SS |
| 15 | Notify_Validation_Status(Success/Failure) | Mandatory | NFVI<-SS |
| 16 | Notify_Validation_Status(Success/Failure) | Mandatory | VIM<-NFVI |
| 17 | Check_Validation_Status, Perform_Scaling_Configuration | Mandatory | VIM |
| 18 | Ack_NewResourceAllocation | Mandatory | NFVO<-VIM |
| 19 | Cordinates_Scaling_Descison, VNFM<->NFVO | Mandatory | VNFM<->NFVO |
| 20 | Update_Scaling_Configuration | Mandatory | OSS/BSS<-NFVO |

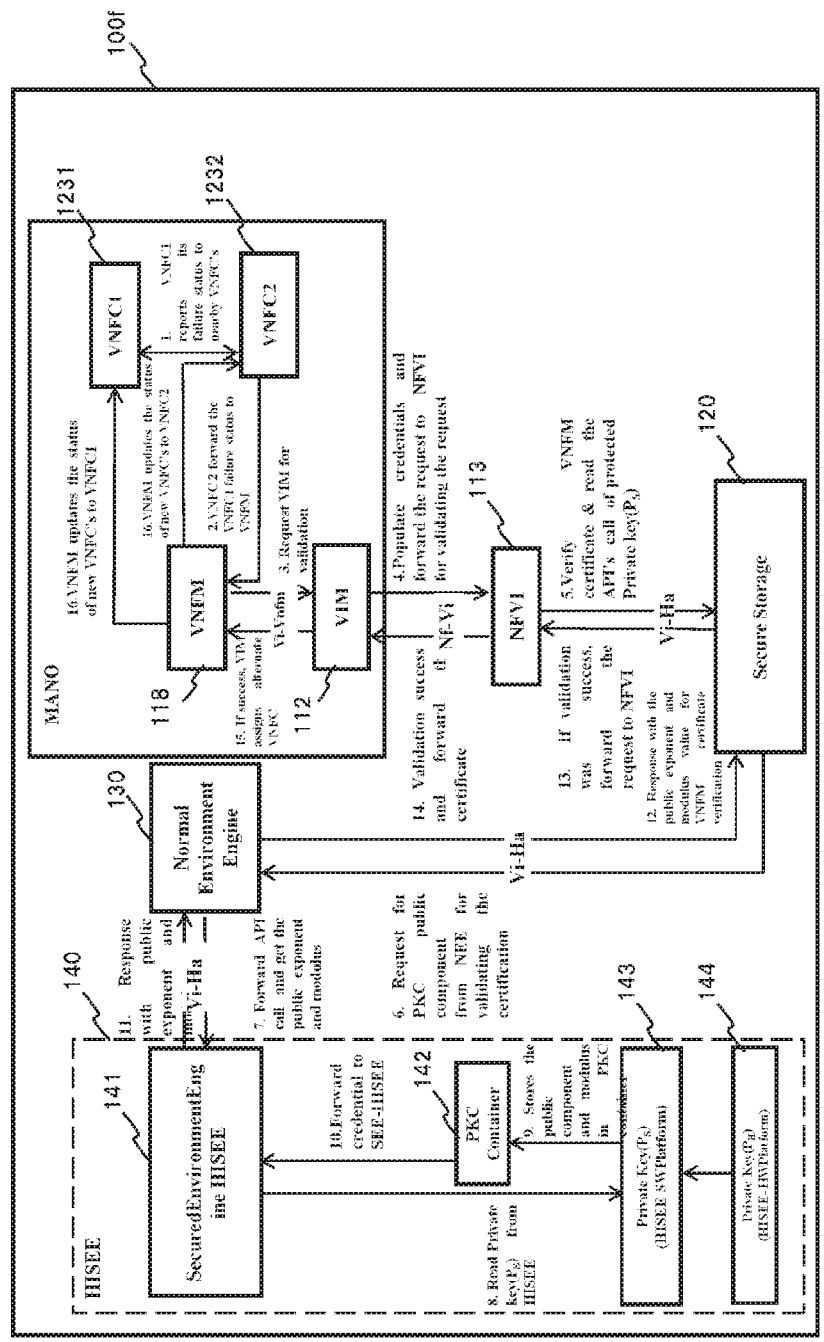
[Fig. 30]

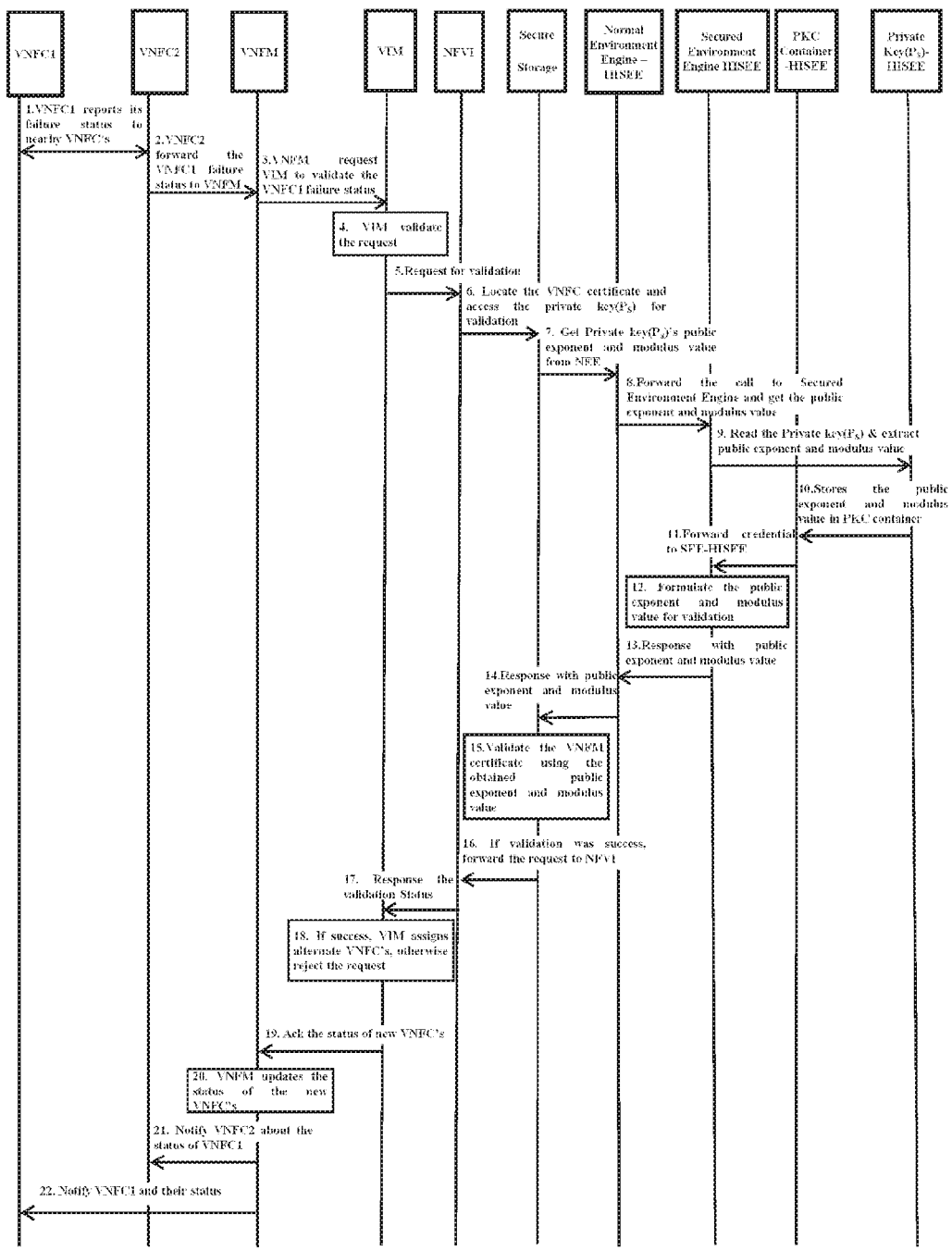
[Fig. 31]

[Fig. 32]
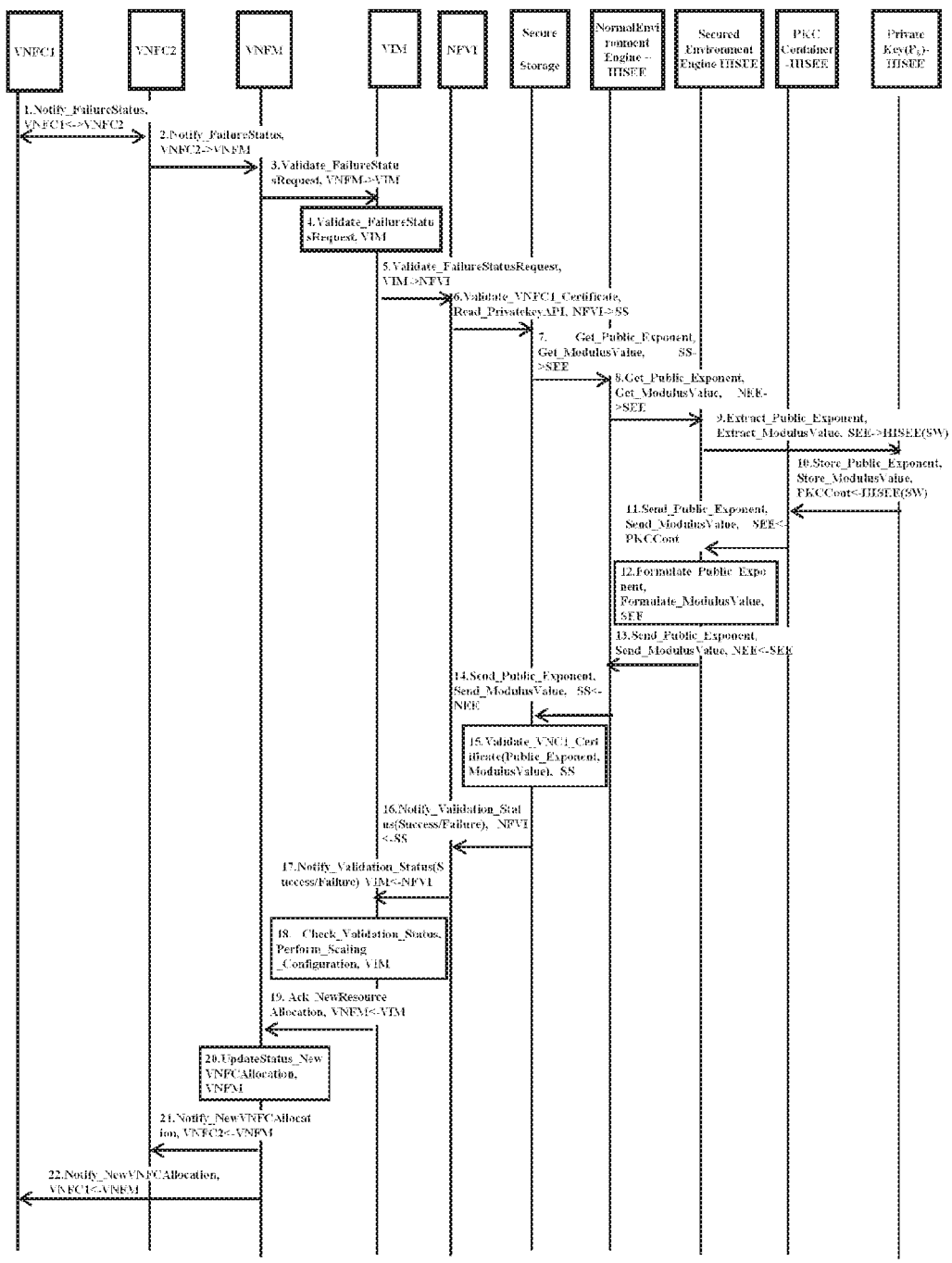

[Fig. 33]

| Sl.No | Message | Requirement | Direction |
|---|---|---|---|
| 1 | Notify_FailureStatus | Mandatory | VNFC1<->VNFC2 |
| 2 | Notify_FailureStatus | Mandatory | VNFC2->VNFM |
| 3 | Validate_FailureStatusRequest | Mandatory | VNFM->VIM |
| 4 | Validate_FailureStatusRequest | Mandatory | VIM |
| 5 | Validate_FailureStatusRequest | Mandatory | VIM->NFVI |
| 6 | Validate_VNFC1_Certificate, Read_PrivatekeyAPI | Mandatory | NFVI->SS |
| 7 | Get_Public_Exponent, Get_ModulusValue | Mandatory | SS->SEE |
| 8 | Get_Public_Exponent, Get_ModulusValue | Mandatory | NEE->SEE |
| 9 | Extract_Public_Exponent, Extract_ModulusValue | Mandatory | SEE->HiSEE(SW) |
| 10 | Store_Public_Exponent, Store_ModulusValue | Mandatory | PKCCont<-HiSEE(SW) |
| 11 | Send_Public_Exponent, Send_ModulusValue | Mandatory | SEE<-PKCCont |
| 12 | Formulate_Public_Exponent, Formulate_ModulusValue | Mandatory | SEE |
| 13 | Send_Public_Exponent, Send_Modulus_Value | Mandatory | NEE<-SEE |
| 14 | Send_Public_Exponent, Send_ModulusValue | Mandatory | SS<-NEE |
| 15 | Validate_VNFC1_Certificate(Public_Exponent, ModulusValue) | Mandatory | SS |
| 16 | Notify_Validation_Status(Success/Failure) | Mandatory | NFVI<-SS |
| 17 | Notify_Validation_Status(Success/Failure) | Mandatory | VIM<-NFVI |
| 18 | Check_Validation_Status, Perform_Scaling_Configuration | Mandatory | VIM |
| 19 | Ack_NewResourceAllocation | Mandatory | VNFM<-VIM |
| 20 | UpdateStatus_NewVNFCAllocation | Mandatory | VNFM |
| 21 | Notify_NewVNFCAllocation | Mandatory | VNFC2<-VNFM |
| 22 | Notify_NewVNFCAllocation | Mandatory | VNFC1<-VNFM |

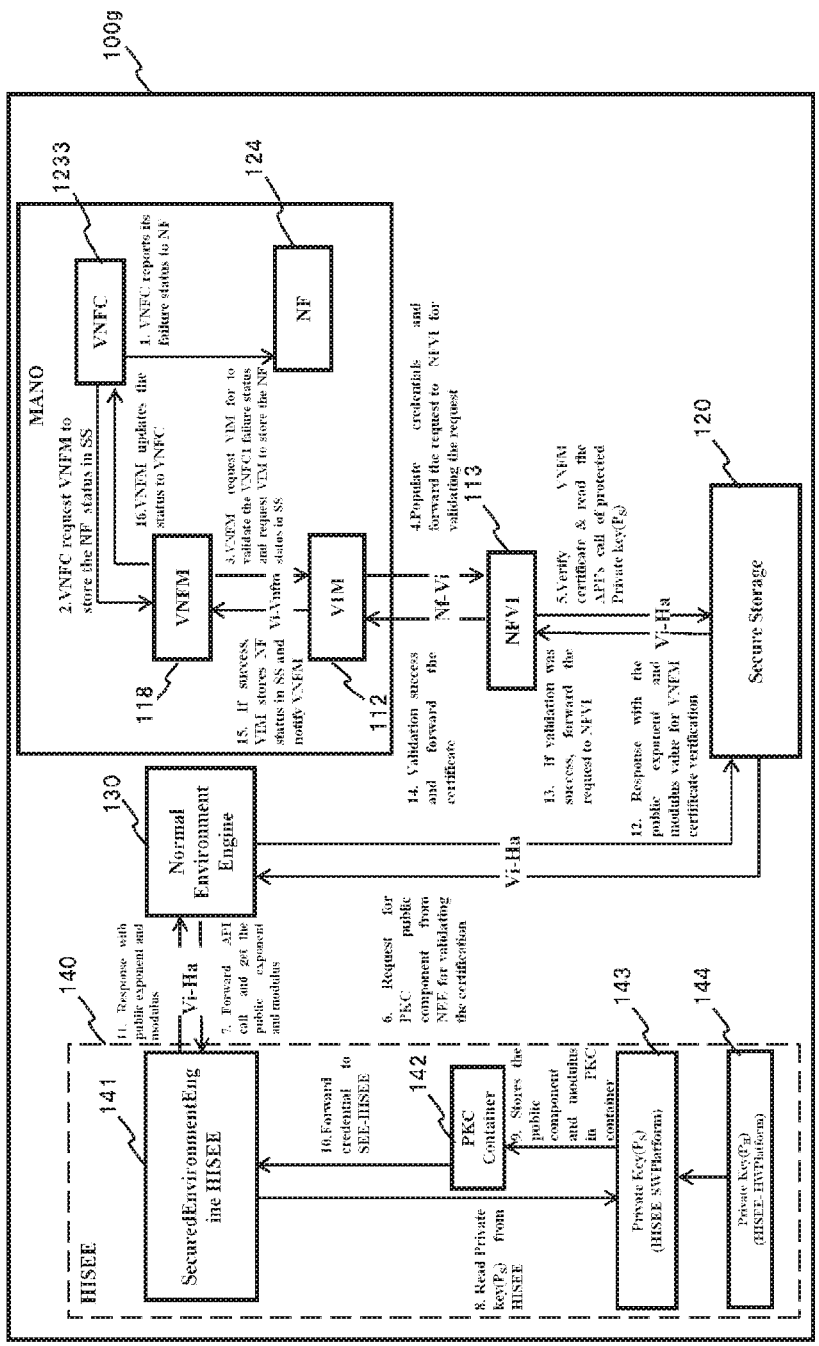
[Fig. 34]

[Fig. 35]
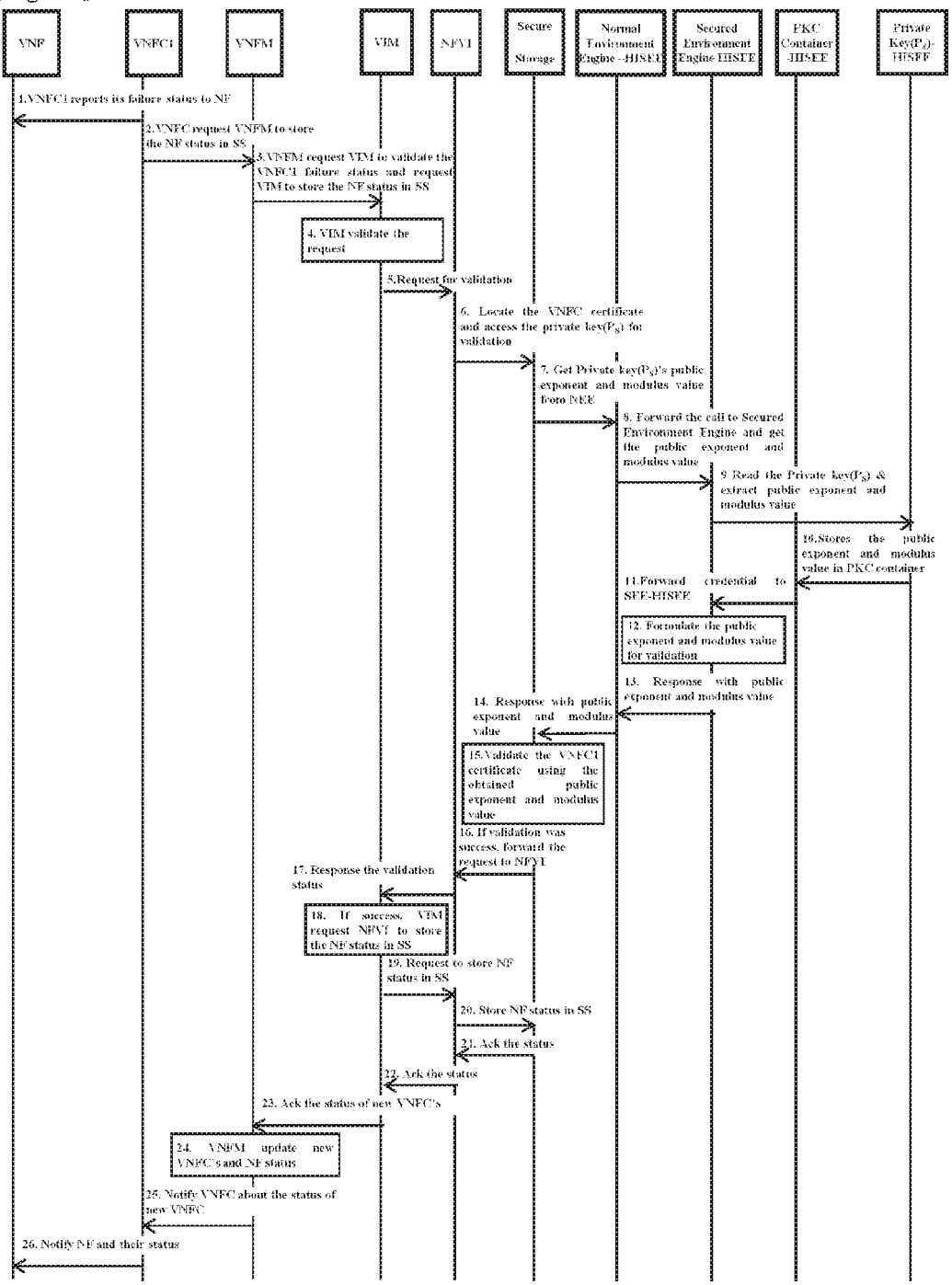

[Fig. 36]
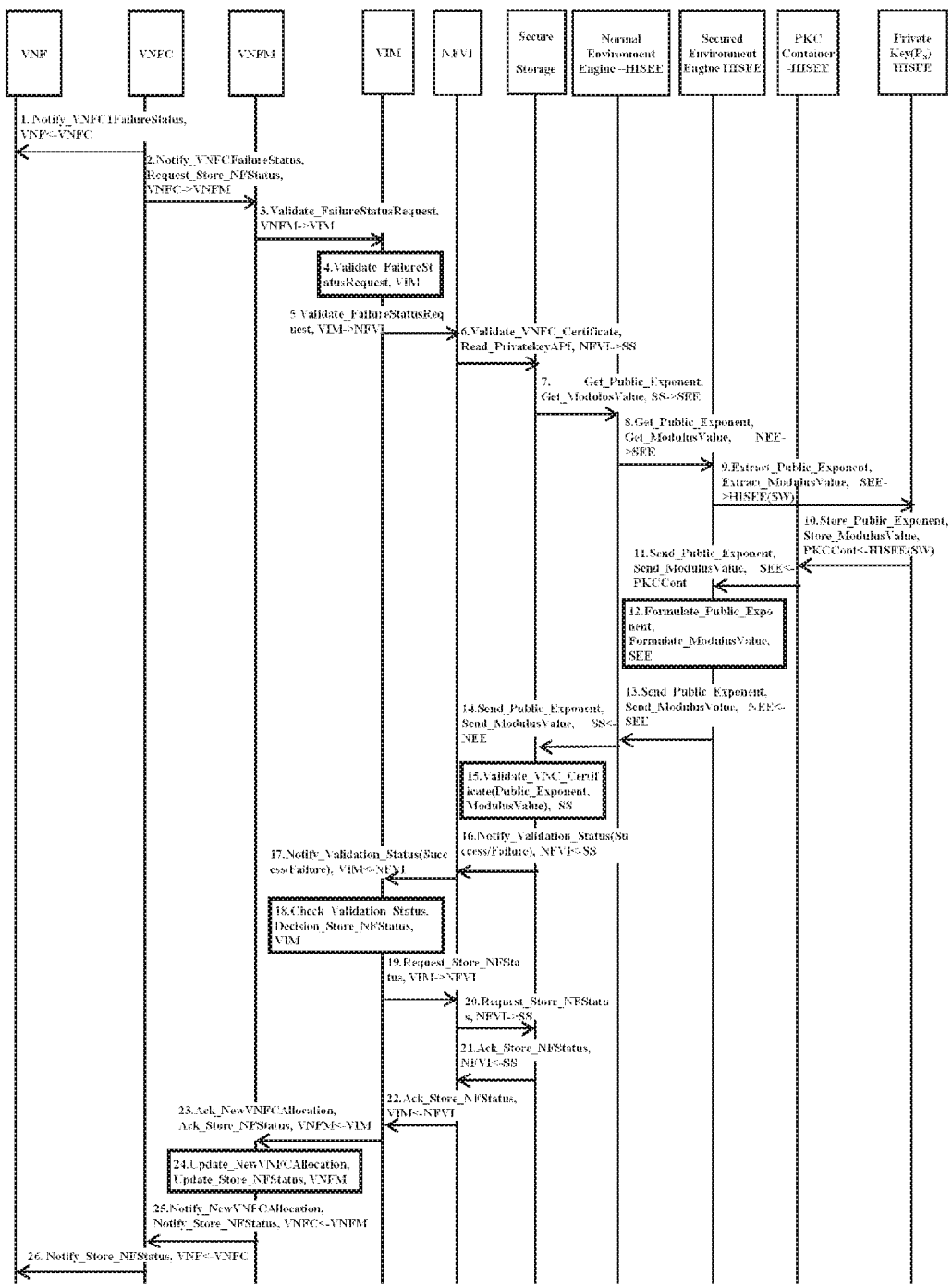

[Fig. 37]

| Sl.No | Message | Requirement | Direction |
|---|---|---|---|
| 1 | Notify_VNFCFailureStatus | Mandatory | VNFC<-VNFC |
| 2 | Notify_VNFCFailureStatus, Request_Store_NFStatus | Mandatory | VNFC->VNFM |
| 3 | Validate_FailureStatusRequest | Mandatory | VNFM->VIM |
| 4 | Validate_FailureStatusRequest | Mandatory | VIM |
| 5 | Validate_FailureServiceRequest | Mandatory | VIM->NFVI |
| 6 | Validate_VNFC_Certificate, Read_PrivatekeyAPI | Mandatory | NFVI->SS |
| 7 | Get_Public_Exponent, Get_ModulusValue | Mandatory | SS->SEE |
| 8 | Get_Public_Exponent, Get_ModulusValue | Mandatory | NEE->SEE |
| 9 | Extract_Public_Exponent, Extract_ModulusValue | Mandatory | SEE->HiSEE(SW) |
| 10 | Store_Public_Exponent, Store_ModulusValue | Mandatory | PKCCont<-HISEE(SW) |
| 11 | Send_Public_Exponent, Send_ModulusValue | Mandatory | SEE<-PKCCont |
| 12 | Formulate_Public_Exponent, Formulate_ModulusValue | Mandatory | SEE |
| 13 | Send_Public_Exponent, Send_Modulus_Value | Mandatory | NEE<-SEE |
| 14 | Send_Public_Exponent, Send_Modulus_Value | Mandatory | SS<-NEE |
| 15 | Validate_VNFC_Certificate(Public_Exponent, ModulusValue) | Mandatory | SS |
| 16 | Notify_Validation_Status(Success/Failure) | Mandatory | NFVI<-SS |
| 17 | Notify_Validation_Status(Success/Failure) | Mandatory | VIM<-NFVI |
| 18 | Check_Validation_Status, Perform_Scaling_Configuration | Mandatory | VIM |
| 19 | Request_Store_NFStatus | Mandatory | VIM->NFVI |
| 20 | Request_Store_NFStatus | Mandatory | NFVI->SS |
| 21 | Ack_Store_NFStatus | Mandatory | NFVI<-SS |
| 22 | Ack_Store_NFStatus | Mandatory | VIM<-NFVI |
| 23 | Ack_NewVNFCAllocation, Ack_Store_NFStatus | Mandatory | VNFM<-VIM |
| 24 | Update_NewVNFCAllocation, Update_Store_NFStatus | Mandatory | VNFM |
| 25 | Notify_NewVNFCAllocation Notify_Store_NFStatus | Mandatory | VNFC<-VNFM |
| 26 | Notify_Store_NFStatus | Mandatory | VNFC<-VNFC |

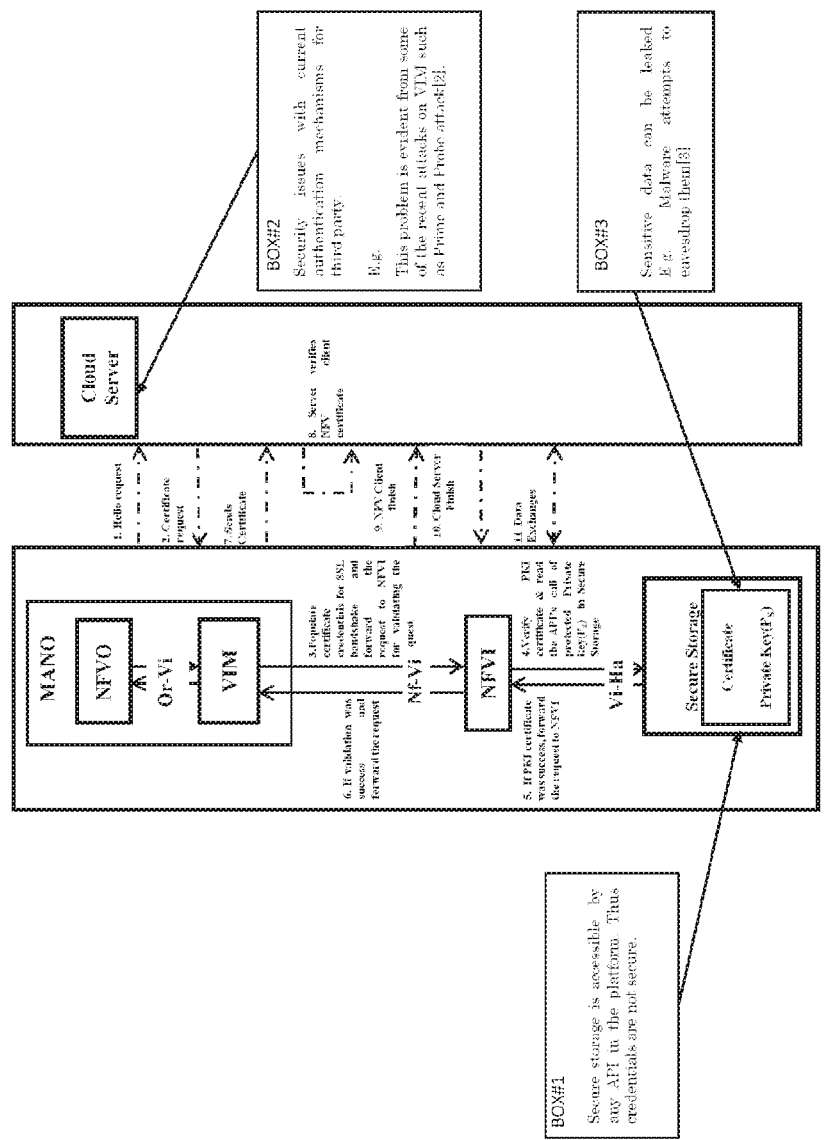
[Fig. 38]

NETWORK FUNCTION VIRTUALIZATION SYSTEM AND VERIFYING METHOD

REFERENCE TO RELATED APPLICATION

This Application is a National Stage of International Application No. PCT/JP2017/015560 filed Apr. 18, 2017, claiming priority based on Indian Patent Application No. 201611030702 filed Sep. 8, 2016, the disclosure of which is incorporated herein in its entirety by reference thereto.

FIELD

The present invention relates to a network function virtualization system and a verifying method.

BACKGROUND

Network functions virtualization (NFV) is proposed as described in Non Patent Literatures [NPLs] 1 and 2. Network functions virtualization (NFV) is a unified orchestration platform that introduces unique opportunities of addressing security problems due to unprecedented scale, complex and disjointed virtual environment, flexibility and central control management. Resources for virtual nodes (like compute, storage and network) have to be dynamically allocated in a controlled environment, which requires dynamic security mechanism. A novel approach is required to solve this NFV related security problem, which should have the capability to address the security requirements across all layers such as platform level, virtualized network level and application levels. The dynamic nature of NFV system demands security mechanism, policies, processes and practices that should be embedded in the genetic fabric of NFV. The proposed framework should provision confidentiality, integrity and privacy for NFV operation and also should facilitate strong authentication mechanism to secure the services and credentials of the systems.

NFV system brings new security challenges which are listed below.
- Exploit or violation due to native vulnerabilities of VNFs
- Exploit or violation due to vulnerabilities of virtualization software
- Exploit or violation due to vulnerabilities of VNF images
- Exploit or violation due to administrative errors
- Malicious tenant or neighbor
- Rogue insider
- Exploit or violation due to vulnerabilities of hardware and firmware
- Information leakage during VM (Virtual machine) crashing
- Privilege escalation and verify the identities of each service at a given layer
- Verify the security patches which are required for upgradation without disturbing the NFV services
- Handling of zero-day vulnerabilities
- Managing the trust for third party vendors or users In a cloud environment, multi-tenancy drives the need for logical separation of virtual resources among tenants. Through NFV orchestration, certain VNFs can be deployed on separate compute nodes, and they can be further segregated by using separate networks. In addition, the use of security zones allows VNFs to be deployed on or migrated to hosts that satisfy security-pertinent criteria such as location and level of hardening for example, some hosts will employ the trusted computing technology i.e., Hardware Isolated Secured Execution Environment (HISEE). HISEE provides a safe environment for secure data on the chip. With HISEE, full bus-bandwidth access is provided to all storage areas to provide fast memory access speeds. It provides flexibility to allow customization and upgrades to the secure system even after the SoC (Systems on Chip) is finalized. HISEE defines a secured environment within the embedded system.

The HISEE are designed to protect against or mitigate the potential damage caused by a variety of threats and attacks.

Patent Literatures [PTLs] 1 to 3 describe existing solutions related to the present invention.
[PTL 1] U.S. Pat. No. 9,043,604 B2
[PTL 2] US 2013/0339739 A1
[PTL 3] U.S. Pat. No. 8,925,055 B2
[NPL 1]
European Telecommunications Standards Institute (ETSI), "Network Functions Virtualisation—Update White Paper", [online], [Searched on Aug. 25, 2016], Internet, <URL: https://portal.etsi.org/NFV/NFV_White_Paper2.pdf>
[NPL 2]
European Telecommunications Standards Institute (ETSI), "Network Functions Virtualisation; Architectural Framework (ETSI GS NFV 002)", [Searched on Aug. 25, 2016], Internet <URL: http://www.etsi.org/deliver/etsi_gs/nfv/001_099/002/01.01.01_60/gs_n fv002v010101p.pdf>

SUMMARY

The disclosures of Patent Literatures 1 to 3 and Non Patent Literatures 1 and 2 given above are hereby incorporated in their entirety by reference into this specification. The following analysis is made by the inventors of the present invention.

According to analysis of the inventors' of present disclosure, following problems to be solved remain.

Problem 1: Gaps in HISEE for NFV Environment

Data such as a secure credential, confidential data, profile of network and subscriber activities, can be leaked to a third party in an unsecure manner if a third party and secure mechanism collude. It has been argued that HISEE won't compromise, but cannot guarantee that colluding will never happen. It has to sacrifice security and privacy in order to detect invalid HISEE's attestations. It should also be noted that the HISEE cannot protect against many of attacks that threaten security and privacy of network or subscriber activities. For instance, most viruses nowadays exploit the scripting languages in many products. In such a case, the application will be trusted by HISEE system; however network and subscriber activities or data could actually be compromised covertly. Also the HISEE does not reduce the threat from the likes of spywares that could monitor network and event services activities, such as assigning VM (Virtual Machine) to a virtual network, connecting VM to external network, attaching network services between VM's, tenant migration, sharing the resource, VNF package upgradation, on-boarding packages, etc. Additionally, it is vulnerable to power analysis which can break tamper-evident property of the HISEE by being able to extract information from protected storage without being detected.

Problem 2: Sensitive Data Leakage

As illustrated in the box #3 of FIG. 38, NFV routinely possess sensitive data (such as passwords, private keys, cryptographic certificates, tokens, etc) which are used for authentication of process, service, agents and users. These data should be protected during all phases of the NFV lifecycle management and should be considered highly dynamic in nature, with updates likely during instantiation, hibernation/suspension, and VNF retirement. For example, let's discuss about the importance of protecting the private key. If the private key is compromised i.e., attacker might have obtained the private key and had read all the encrypted sent/received messages under the corresponding public key and forged the signatures. The seriousness of these consequences ensures the importance of protecting the private key with secure mechanisms. Recently an attack was performed and demonstrated the viability of co-location and resulted first concrete proof for sensitive information leakage on a commercial cloud environment. The co-location detection can be enabled and detected by resource sharing between tenant virtual machines. Under certain conditions, the same mechanism can also be exploited to extract sensitive information from a co-located victim VMs, resulting in security and privacy breaches. They have presented the full-fledged attack that exploits subtle leakages to recover RSA decryption keys from a co-located instance. As illustrated in the box #2 of FIG. 38, Prime and Probe attack was performed to recover noisy keys from a carefully monitored cloud VM running the aforementioned vulnerable libraries.

Problem 3: Managing the Trust of Trusted Third Party Owner

The problem for all the authentication mechanism in NFV system is based on the level of trust on authentication servers (for e.g.: public key cryptography (PKC)). In traditional crypto system, there is an assumption that authentication servers are trusted such that they never fail and difficult to compromise. However, in realtime scenario, this assumption doesn't occur.

Although such servers are kept in physically secured environments, there is still a chance for an attacker to hijack the secure operations remotely. The security problem arises only if the private key of a dedicated authentication server is compromised. In PKC system, an attacker can create valid credentials by spoofing certificates and getting the secure credentials of a Certificate Authority (CA), and can impersonate any user which trusts the compromised CA by using the certificates. Once this compromise is identified, all of the certificates that are issued by this CA must be revoked recursively. If the private key of the top level authority is compromised, then all of the certificates of the system should be revoked. The revoked certificates can create a security bottleneck for the NFV system.

As described above, security is critical for NFV system, since network services and data protection are especially important for trusted third party are unsure, whether they want to move the secure credentials and network functionalities into the cloud. Without the obligatory assurances, trusted third party vendor will be reluctant to adopt NFV based services. Therefore, NFV should provide additional security and protection for the sensitive data and their services.

So the proposed framework should address the security the problems such as sensitive data leakage and managing the trust of trusted third party by the same way it should construct security system which supports authenticity, integrity and non-repudiation by minimizing the risks and managing the trust among the trusted third party servers. NFV systems have wide varieties of threat which might be known or unknown. Threats like networking attack from a VM like address resolution protocol (ARP) poisoning, man in the middle, confidentiality and integrity of traffic, authentication and authorization (including during initial deployment), authentication and authorization of API (Application Programming Interface), misconfiguration, stealing a VM, patching, application layer attack, authorization and authentication of configuration, unauthorized storage access, duplicating VM image encryption and tampering encrypted sensitive information.

NFV system contain security credentials, such as secret keys, passwords, etc that can be used to gain access by compromising the networks/servers or can be used to perform distributed attack such as DHCP (Dynamic Host Configuration Protocol) attacks, DDoS (Distributed Denial of Service) attacks, etc. These secrets keys could also be used to decrypt sensitive information, steal a digital identity, or forge signatures.

To solve all these problems, demarcation technology needs to be designed to provide security-hardened authentication functions. Tamper-resistant storage of credentials, such as encryption keys and other passwords, is among the key features required for implementing such functionality.

In view of the foregoing, the present invention has been made. Namely, it is an object of the present invention to provide a network function virtualization system which can contribute to improve the function for protecting sensitive authentication data.

According to a first aspect, there is provided a network function virtualization system comprising: a request receiving unit that receives a request to a certificate of at least one of data exchanging parties. The network function virtualization system further comprises a private key generator that generates a first private key information using a second private key information stored in a hardware-based isolated secure execution environment, in response to the request. The network function virtualization system further comprises a public key extractor that extracts a public key information of (corresponding to) the first private key information. The network function virtualization system further comprises a public key information storage unit that stores the public key information. The network function virtualization system further comprises a verifying unit that is accessible from the request receiving unit and the verifying unit verifies the certificate using the public key information corresponding to the certificate as depicted in FIG. 1.

According to a second aspect of the present invention, there is provided an verifying method in a network function virtualization system, comprising: receiving a request to a certificate of at least one of data exchanging parties; generating a first private key information using a second private key information stored in a hardware-based isolated secure execution environment, in response to the request; extracting a public key information of (corresponding to) the first private key information; and verifying the certificate or request using the public key information corresponding to the certificate by a verifying unit that is accessible from an application programming interface.

According to the present invention, a network function virtualization system having improved performance for protecting sensitive authentication data is provided.

BRIEF DESCRIPTION OF THE DRAWINGS

FIG. 1 is a block diagram showing a configuration of an exemplary embodiment according to the present invention.

FIG. 2 is a block diagram showing an architecture of proposed method.

FIG. 3 is a block diagram showing a private key hierarchy of a network function virtualization system of an exemplary embodiment 1 according to the present invention.

FIG. 4 is a diagram showing a representative function of Software Private Key Generator used in the present disclosure.

FIG. 5 is a diagram showing a representative function of Rekeying-Software Private Key Generator used in the present disclosure.

FIG. 6 is a diagram showing a NFV system of the present disclosure for Verifying the PKI certificate.

FIG. 7 is a diagram showing a behavior of NFV system of the present disclosure which verifies the PKI certificate.

FIG. 8 is a diagram showing a message format sent between HISEE and NFV for verifying the PKI certificate.

FIG. 9 is a diagram showing a message format sent between HISEE and NFV for verifying the PKI certificate.

FIG. 10 is a diagram showing a NFV system of the present disclosure for Verifying the Onboarding VNF packages.

FIG. 11 is a diagram showing a behavior of NFV system of the present disclosure which verifies the Onboarding VNF packages.

FIG. 12 is a diagram showing a message format sent between HISEE and NFV for verifying the Onboarding VNF packages.

FIG. 13 is a diagram showing a message format sent between HISEE and NFV for verifying the Onboarding VNF packages.

FIG. 14 is a diagram showing a NFV system of the present disclosure for Verifying the trusted third party private key for authentication.

FIG. 15 is a diagram showing a behavior of NFV system of the present disclosure which verifies the trusted third party private key for authentication.

FIG. 16 is a diagram showing a message format sent between HISEE and NFV for verifying the trusted third party private key for authentication.

FIG. 17 is a diagram showing a message format sent between HISEE and NFV for verifying the trusted third party private key for authentication.

FIG. 18 is a diagram showing a NFV system of the present disclosure for Verifying the Scaling triggered request by VNF.

FIG. 19 is a diagram showing a behavior of NFV system of the present disclosure which verifies the Scaling triggered request by VNF.

FIG. 20 is a diagram showing a message format sent between HISEE and NFV for verifying the Scaling triggered request by VNF.

FIG. 21 is a diagram showing a message format sent between HISEE and NFV for verifying the Scaling triggered request by VNF.

FIG. 22 is a diagram showing a NFV system of the present disclosure for Verifying the Scaling triggered request by EM/VNF.

FIG. 23 is a diagram showing a behavior of NFV system of the present disclosure which verifies the Scaling triggered request by EM/VNF.

FIG. 24 is a diagram showing a message format sent between HISEE and NFV for verifying the Scaling triggered request by EM/VNF.

FIG. 25 is a diagram showing a message format sent between HISEE and NFV for verifying the Scaling triggered request by EM/VNF.

FIG. 26 is a diagram showing a NFV system of the present disclosure for Verifying the Scaling triggered request by OSS/BSS.

FIG. 27 is a diagram showing a behavior of NFV system of the present disclosure which verifies the Scaling triggered request by OSS/BSS.

FIG. 28 is a diagram showing a message format sent between HISEE and NFV for verifying the Scaling triggered request by OSS/BSS.

FIG. 29 is a diagram showing a message format sent between HISEE and NFV for verifying the Scaling triggered request by OSS/BSS.

FIG. 30 is a diagram showing a NFV system of the present disclosure for Verifying the VNFC failure request.

FIG. 31 is a diagram showing a behavior of NFV system of the present disclosure which verifies the VNFC failure request.

FIG. 32 is a diagram showing a message format sent between HISEE and NFV for verifying the VNFC failure request.

FIG. 33 is a diagram showing a message format sent between HISEE and NFV for verifying the VNFC failure request.

FIG. 34 is a diagram showing a NFV system of the present disclosure for verifying and storing the VNFC failure service state in secure storage.

FIG. 35 is a diagram showing a behavior of NFV system of the present disclosure which verifies and stores the VNFC failure service state in secure storage.

FIG. 36 is a diagram showing a message format sent between HISEE and NFV for verifying and storing the VNFC failure service state in secure storage.

FIG. 37 is a diagram showing a message format sent between HISEE and NFV for verifying and storing the VNFC failure service state in secure storage.

FIG. 38 is a diagram for explaining problems in an existing solution.

PREFERRED MODES

Initially, an overview of an exemplary embodiment of the present invention will be described with reference to the drawings. It is noted that symbols for referencing the drawings are entered in the overview merely as examples to assist in understanding and are not intended to limit the present invention to the mode illustrated.

Referring to FIG. 1, an exemplary embodiment of the present invention may be implemented by a network function virtualization system 10 which is made up by a request receiving unit 11, a private key generator 15, a public key extractor 14, a public key information storage unit 13 and a verifying unit 12.

Specifically, the request receiving unit 11 receives a request to certificate of at least one of data exchanging parties. The private key generator 15 generates a first private key information using a second private key information stored in the hardware-based isolated secure execution environment, in response to a request. The public key extractor 14 extracts a public key information of the first private key information. The public key information is stored in the public key information storage unit 13. The authentication unit 12 is accessible from the request receiving unit. And, the authentication unit 12 verifies the certificate using the public key information corresponds to the certificate.

With the above mentioned configuration, it is possible to protect NFV system against many of attacks that threaten security.

Next, various embodiments of the present invention will be described more in detail below with reference to the drawings. The following disclosure features PKC authentication as an assumption, a highly secure and efficient method of protecting the secure credentials such as passwords, private keys, cryptographic certificates, tokens, etc., in HISEE. Using this disclosure, NFV components can authenticate each other, ensuring secure authentication during instantiation, migration, monitoring and hibernation/suspension.

5.1 Motivations:

Securely storing and accessing the private credentials such as private key, passwords, tokens, etc in HISEE.

Private keys are used for encryption or signature verification i.e. whether the stored images are encrypted and integrity protected; during PKI certificates validation;

The present disclosure discloses the scheme to protect the secure credentials and how they are accessed securely between NFV components and HISEE.

5.2 Assumptions:

HISEE is trusted environment for NFV system which is a combination of both software and hardware components.

Private key ($P_S$) is a software based private key which are subset of original hardware based private keys ($P_H$)

Original hardware based private keys ($P_H$) are hardware based embedded private keys Private keys ($P_S$) are stored in secure storage and Original hardware private keys ($P_H$) are kept in secured environment (i.e. HISEE).

PKC—Public Key Cryptography (e.g.: assumptions are made based on RSA Algorithm)

Private keys will be shared to the trusted third party/vendors/subscriber in a secure channel Certification generation is done offline.

As preferred embodiments of the present disclosure, following usecases are described.

Usecase 1: Securely accessing the private key ($P_S$) from HISEE for Verifying the PKI certificate Usecase 2: Secure accessing the private key ($P_S$) from HISEE for VNF Package verification Usecase 3: Verifying the Trusted third party private key ($P_S$) for authentication Usecase 4: Verifying the Scaling triggered request by VNFM Usecase 5: Verifying the Scaling triggered request by EM/VNF Usecase 6: Verifying the Scaling triggered request by OSS/BSS Usecase 7: Verifying the VNFC failure request Usecase 8: Verifying the VNFC failure service state which has to be stored in secure storage Authentication mechanism Trusted third party can be authenticated by NFV platform using HISEE for accessing the sensitive data by using only public components and modulus function of private key ($P_S$).

Message sequence for various purposes

Deriving the public components and modulus function from the provided private key ($P_S$).

Handshake between both Normal Environment Engine-HISEE and Secured Environment Engine-HISEE.

Message format

Accessing the sensitive data in HISEE

How the authentication request forwarded from normal

Key generation

NFV based system attributes (Unique identifier like IMEI (International Mobile Equipment Identifier) number, location coordination's, or any index value, etc), none of the hardware private key (PH) are used for generating the private key ($P_S$).

The generated software private key ($P_S$) for authentication or encryption mechanism required for NFV system.

5.4 Benefits:

By using this idea one can protect the secure credentials from the non-secured environment by any mean of authentication process in NFV system. Even during the worst case scenarios, if the public components and modulo functions of private key ($P_S$) are compromised, that will not impact the whole private key credentials.

6. Architecture of Proposed Method

FIG. 2 is a block diagram showing an architecture of proposed method. As shown in FIG. 2, normal environment engine 130 and HISEE architecture 140 can be disposed in the virtualization layer in the NFVI (Network function virtualization infrastructure) of NFV platform. Each component will be described in the following explanation of usecases.

7. Private Key Hierarchy

FIG. 3 is a diagram showing private key hierarchy. As shown in FIG. 3, private keys ($p_{sn}$) are generated from an original private key stored in the hardware-based isolated secure execution environment. Each private key ($p_{sn}$) is used for certificate management, encrypting images and so on.

7.1 Software Private Key Generator (PG)

FIG. 4 is a diagram showing a representative function of Software Private Key Generator. As shown in FIG. 4, Software Private Key Generator takes as input such as trusted third party private key ($P_{TTP}$), Nonce of the hardware private key ($P_H$), a set of unique attributes (Unique identifier like IMEI number, location coordination's, or any index value, etc), in the authority's zone ($A_1, A_2, A_3, \ldots, A_N$) and outputs the software private key ($P_S$). We will assume that the set of attributes in the authority's zone has been verified (such as uniqueness, level of security strength, etc.) before this algorithm is run. Software private key generator ($P_G$) is a secure randomized based algorithm which must be run by authorization party. The authorization party can select and use their private key generator based on their security requirements. The secure credentials will be distributed to the dependent services providers through a secure channel.

7.2 RekeyingSoftware Private Key Generator ($P_{RK}$):

FIG. 5 is a diagram showing a representative function of Rekeying Software Private Key Generator. As shown in FIG. 5, Rekeying Software Private KeyGenerator ($P_{RK}$) takes as input such as third party private key, nonce of the hardware private key ($P_H$), a set of attributes in the authority's zone ($A_1, A_2, A_3, \ldots, A_N$), monotonic counter value ($C_M$) and old software private key ($OP_S$). It results the new software private key ($NP_S$). The new updated secure credentials will be distributed to the dependent services providers through a secure channel.

It should be noted the following matters. HISEE has built in monotonic counter whose value is non-volatile and monotonic can be increased by 1, but it can never be reverted to an older value, even if one has complete physical access to the entire machine hosting and invoking the HISEE.

8. Proposed Protocol for NFV Usecase

8.1 Verifying the PKI Certificate in NFV System

8.1.1 Block Diagram for Verifying the PKI Certificate

FIG. 6 is a diagram showing a NFV system of the present disclosure for Verifying the PKI certificate.

8.1.2 Description

As shown in FIG. 6, NFV system 100 allows various virtualisation function services like instantiation, hibernation/suspension, retirement and migration. These services require the transfer of critical information/data request among the NFV nodes. Therefore, it is extremely necessary to provide the security services like authentication. PKI certificate systems are used to provide authentication service for NFV system 100. The objective of the usecase is to verify the authenticity of PKI certificate request for accessing the NFV system by any internal or external user. Any malicious user may use duplicate or malicious the certificate which may lead to compromise of NFV system. So the external or internal users have to prove the VIM (Virtualized Infrastructure Manager) 112 that they are not the malicious one when they are requesting to access NFV system. One can easily achieve authenticity using the proposed mechanism of the present disclosure. Below we have provided the step by step authentication procedure for verifying PKI certificate by any internal or external users.

8.1.3 Procedure:

As shown in FIG. 6, the NFV system of the present disclosure verifies the PKI certificate as follows.

- Step 1: External user or any cloud server 210 requests NFV system 100 to access the PKI certificate for any kind of data exchange between the NFV system and external system.
- Step 2: NFVO (NFV orchestrator) 111 validates the authenticity of the external user using following proposed protocol. Namely, NFVO 111 corresponds to the request receiving unit 11 in FIG. 1.
- Step 3: NFVO 111 forwards the request to VIM 112 for validating the authenticity.
- Step 4: VIM 112 validates the authentication request.
- Step 5: VIM 112 forwards the request to NFVI 113 for signature verification.
- Step 6: NFVI 113 locate the signature and API's of private key ($P_S$) in the secure storage for validating the authentication request.
- Step 7: API's of the private key ($P_S$) forward the call to the normal environment engine (NEE) 130 to get the public exponent and modulus value of the private key ($P_S$).
- Step 8: The normal environment engine 130 will map the request to secured environment engine (SEE) 141 which is located in secured environment.
- Step 9: The secured environment engine (SEE) 141 read the private key ($P_S$) which is located in HISEE 140 and extract the public exponent and modulus value of the private key ($P_S$). Namely, secured environment engine (SEE) 141 corresponds to the public key extractor on 14 in FIG. 1.
- Step 10: The PKC container 142 stores the extracted public exponent and modulus value of the private key ($P_S$) for a particular session and erases it permanently.
- Step 11: The PKC container 142 forwards the credentials such as public exponent and modulus value to the secured environment engine (SEE) 140. Namely, PKC container 142 corresponds to the public key information storage unit 13 in FIG. 1.
- Step 12: Secured environment engine (SEE) 141 formulate the public exponent and modulus value for the given authentication request and forward the credentials to normal Environment engine (NEE) 130.
- Step 13: Normal Environment engine 130 responses the API's call with public exponent and modulus value of the private key ($P_S$).
- Step 14: If validation was successful with the extracted public exponent and modulus value of the private key ($P_S$), secure storage 120 will notify authentication was successful to the NFVI 113. Namely, secure storage 120 corresponds to the verifying unit 12 in FIG. 1.
- Step 15: NFVI 113 will forward the authentication status to VIM 112.
- Step 16: If authentication was successful, and VIMs acknowledge the success PKI certification authentication to NFVO 111, otherwise reject the request.
- Step 17: NFVO 111 notifies the NFV system.

8.1.4 Usecase for Securing Accessing the Private Key ($P_S$) from HISEE for Verifying the PKI Certificate FIG. 7 is a diagram showing a behavior of NFV system of the present disclosure which verifies the PKI certificate.

8.1.5 Message format Securing Accessing the Private Key ($P_S$) from HISEE for Verifying the PKI Certificate FIGS. 8 and 9 are diagrams showing a message format sent between HISEE and NFV for verifying the PKI certificate.

8.1.6 Operations of Secure Accessing the Private Key from HISEE for VNF Package Verification As shown in FIGS. 8 and 9, HISEE and NFV send following messages.

1) Validate_PKI_Certificate, NFVO→VIM

This message defines the validation request for PKI certificate verification by NFVO 111 to VIM 112.

2) Validate_PKI_Certificate, VIM→NFVI

This message defines the validation request for PKI certificate verification by VIM 112 to NFVI 113.

3) Validate_PKI_Certificate, Read_PrivateKeyAPI, NFVI→SS

This message defines the validation of PKI certificate by calling the API's of the private key ($P_S$) and locate the credentials in the secure storage (SS).

4) Get_Public_Exponent, Get_Modulus Value, SS→NEE

This message defines the forwarding of API call to request the public exponent and modulus value of the private key from SS 120 to NEE 130.

5) Get_Public_Exponent, Get_ModulusValue, NEE→SEE

This message defines the forwarding of API call to request the public exponent and modulus value of the private key from NEE 130 to SEE 141.

6) Extract_Public_Exponent, Extract_ModulusValue, SEE→HISEE(SW)

This message defines of extracting the public exponent and modulus value of the private key from SEE 141 to Private key 143 ($P_S$).

7) Store_Public_Exponent, Store_ModulusValue, PKCCont←HISEE(SW)

This message defines of storing the public exponent and modulus value of the private key in PKC container 142.

8) Send_Public_Exponent, Send_ModulusValue, SEE←PKCCont

This message defines of forwarding the public exponent and modulus value of the private key from PKC Container 142 to the secured environment engine SEE 141.

9) Formulate_Public_Exponent, Formulate_ModulusValue, SEE

This message defines of formulating the public exponent and modulus value of the private key in secured environment engine SEE 141.

10) Send_Public_Exponent, Send_ModulusValue, NEE←SEE

This message defines of forwarding the public exponent and modulus value of the private key from secured environment engine (SEE) 141 to the normal Environment engine (NEE) 130.

11) Send_Public_Exponent, Send_ModulusValue, SS←NEE

This message defines of forwarding the public exponent and modulus value of the private key from normal Environment engine (NEE) to the secure storage (SS) 120.

12) Validate_PKI_Certificate(Public_Exponent, ModulusValue), SS

This message defines the validation of PKI certificate using public exponent and modulus value of the private key ($P_S$) to achieve authenticity.

13) Notify_Validation_Status(Success/Failure), NFVI←SS

This message defines the validation status of the PKI certificate from secure storage (SS) 120 to NFVI 113.

14) Notify_Validation_Status(Success/Failure), VIM←NFVI

This message defines the validation status of the PKI certificate from NFVI 113 to VIM 112.

15) Notify_Validation_Status(Success/Failure), NFVO←VIM

This message defines the validation status of the PKI certificate from VIM 112 to NFVO 111.

8.2 Verifying the Onboarding VNF Packages 8.2.1 Block Diagram for Verifying the Onboarding VNF Packages FIG. 10 is a diagram showing a NFV system of the present disclosure for Verifying the Onboarding VNF packages.

8.2.2 Description:

As shown in FIG. 10, VNF Package on-boarding refers to the process of submitting VNF Package to the NFVO 111 to be included in the catalogue (CatLog) 160. Figure depicts the block diagram for verifying the On-boarding VNF packages. The objective of the usecase is to verify the authenticity and integrity of on-board VNF package request by any internal or external user. Any malicious user may request on-board VNF package without the necessity, it may lead to compromise of NFV system 100*a*. So the external or internal users have to prove VIM 112 that they are not malicious one when they are requesting for on-board VNF package. One can easily achieve authenticity and integrity using the proposed mechanism of present disclosure. Below we have provided the step by step authentication procedure for verifying On-boarding VNF packages by any internal or external user.

8.2.3 Procedure:

As shown in FIG. 10, the NFV system of the present disclosure verifies the On-boarding VNF packages as follows.

Step 1: VNF package is submitted to NFVO 111 for on-boarding VNFD using the operation On-board VNF Package of the VNF Package Management interface.

Step 2: NFVO 111 validate the authenticity of the external user using following proposed protocol.

Step 3: NFVO 111 forward the request to VIM 112 for validating the authenticity of the external user.

Step 4: VIM 112 validates the authentication request.

Step 5: VIM 112 forwards the request to NFVI 113 for signature

Step 6: NFVI 113 locate the VNF certificate and API's of private key ($P_S$) in the secure storage 120 for validating the authentication request.

Step 7: API's of the private key ($P_S$) forward the call to the normal Environment engine (NEE) 130 to get the public exponent and modulus value of the private key ($P_S$).

Step 8: The normal Environment engine (NEE) 130 will map the request to secured environment engine (SEE) 141 which is located in secured environment.

Step 9: The secured environment engine (SEE) 141 read the private key ($P_S$) which is located in HISEE 140 and extract the public exponent and modulus value of the private key ($P_S$).

Step 10: The PKC container 142 stores the extracted public exponent and modulus value of the private key ($P_S$) for a particular session and erases it permanently.

Step 11: The PKC container 142 forwards the credentials such as public exponent and modulus value to the secured environment engine (SEE) 141.

Step 12: Secured environment engine (SEE) 141 formulated the public exponent and modulus value for the given authentication request and forward the credentials to normal Environment engine (NEE) 130.

Step 13: Normal Environment engine (NEE) 130 responses the API's call with public exponent and modulus value of the private key ($P_S$).

Step 14: If validation was successful with the extracted public exponent and modulus value of the private key ($P_S$), secure storage 120 will notify authentication was successful to the NFVI 113.

Step 15: NFVI 113 will forward the authentication status to VIM 112.

Step 16: If authentication was successful, VIMs 112 acknowledge the successful uploading of the image to NFVO 111, otherwise reject the request.

Step 17: NFVO 111 notifies the catalogue.

Step 18: NFVO 111 acknowledges the VNF Package on-boarding to the sender.

8.2.4 Usecase for Secure Accessing the Private Key from HISEE for VNF Package Verification FIG. 11 is a diagram showing a behavior of NFV system of the present disclosure which verifies the On-boarding VNF packages.

8.2.5 Message Format: Secure Accessing the Private Key from HISEE for VNF Package Verification FIGS. 12 and 13 are diagrams showing a message format sent between HISEE and NFV for verifying the On-boarding VNF packages.

8.2.6 Operations of Secure Accessing the Private Key from HISEE for VNF Package Verification As shown in FIGS. 12 and 13, HISEE and NFV send following messages.

1) Validate_QueryImageRequest, NFVO→VIM

This message defines the validation request for Image verification by NFVO 111 to VIM 112.

2) Validate_QueryImageRequest, VIM→NFVI

This message defines the validation request for Image verification by VIM 112 to NFVI 113.

3) Validate_VNF_Certificate, Read_PrivateKeyAPI, NFVI→SS

This message defines the validation of VNF certificate by calling the API's of the private key ($P_S$) and locate the credentials in the secure storage (SS) 120.

4) Get_Public_Exponent, Get_ModulusValue, SS→NEE

This message defines the forwarding of API call to request the public exponent and modulus value of the private key from SS 120 to NEE 130.

5) Get_Public_Exponent, Get_ModulusValue, NEE→SEE

This message defines the forwarding of API call to request the public exponent and modulus value of the private key from NEE 130 to SEE 141.

6) Extract_Public_Exponent, Extract_ModulusValue, SEE→HISEE(SW)

This message defines of extracting the public exponent and modulus value of the private key from SEE 141 to Private key 143 ($P_S$).

7) Store_Public_Exponent, Store_ModulusValue, PKCCont←HISEE(SW)

This message defines of storing the public exponent and modulus value of the private key in PKC container 142.

8) Send_Public_Exponent, Send_ModulusValue, SEE←PKCCont

This message defines of forwarding the public exponent and modulus value of the private key from PKC Container 142 to the secured environment engine SEE 141.

9) Formulate_Public_Exponent, Formulate_ModulusValue, SEE

This message defines of formulating the public exponent and modulus value of the private key in secured environment engine (SEE) 141.

10) Send_Public_Exponent, Send_ModulusValue, NEE←SEE

This message defines of forwarding the public exponent and modulus value of the private key from secured environment engine (SEE) 141 to the normal Environment engine (NEE) 130.

11) Send_Public_Exponent, Send_ModulusValue, SS←NEE

This message defines of forwarding the public exponent and modulus value of the private key from normal Environment engine (NEE) 130 to the secure storage (SS) 120.

12) Validate_VNF_Certificate(Public_Exponent, ModulusValue), SS

This message defines the validation of VNF certificate using public exponent and modulus value of the private key ($P_S$) to achieve authenticity.

13) Notify_Validation_Status(Success/Failure), NFVI←SS

This message defines the validation status of the VNF certificate from secure storage (SS) 120 to NFVI 113.

14) Notify_Validation_Status(Success/Failure), VIM←NFVI

This message defines the validation status of the VNF certificate from NFVI 113 to VIM 112.

15) Notify_Validation_Status(Success/Failure), NFVO←VIM

This message defines the validation status of the VNF certificate from VIM 112 to NFVO 111.

8.3 Verification of Trusted Third Party Private Key for Authentication 8.3.1 Block Diagram for Verifying the Trusted Third Party Private Key for Authentication FIG. 14 is a diagram showing a NFV system of the present disclosure for Verifying the Trusted third party private key for authentication.

8.3.2 Description

As shown in FIG. 14, the reliability on some dedicated third party servers which are used for accessing the data and services with the NFV system 100b. For accessing the data and services, it requires trusted third party credentials like private key, tokens etc. If these credentials are compromised it may cause security problems, because the unavailability of such requires trusted third party servers causes the whole system blocked, and compromise of them means the compromise of all of the users who trust the servers. Therefore, it is extremely necessary to provide the security for trusted third party credentials. The objective of the usecase is to verify the authenticity of accessing the trusted third party credentials which are stored in NFV system 100b. Any malicious user may use duplicate or tamper the trusted third party credentials which may lead to compromise of NFV system 100b. So the external or internal users have to prove the VIM 112 that they are not malicious one when they are requesting to access trusted third party credentials in the NFV system 100b. One can easily achieve authenticity using the proposed mechanism of present disclosure. Below we have provided the step by step authentication procedure for verifying the TTP private key for authentication by any internal/external user.

8.3.3 Procedure:

As shown in FIG. 14, the NFV system of the present disclosure verifies the Trusted third party private key for authentication as follows.

Step 1: External user or any cloud server request NFV system 100b to access the Trusted third party private key 121 for any kind of data exchange between the NFV system 100b and external system such as cloud server 210

Step 2: NFVO 111 validate the authenticity of the external user using following proposed protocol.

Step 3: NFVO 111 forward the request to VIM 112 for validating the authenticity.

Step 4: VIM 112 validates the authentication request.

Step 5: VIM 112 forwards the request to NFVI 113 for signature verification.

Step 6: NFVI 113 locate the signature and API's of private key ($P_S$) in the secure storage 120 for validating the authentication request.

Step 7: API's of the private key ($P_S$) forward the call to the normal Environment engine (NEE) 130 to get the public exponent and modulus value of the private key ($P_S$).

Step 8: The normal Environment engine 130 will map the request to secured environment engine (SEE) 141 which is located in secured environment.

Step 9: The secured environment engine (SEE) 141 read the private key ($P_S$) which is located in HISEE 140 and extract the public exponent and modulus value of the private key ($P_S$).

Step 10: The PKC container 142 stores the extracted public exponent and modulus value of the private key ($P_S$) for a particular session and erases it permanently.

Step 11: The PKC container 142 forwards the credentials such as public exponent and modulus value to the secured environment engine (SEE) 141.

Step 12: Secured environment engine (SEE) 141 formulated the public exponent and modulus value for the given authentication request and forward the credentials to normal Environment engine (NEE) 130.

Step 13: Normal Environment engine (NEE) 130 responses the API's call with public exponent and modulus value of private key ($P_S$).

Step 14: If validation was successful with the extracted public exponent and modulus value of the private key ($P_S$), secure storage 120 will notify authentication was successful to the NFVI 113.

Step 15: NFVI 113 will forward the authentication status to VIM 112.

Step 16: If authentication was successful, and VIM 112 acknowledges the success of accessing the trusted third party private key authentication to NFVO 111, otherwise reject the request.

Step 17: NFVO 111 notifies the NFV system.

8.3.4 Usecase for Verifying the Trusted Third Party Private Key for Authentication FIG. 15 is a diagram showing a behavior of NFV system of the present disclosure which verifies the Trusted third party private key for authentication.

8.3.5 Message Format for Verifying the Trusted Third Party Private Key for Authentication FIGS. 16 and 17 are diagrams showing a message format sent between HISEE and NFV for verifying the Trusted third party private key for authentication.

8.3.6 Operations of Secure Accessing the Private Key from HISEE for VNF Package Verification As shown in FIGS. 16 and 17, HISEE and NFV send following messages.

1) Validate_TTP_CertificateRequest, NFVO→VIM

This message defines the validation request for TTP certificate verification by NFVO 111 to VIM 112.

2) Validate_TTP_CertificateRequest, VIM→NFVI

This message defines the validation request for TTP certificate verification by VIM 112 to NFVI 113.

3) Validate_TTP_Certificate, Read_PrivateKeyAPI, NFVI→SS

This message defines the validation of TTP certificate by calling the API's of the private key ($P_S$) and locate the credentials in the secure storage (SS) 120a.

4) Get_Public_Exponent, Get_ModulusValue, SS→NEE

This message defines the forwarding of API call to request the public exponent and modulus value of the private key from SS 120a to NEE 130.

5) Get_Public_Exponent, Get_ModulusValue, NEE→SEE

This message defines the forwarding of API call to request the public exponent and modulus value of the private key from NEE 130 to SEE 141.

6) Extract_Public_Exponent, Extract_ModulusValue, SEE→ HISEE(SW)

This message defines of extracting the public exponent and modulus value of the private key from SEE 141 to Private key 143 ($P_S$).

7) Store_Public_Exponent, Store ModulusValue, PKCCont←HISEE(SW)

This message defines of storing the public exponent and modulus value of the private key in PKC container 142.

8) Send_Public_Exponent, Send_ModulusValue, SEE←PKCCont

This message defines of forwarding the public exponent and modulus value of the private key from PKC Container 142 to the secured environment engine (SEE) 141.

9) Formulate_Public_Exponent, Formulate_ModulusValue, SEE

This message defines of formulating the public exponent and modulus value of the private key in secured environment engine (SEE) 141.

10) Send_Public_Exponent, Send_ModulusValue, NEE← SEE This message defines of forwarding the public exponent and modulus value of the private key secured environment engine (SEE) 141 to the normal environment engine (NEE) 130.

11) Send_Public_Exponent, Send_ModulusValue, SS←NEE

This message defines of forwarding the public exponent and modulus value of the private key from normal Environment engine (NEE) 130 to the secure storage (SS) 120a.

12) Validate_TTP_Certificate(Public_Exponent, ModulusValue), SS

This message defines the validation of TTP certificate using public exponent and modulus value of the private key ($P_S$) to achieve authenticity.

13) Notify_Validation_Status(Success/Failure), NFVI←SS

This message defines the validation status of the TTP certificate from secure storage (SS) 120a to NFVI 113.

14) Notify_Validation_Status(Success/Failure), VIM← NFVI

This message defines the validation status of the TTP certificate from NFVI 113 to VIM 112.

15) Notify_Validation_Status(Success/Failure), NFVO← VIM

This message defines the validation status of the TTP certificate from VIM 112 to NFVO 111.

8.4 Verifying the Scaling Triggered Request by VNFM 8.4.1 Block Diagram for Verifying the Scaling Triggered Request by VNF FIG. 18 is a diagram showing a NFV system of the present disclosure for Verifying the Scaling triggered request by VNF.

8.4.2 Description

FIG. 18 depict the block diagram for verifying the scaling triggered request by VNFM's. The objective of the usecase is to verify the authenticity of scaling trigger request by the VNFM's. Any malicious user may raise the scale trigger without the necessity. So the VNFM's have to prove VIM 112 that they are not malicious one when they are requesting for scaling trigger. One can easily achieve authenticity using our proposed mechanism. Below we have provided the step by step authentication procedure for verifying the scaling trigger request raised by VNFM's.

8.4.3 Procedure:

As shown in FIG. 18, the NFV system of the present disclosure verifies the Scaling triggered request by VNF 100c as follows.

Step 1: VNFM's 118 detects a capacity shortage while measuring the performance of EM/VNF's.

Step 2: VNFM 118 and NFVO 111 coordinate each other for scaling decision.

Step 3: VNFM 118 forward the request to VIM 112 for validating the authenticity.

Step 4: VIM 112 validates the authentication request.

Step 5: VIM 112 forwards the request to NFVI 113 for signature verification.

Step 6: NFVI 113 locate the signature and API's of private key ($P_S$) in the secure storage 120 for validating the authentication request.

Step 7: API's of the private key ($P_S$) forward the call to the normal environment engine (NEE) 130 to get the public exponent and modulus value of the private key ($P_S$).

Step 8: The normal Environment engine 130 will map the request to secured environment engine (SEE) 141 which is located in secured environment.

Step 9: The secured environment engine (SEE) 141 read the private key ($P_S$) which is located in HISEE 140 and extract the public exponent and modulus value of the private key ($P_S$).

Step 10: The PKC container 142 stores the extracted public exponent and modulus value of the private key ($P_S$) for a particular session and erases it permanently.

Step 11: The PKC container 142 forwards the credentials such as public exponent and modulus value to the secured environment engine (SEE) 141.

Step 12: Secured environment engine (SEE) 141 formulated the public exponent and modulus value for the given authentication request and forward the credentials to normal Environment engine (NEE) 130.

Step 13: Normal Environment engine (NEE) 130 responses the API's call with public exponent and modulus value of the private key ($P_S$).

Step 14: If validation was successful with the extracted public exponent and modulus value of the private key ($P_S$), secure storage 120 will notify authentication was successful to the NFVI 113.

Step 15: NFVI 113 will forward the authentication status to VIM 112.

Step 16: If authentication was successful, VIM 112 acknowledges the status of allocating resources to the VNFM 118, otherwise reject the request.

Step 17: VNFM 118 will coordinate with NFVO 111 and allocate resource for scaling.

Step 18: VNFM 118 updates the status to EM/VNF's if the authentication request was successful.

Step 19: NFVO 111 now is aware that the configuration of the newly scaled VNF is instantiated.

Step 20: NFVO 111 maps the VNF to the proper VIM 112 and resource pool.

8.4.4 Usecase for Verifying the Scaling Triggered Request by VNFM

FIG. 19 is a diagram showing a behavior of NFV system of the present disclosure which verifies the Scaling triggered request by VNFM.

8.4.5 Message Format for Verifying the Scaling Triggered Request by VNFM

FIGS. 20 and 21 are diagrams showing a message format sent between HISEE and NFV for verifying the Scaling triggered request by VNFM.

8.4.6 Operations for Verifying the Scaling Triggered Request by VNFM

As shown in FIGS. 20 and 21, HISEE and NFV send following messages.

1) Detect_Error_ResourceAllocation, VNFM

This message defines the detection of error during resource allocation in VNFM 118.

2) Cordinates_Scaling_Descison, VNFM↔NFVO

This message defines the coordination of scaling decision between VNFM 118 and NFVO 111.

3) ScalingRequest, VNFM→VIM

This message defines the scaling request of resource allocation from VNFM 118 to VIM 112.

4) Validate_ScalingTriggerRequest, VIM

This message defines the validation of scaling request by the VIM 112.

5) Validate_ScalingTriggerRequest, VIM→NFVI

This message defines the validation of scaling request from VIM 112 to NFVI 113.

6) Validate_VNFM_Certificate, Read_PrivateKeyAPI, NFVI→SS

This message defines the validation of VNFM certificate by calling the API's of the private key ($P_S$) and locate the credentials in the secure storage (SS) 120.

7) Get_Public_Exponent, Get_ModulusValue, SS→NEE

This message defines the forwarding of API call to request the public exponent and modulus value of the private key from SS 120 to NEE 130.

8) Get_Public_Exponent, Get_ModulusValue, NEE→SEE

This message defines the forwarding of API call to request the public exponent and modulus value of the private key from NEE 130 to SEE 141.

9) Extract_Public_Exponent, Extract_ModulusValue, SEE→HISEE(SW)

This message defines of extracting the public exponent and modulus value of the private key from SEE 141 to Private key 143 ($P_S$).

10) Store_Public_Exponent, Store_ModulusValue, PKCCont←HISEE(SW)

This message defines of storing the public exponent and modulus value of the private key in PKC container 142.

11) Send_Public_Exponent, Send_ModulusValue, SEE←PKCCont

This message defines of forwarding the public exponent and modulus value of the private key from PKC Container 142 to the secured environment engine SEE 141.

12) Formulate_Public_Exponent, Formulate_ModulusValue, SEE

This message defines of formulating the public exponent and modulus value of the private key in secured environment engine SEE 141.

13) Send_Public_Exponent, Send_ModulusValue, NEE←SEE

This message defines of forwarding the public exponent and modulus value of the private key from secured environment engine (SEE) 141 to the normal Environment engine (NEE) 130.

14) Send_Public_Exponent, Send_ModulusValue, SS←NEE

This message defines of forwarding the public exponent and modulus value of the private key from normal Environment engine (NEE) 130 to the secure storage (SS) 120.

15) Validate_VNFM_Certificate(Public_Exponent, ModulusValue), SS

This message defines the validation of VNFM certificate using public exponent and modulus value of the private key ($P_S$) to achieve authenticity.

16) Notify_Validation_Status(Success/Failure), NFVI←SS,

This message defines the validation status of the VNFM certificate from secure storage (SS) 120 to NFVI 113.

17) Notify_Validation_Status(Success/Failure), VIM←NFVI

This message defines the validation status of the VNFM certificate from NFVI 113 to VIM 112.

18) Check_Validation_Status, Perform_Scaling_Configuration, VIM

This message defines the check the validation status of VNFM 118 certificate and perform scaling configuration for VNFM 118 if the validation status was success otherwise reject the request.

19) Ack_NewResourceAllocation, VNFM←VIM

This message defines the acknowledgement status of the new resource allocation for VNFM 118 from VIM 112.

20) Update_Scaling_Configuration, VNFM

This message defines the updation of scaling configuration by VNFM 118.

21) Update_Scaling_Configuration_Status, VNFM→NFVO

This message defines the update of scaling configuration status to NFVO 111 by VNFM 118.

8.5 Verifying the Scaling Triggered Request by EM/VNF 8.5.1 Block Diagram for Verifying the Scaling Triggered Request by EM/VNF FIG. 22 is a diagram showing a NFV system of the present disclosure for Verifying the Scaling triggered request by EM (Element Manager)/VNF.

8.5.2 Description

FIG. 22 depicts the block diagram for verifying the scaling triggered request by EM/VNF's. The objective of the usecase is to verify the authenticity of scaling trigger request by the EM/VNF's. Any malicious user may raise the scale trigger without the necessity. So the EM/VNF's have to prove VIM 112 that they are not malicious one when they are requesting for scaling trigger. One can easily achieve authenticity using proposed mechanism of present disclosure. Below we have provided the step by step authentication procedure for verifying the scaling trigger request raised by EM/VNF's.

8.5.3 Procedure:

As shown in FIG. 22, the NFV system of the present disclosure verifies the Scaling triggered request by EM/VNF as follows.

Step 1: EM/VNF 119 may send automatic or manual scaling request to NFVO 111 to expand the capacity of a VNF. Automatic scaling request are raised for some certain conditions like traffic overloaded or network resource failures.

Step 2: NFVO 111 and VNFM 118 coordinate each other for scaling decision.

Step 3: NFVO 111 forward the request to VIM 112 for validating the authenticity.

Step 4: VIM 112 validates the authentication request.

Step 5: VIM 112 forwards the request to NFVI 113 for signature verification.

Step 6: NFVI 113 locate the signature and API's of private key ($P_S$) in the secure storage 120 for validating the authentication request.

Step 7: API's of the private key ($P_S$) forward the call to the normal Environment engine (NEE) 130 to get the public exponent and modulus value of the private key ($P_S$).

Step 8: The normal Environment engine 130 will map the request to secured environment engine (SEE) 141 which is located in secured environment.

Step 9: The secured environment engine (SEE) 141 read the private key ($P_S$) which is located in HISEE 140 and extract the public exponent and modulus value of the private key ($P_S$).

Step 10: The PKC container 142 stores the extracted public exponent and modulus value of the private key ($P_S$) for a particular session and erases it permanently.

Step 11: The PKC container 142 forwards the credentials such as public exponent and modulus value to the secured environment engine (SEE) 141.

Step 12: Secured environment engine (SEE) 141 formulated the public exponent and modulus value for the given authentication request and forward the credentials to normal Environment engine (NEE) 130.

Step 13: Normal Environment engine (NEE) 130 responses the API's call with public exponent and modulus value of the private key ($P_S$).

Step 14: If validation was successful with the extracted public exponent and modulus value of the private key ($P_S$), secure storage 120 will notify authentication was successful to the NFVI 113.

Step 15: NFVI 113 will forward the authentication status to VIM 112.

Step 16: If authentication was successful, VIM 112 acknowledges the status of allocating resources to the VNFM 118, otherwise reject the request.

Step 17: VNFM 118 will coordinate with NFVO 111 and allocate resource for scaling.

Step 18: VNFM 118 reports the success of scaling to EM/VNF's 119 if the authentication request was successful.

Step 19: NFVO 111 now is aware that the configuration of the newly scaled VNF is instantiated.

Step 20: NFVO 111 maps the VNF to the proper VIM 112 and resource pool.

8.5.4 Usecase for Verifying the Scaling Triggered Request by EM/VNF

FIG. 23 is a diagram showing a behavior of NFV system of the present disclosure which verifies the Scaling triggered request by EM/VNF.

8.5.5 Message Format for Verifying the Scaling Triggered Request by EM/VNF

FIGS. 24 and 25 are diagrams showing a message format sent between HISEE and NFV for verifying the Scaling triggered request by EM/VNF.

8.5.6 Operations for Verifying the Scaling Triggered Request by EM/VNF

As shown in FIGS. 24 and 25, HISEE and NFV send following messages.

1) ScalingRequest, EM/VNF→VNFM

This message defines the detection of error during resource allocation in EM/VNF 119 and request VNFM 118 for scaling resource allocation.

2) Cordinates_Scaling_Descison, VNFM↔NFVO

This message defines the coordination of scaling decision between VNFM 118 and NFVO 111.3)

3) Validate_ScalingTriggerRequest, VNFM→VIM

This message defines validation of scaling request from VNFM 118 to VIM 112.

4) Validate_ScalingTriggerRequest, VIM

This message defines the validation of scaling request by the VIM 112.

5) ValidateScalingTriggerRequest, VIM→NFVI

This message defines the validation of scaling request from VIM 112 to NFVI 113.

6) Validate_EM/VNF_Certificate, Read_PrivatekeyAPI, NFVI→SS

This message defines the validation of EM/VNF 119 certificate by calling the API's of the private key ($P_S$) and locate the credentials in the secure storage (SS) 120.

7) Get_Public_Exponent, Get_ModulusValue, SS→SEE

This message defines the forwarding of API call to request the public exponent and modulus value of the private key from SS 120 to NEE 130.

8) Get_Public_Exponent, Get_ModulusValue, NEE→SEE

This message defines the forwarding of API call to request the public exponent and modulus value of the private key from NEE 130 to SEE 141.

9) Extract_Public_Exponent, Extract_ModulusValue, SEE→ HISEE(SW)

This message defines of extracting the public exponent and modulus value of the private key from SEE 141 to Private key 143 ($P_S$).

10) Store_Public_Exponent, Store_ModulusValue, PKCCont←HISEE(SW)

This message defines of storing the public exponent and modulus value of the private key in PKC container 142.

11) Send_Public_Exponent, Send_ModulusValue, SEE←PKCCont

This message defines of forwarding the public exponent and modulus value of the private key from PKC Container 142 to the secured environment engine (SEE) 141.

12) Formulate_Public_Exponent, Formulate_ModulusValue, SEE

This message defines of formulating the public exponent and modulus value of the private key in secured environment engine (SEE) 141.

13) Send_Public_Exponent, Send_ModulusValue, NEE←SEE

This message defines of forwarding the public exponent and modulus value of the private key from secured environment engine (SEE) 141 to the normal Environment engine (NEE) 130.

14) Send_Public_Exponent, Send_ModulusValue, SS←NEE

This message defines of forwarding the public exponent and modulus value of the private key from normal Environment engine (NEE) 130 to the secure storage (SS) 120.

15) Validate_EM/VNF_Certificate(Public_Exponent, ModulusValue), SS

This message defines the validation of EM/VNF 119 certificate using public exponent and modulus value of the private key ($P_S$) to achieve authenticity.

16) Notify_Validation_Status(Success/Failure), NFVI←SS,

This message defines the validation status of the EM/VNF 119 certificate from secure storage (SS) 120 to NFVI 113.

17) Notify_Validation_Status(Success/Failure), VIM←NFVI

This message defines the validation status of the EM/VNF 119 certificate from NFVI 113 to VIM 112.

18) Check_Validation_Status, Perform_Scaling_Configuration, VIM

This message defines the check the validation status of EM/VNF 119 certificate and perform scaling configuration for EM/VNF 119 if the validation status was success otherwise reject the request.

19) Ack_NewResourceAllocation, VNFM←VIM

This message defines the acknowledgement status of the new resource allocation for EM/VNF 119 from VIM 112.

20) Notifies_updates, EM/VNF←VNFM

This message defines the updation of scaling configuration from VNFM 118 to EM/VNF 119.

21) Update_Scaling_Configuration, EM/VNF

This message defines the updation of scaling configuration by EM/VNF 119.

22) Update_Scaling_Configuration, VNFM→NFVO

This message defines the update of scaling configuration status to NFVO 111 by VNFM 118.

8.6 Verifying the Scaling Triggered Request by OSS/BSS 8.6.1 Block Diagram for Verifying the Scaling Triggered Request by OSS/BSS FIG. 26 is a diagram showing a NFV system of the present disclosure for Verifying the Scaling triggered request by OSS/BSS Operation Support System/Business Support System).

8.6.2 Description

FIG. 26 depicts the block diagram for verifying the scaling triggered request by OSS/BSS's. The objective of the usecase is to verify the authenticity of scaling trigger request by the OSS/BSS's. Any malicious user may raise the scale trigger without the necessity. So the OSS/BSS's have to prove VIM 112 that they are not malicious one when they are requesting for scaling trigger. One can easily achieve authenticity using the proposed mechanism of present disclosure. Below we have provided the step by step authentication procedure for verifying the scaling trigger request raised by OSS/BSS's.

8.6.3 Procedure:

As shown in FIG. 26, the NFV system of the present disclosure verifies the Scaling triggered request by OSS/BSS as follows.

Step 1: OSS/BSS 122 sends scaling request to NFVO 111 for some management demand.

Step 2: NFVO 111 and VNFM 118 coordinate each other for scaling decision.

Step 3: NFVO 111 forward the request to VIM 112 for validating the authenticity.

Step 4: VIM 112 validates the authentication request.

Step 5: VIM 112 forwards the request to NFVI 113 for signature verification.

Step 6: NFVI 113 locate the signature and API's of private key ($P_S$) in the secure storage 120 for validating the authentication request.

Step 7: API's of the private key ($P_S$) forward the call to the normal Environment engine (NEE) 130 to get the public exponent and modulus value of the private key ($P_S$).

Step 8: The normal Environment engine 130 will map the request to secured environment engine (SEE) 141 which is located in secured environment.

Step 9: The secured environment engine (SEE) 141 read the private key ($P_S$) which is located in HISEE 140 and extract the public exponent and modulus value of the private key ($P_S$).

Step 10: The PKC container 142 stores the extracted public exponent and modulus value of the private key ($P_S$) for a particular session and erases it permanently.

Step 11: The PKC container 142 forwards the credentials such as public exponent and modulus value to the secured environment engine (SEE) 141.

Step 12: Secured environment engine (SEE) 141 formulated the public exponent and modulus value for the given authentication request and forward the credentials to normal Environment engine (NEE) 130.

Step 13: Normal Environment engine (NEE) 130 responses the API's call with public exponent and modulus value of the private key ($P_S$).

Step 14: If validation was successful with the extracted public exponent and modulus value of the private key ($P_S$), secure storage 120 will notify authentication was successful to the NFVI 113.

Step 15: NFVI 113 will forward the authentication status to VIM 112.

Step 16: If authentication was successful, VIM 112 acknowledges the status of allocating resources to the NFVO 111 and VNFM 118, otherwise reject the request.

Step 17: NFVO 111 will coordinate with VNFM 118 and allocate resource for scaling.

Step 18: NFVO 111 reports the success of scaling to OSS/BSS 122 if the authentication request was successful.

8.6.4 Usecase for Verifying the Scaling Triggered Request by OSS/BSS

FIG. 27 is a diagram showing a behavior of NFV system of the present disclosure which verifies the Scaling triggered request by OSS/BSS.

8.6.5 Message Format for Verifying the Scaling Triggered Request by OSS/BSS

FIGS. 28 and 29 are diagrams showing a message format sent between HISEE and NFV for verifying the Scaling triggered request by OSS/BSS.

8.6.6 Operations for Verifying the Scaling Triggered Request by OSS/BSS

As shown in FIGS. 28 and 29, HISEE and NFV send following messages.

1) ScalingRequest, OSS/BSS→NFVO

This message defines the detection of error during resource allocation in OSS/BSS 122 and request NFVO 111 for scaling resource allocation.

2) Validate_ScalingTriggerRequest, NFVO→VIM

This message defines the scaling request of resource allocation from NFVO 111 to VIM 112.

3) Validate_ScalingTriggerRequest, VIM

This message defines the validation of scaling request by the VIM 112.

4) Validate_ScalingTriggerRequest, VIM→NFVI

This message defines the validation of scaling request from VIM 112 to NFVI 113.

5) Validate_EM/VNF_Certificate, Read_PrivatekeyAPI, NFVI→SS

This message defines the validation of OSS/BSS 122 certificate by calling the API's of the private key ($P_S$) and locate the credentials in the secure storage (SS) 120.

6) Get_Public_Exponent, Get_ModulusValue, SS→SEE

This message defines the forwarding of API call to request the public exponent and modulus value of the private key from SS 120 to NEE 130.

7) Get_Public_Exponent, Get_ModulusValue, NEE→SEE

This message defines the forwarding of API call to request the public exponent and modulus value of the private key from NEE 130 to SEE 141.

8) Extract_Public_Exponent, Extract_ModulusValue, SEE→ HISEE(SW)

This message defines of extracting the public exponent and modulus value of the private key from SEE 141 to Private key 143 ($P_S$).

9) Store_Public_Exponent, Store_ModulusValue, PKCCont←HISEE(SW)

This message defines of storing the public exponent and modulus value of the private key in PKC container 142.

10) Send_Public_Exponent, Send_ModulusValue, SEE←PKCCont

This message defines of forwarding the public exponent and modulus value of the private key from PKC Container 142 to the secured environment engine (SEE) 141.

11) Formulate_Public_Exponent, Formulate_ModulusValue, SEE

This message defines of formulating the public exponent and modulus value of the private key in secured environment engine (SEE) 141.

12) Send_Public_Exponent, Send_ModulusValue, NEE←SEE

This message defines of forwarding the public exponent and modulus value of the private key from secured environment engine (SEE) 141 to the normal Environment engine (NEE) 130.

13) Send_Public_Exponent, Send_ModulusValue, SS←NEE

This message defines of forwarding the public exponent and modulus value of the private key from normal Environment engine (NEE) 130 to the secure storage (SS) 120.

14) Validate_OSS/BSS_Certificate(Public_Exponent, ModulusValue), SS

This message defines the validation of OSS/BSS 122 certificate using public exponent and modulus value of the private key ($P_S$) to achieve authenticity.

15) Notify_Validation_Status(Success/Failure), NFVI←SS,

This message defines the validation status of the OSS/BSS 122 certificate from secure storage (SS) 120 to NFVI 113.

16) Notify_Validation_Status(Success/Failure), VIM←NFVI

This message defines the validation status of the OSS/BSS 122 certificate from NFVI 113 to VIM 112.

17) Check_Validation_Status, Perform_Scaling_Configuration, VIM

This message defines the check the validation status of OSS/BSS 122 certificate and perform scaling configuration for OSS/BSS 122 if the validation status was success otherwise reject the request.

18) Ack_NewResourceAllocation, NFVO←VIM

This message defines the acknowledgement status of the new resource allocation for OSS/BSS 122 from VIM 112 to NFVO 111.

19) Cordinates_Scaling_Descison, VNFM↔NFVO

This message defines the coordination of scaling decision between VNFM 118 and NFVO 111.

20) Update_Scaling_Configuration, OSS/BSS←NFVO

This message defines the update of scaling configuration status to OSS/BSS 122 by NFVO 111.

8.7 Verifying the VNFC Failure Request
8.7.1 Block Diagram for Verifying the VNFC Failure Request FIG. 30 is a diagram showing a NFV system of the present disclosure for Verifying the VNFC (Virtualized Network Function Component) failure request.

8.7.2 Descriptions

FIG. 30 depicts the block diagram for verifying the failure request by VNFC's. The objective of the usecase is to verify the authenticity of failure request by the VNFC's. Any malicious user may raise the failure request without the necessity and to avoid duplicity of the raised request. So the VNFC's have to prove VIM 112 that they are not malicious one when they are requesting for any failure request. One can easily achieve authenticity using the proposed mechanism of present disclosure. Below we have provided the step by step authentication procedure for verifying the failure request by VNFC's.

8.7.3 Procedure

As shown in FIG. 30, the NFV system of the present disclosure verifies the VNFC failure request as follows.

Step 1: Due to traffic overloaded or network resource failures, VNFC system may get interrupted or failed at any time. If VNFC1 1231 got failed, it will report to the nearby VNFC2 1232 regarding the VNFC1 status.

Step 2: VNFC2 1232 will send failure request to VNFM 118 in behalf of VNFC1 1231 regarding the failure status.

Step 3: NFVO (not shown in FIG. 30) and VNFM 118 coordinate each other for decision making.

Step 4: VNFM 118 forward the request to VIM 112 for validating the authenticity of the failure request by VNFC2 1232.

Step 5: VIM 112 validates the authentication request.

Step 6: VIM 112 forwards the request to NFVI 113 for signature verification.

Step 7: NFVI 113 locate the signature and API's of private key ($P_S$) in the secure storage 120 for validating the authentication request.

Step 8: API's of the private key ($P_S$) forward the call to the normal Environment engine (NEE) 130 to get the public exponent and modulus value of the private key ($P_S$).

Step 9: The normal Environment engine (NEE) 130 will map the request to secured environment engine (SEE) 141 which is located in secured environment.

Step 10: The secured environment engine (SEE) 141 read the private key ($P_S$) which is located in HISEE 140 and extract the public exponent and modulus value of the private key ($P_S$).

Step 11: The PKC container 142 stores the extracted public exponent and modulus value of the private key ($P_S$) for a particular session and erases it permanently.

Step 12: The PKC container 142 forwards the credentials such as public exponent and modulus value to the secured environment engine (SEE) 141.

Step 13: Secured environment engine (SEE) 141 formulated the public exponent and modulus value for the given authentication request and forward the credentials to normal Environment engine (NEE) 130.

Step 14: Normal Environment engine (NEE) 130 responses the API's call with public exponent and modulus value of the private key ($P_S$).

Step 15: If validation was successful with the extracted public exponent and modulus value of the private key ($P_S$), secure storage 120 will notify authentication was successful to the NFVI 113.

Step 16: NFVI 113 will forward the authentication status to VIM 112.

Step 17: If authentication was successful, VIM 112 acknowledges the status of allocating new VNFC 1231, 1232 resources to the VNFM 118, otherwise reject the request.

Step 18: VNFM 118 will coordinate with NFVO and updates the status of newly allocate resource for recovery.

Step 19: VNFM 118 reports the success status of newly allocate resource to VNFC1 1231 and VNFC2 1232 if the authentication request was successful.

Step 20: NFVO now is aware that the configuration of the newly scaled VNFC1 1231 instantiated.

Step 21: NFVO maps the VNFC 1231, 1232 to the proper VIM 112 and resource pool.

8.7.4 Usecase for Verifying the VNFC Failure Request

FIG. 31 is a diagram showing a behavior of NFV system of the present disclosure which verifies the VNFC failure request.

8.7.5 Message Format for Verifying the VNFC Failure Request

FIGS. 32 and 33 are diagrams showing a message format sent between HISEE and NFV for verifying the VNFC failure request.

8.7.6 Operations for Verifying the VNFC Failure Request

As shown in FIGS. 32 and 33, HISEE and NFV send following messages.

1) Notify_FailureStatus, VNFC1↔VNFC2

This message defines the detection of failure status in VNFC1 1231 and notifies the status to the nearby VNFC's (VNFC2 1232).

2) Notify_FailureStatus, VNFC2→VNFM

This message defines the notification of failure status from VNFC2 1232 to VNFM 118.

3) Validate_FailureStatusRequest, VNFM→VIM

This message defines the request for validation of failure status from VNFM 118 to VIM 112.

4) Validate_FailureStatusRequest, VIM

This message defines the validation of failure status request by the VIM 112.

5) Validate_FailureStatusRequest, VIM→NFVI

This message defines the forward validation of failure status request from VIM 112 to NFVI 113.

6) Validate_VNFC1_Certificate, Read_PrivatekeyAPI, NFVI→SS

This message defines the validation of VNFC1 1231 certificate by calling the API's of the private key ($P_S$) and locate the credentials in the secure storage (SS) 120.

7) Get_Public_Exponent, Get_ModulusValue, SS→SEE

This message defines the forwarding of API call to request the public exponent and modulus value of the private key from SS 120 to NEE 130.

8) Get_Public_Exponent, Get_ModulusValue, NEE→SEE

This message defines the forwarding of API call to request the public exponent and modulus value of the private key from NEE 130 to SEE 141.

9) Extract_Public_Exponent, Extract_ModulusValue, SEE→ HISEE(SW)

This message defines of extracting the public exponent and modulus value of the private key from SEE 141 to Private key 143 ($P_S$).

10) Store_Public_Exponent, Store_ModulusValue, PKCCont←HISEE(SW)

This message defines of storing the public exponent and modulus value of the private key in PKC container 142.

11) Send_Public_Exponent, Send_ModulusValue, SEE←PKCCont

This message defines of forwarding the public exponent and modulus value of the private key from PKC Container 142 to the secured environment engine (SEE) 141.

12) Formulate_Public_Exponent, Formulate_ModulusValue, SEE

This message defines of formulating the public exponent and modulus value of the private key in secured environment engine (SEE) 141.

13) Send_Public_Exponent, Send_ModulusValue, NEE←SEE

This message defines of forwarding the public exponent and modulus value of the private key from secured environment engine (SEE) 141 to the normal Environment engine (NEE) 130.

14) Send_Public_Exponent, Send_ModulusValue, SS←NEE

This message defines of forwarding the public exponent and modulus value of the private key from normal Environment engine (NEE) 130 to the secure storage (SS) 120.

15) Validate_VNFC1_Certificate(Public_Exponent, Modulus Value), SS

This message defines the validation of VNFC1 1231 certificate using public exponent and modulus value of the private key ($P_S$) to achieve authenticity.

16) Notify_Validation_Status(Success/Failure), NFVI←SS,

This message defines the validation status of the VNFC1 certificate from secure storage (SS) 120 to NFVI 113.

17) Notify_Validation_Status(Success/Failure), VIM←NFVI

This message defines the validation status of the VNFC1 certificate from NFVI 113 to VIM 112.

18) Check_Validation_Status, Perform_Scaling_Configuration, VIM

This message defines the check the validation status of VNFC1 certificate and perform scaling configuration for VNFC1 1231 if the validation status was success otherwise reject the request.

19) Ack_NewResourceAllocation, VNFM←VIM

This message defines the acknowledgement status of the new resource allocation for VNFC1 1231 from VIM 112 to VNFM 118.

20) UpdateStatus_NewVNFCAllocation, VNFM

This message defines the updates of new resource allocation i.e., new VNFC in VNFM 118.

21) Notify_NewVNFCAllocation, VNFC2←VNFM

This message defines the notification of the new resource allocation i.e., VNFC for VNFC1 1231 from VNFM to VNFC2 1232.

22) Notify_NewVNFCAllocation, VNFC1←VNFM

This message defines the notification of the new resource allocation i.e., VNFC for VNFC1 1231 from VNFM to VNFC1 1231.

8.8 Verifying and Storing the VNFC Failure Service State in Secure Storage 8.8.1 Block Diagram for Verifying and Storing the VNFC Failure Service State in Secure Storage FIG. 34 is a diagram showing a NFV system of the present disclosure for verifying and storing the VNFC failure service state in secure storage.

8.8.2 Description

FIG. 34 depicts the block diagram for verifying the VNFC failure service state which has to be stored in secure storage. The objective of the usecase is to verify the authenticity of failure service state which has to be stored in secure storage. Any malicious user may raise the malicious data to be stored in secure storage. So the VNFC's have to prove VIM 112 that they are not malicious one when they are requesting for storing the failure service state in secure storage. One can easily achieve authenticity using the proposed mechanism of present disclosure. Below we have provided the step by step authentication procedure for verifying the verifying the VNFC failure service state which has to be stored in secure storage.

8.8.3 Procedure:

As shown in FIG. 34, the NFV system of the present disclosure verifies and stores the VNFC failure service state in secure storage as follows.

Step 1: Due to traffic overloaded or network resource failures, VNFC 1233 system may get interrupted or failed at any time.

Step 2: VNFC 1233 simultaneously send failure request to VNFM 118 and NF (Network Function) 124 regarding the failure status to avoid network interruption service.

Step 3: VNFC 1233 request VNFM 118 to store the NF status in SS 120.

Step 4: VNFM 118 request VIM 112 to validate the VNFC 1233 failure status & request VIM 112 to store the NF status in SS 120.

Step 5: VIM 112 validates the authentication request.

Step 6: VIM 112 forwards the request to NFVI 113 for signature verification.

Step 7: NFVI 113 locate the signature and API's of private key ($P_S$) in the secure storage 120 for validating the authentication request.

Step 8: API's of the private key ($P_S$) forward the call to the normal Environment engine (NEE) 130 to get the public exponent and modulus value of the private key ($P_S$).

Step 9: The normal Environment (NEE) 130 engine will map the request to secured environment engine (SEE) 141 which is located in secured environment.

Step 10: The secured environment engine (SEE) 141 read the private key ($P_S$) which is located in HISEE 140 and extract the public exponent and modulus value of the private key ($P_S$)

Step 11: The PKC container 142 stores the extracted public exponent and modulus value of the private key ($P_S$) for a particular session and erases it permanently.

Step 12: The PKC container 142 forwards the credentials such as public exponent and modulus value to the secured environment engine (SEE) 141.

Step 13: Secured environment engine (SEE) 141 formulated the public exponent and modulus value for the given authentication request and forward the credentials to normal Environment engine (NEE) 130.

Step 14: Normal Environment engine (NEE) 130 responses the API's call with public exponent and modulus value of the private key ($P_S$).

Step 15: If validation was successful with the extracted public exponent and modulus value of the private key ($P_S$), secure storage 120 will notify authentication was successful to the NFVI 113.

Step 16: NFVI 113 will forward the authentication status to VIM 112.

Step 17: If authentication was successful, VIM 112 acknowledges the status and allows VNF to store the failure service state of NF 124 in secure storage 120, otherwise reject the request.

Step 18: VNFM 118 will coordinate with NFVO (not shown in FIG. 34) and updates the status of newly allocate resource for recovery.

Step 19: VNFM 118 reports the success status of newly allocate resource to VNFC 1233 and NF 124 if the authentication request was successful.

Step 20: NFVO now is aware that the configuration of the newly scaled VNFC 1233 is instantiated.

Step 21: NFVO maps the VNFC 1233 to the proper VIM 112 and resource pool.

8.8.4 Usecase for Verifying and Storing the VNFC Failure Service State in Secure Storage FIG. 35 is a diagram showing a behavior of NFV system of the present disclosure which verifies and stores the VNFC failure service state in secure storage.

8.8.5 Message Format for Verifying and Storing the VNFC Failure service state in secure storage FIGS. 36 and 37 are diagrams showing a message format sent between HISEE and NFV for verifying and storing the VNFC failure service state in secure storage.

8.8.6 Operations for Verifying and Storing the VNFC Failure Service State in Secure Storage As shown in FIGS. 36 and 37, HISEE and NFV send following messages.

1) Notify_VNFCFailureStatus, VNF←VNFC

This message defines the detection of failure status in VNFC 1233 and notifies the status to the NF 124.

2) Notify_VNFCFailureStatus, Request_Store_NFStatus, VNFC→VNFM

This message defines the notification to the VNFC failure status to the VNFM 118 and request VNFM 118 to store the network function (NF status) in secure storage (SS) 120.

3) Validate_FailureStatusRequest, VNFM→VIM

This message defines the request for validation of VNFC failure status from VNFM 118 to VIM 112.

4) Validate_FailureStatusRequest, VIM

This message defines the validation of VNFC failure status failure status request in VIM 112.

5) ValidateFailureStatusRequest, VIM→NFVI

This message defines the forward validation of failure status request from VIM 112 to NFVI 113.

6) Validate_VNFC_Certificate, Read_PrivatekeyAPI, NFVI→SS

This message defines the validation of VNFC 1233 certificate by calling the API's of the private key ($P_S$) and locate the credentials in the secure storage (SS) 120.

7) Get_Public_Exponent, Get_ModulusValue, SS→SEE

This message defines the forwarding of API call to request the public exponent and modulus value of the private key from SS 120 to NEE 130.

8) Get_Public_Exponent, Get_ModulusValue, NEE→SEE

This message defines the forwarding of API call to request the public exponent and modulus value of the private key from NEE 130 to SEE 141.

9) Extract_Public_Exponent, Extract_ModulusValue, SEE→ HISEE(SW)

This message defines of extracting the public exponent and modulus value of the private key from SEE 141 to Private key 143 ($P_S$).

10) Store_Public_Exponent, Store_ModulusValue, PKCCont←HISEE(SW)

This message defines of storing the public exponent and modulus value of the private key in PKC container 142.

11) Send_Public_Exponent, Send_ModulusValue, SEE←PKCCont

This message defines of forwarding the public exponent and modulus value of the private key from PKC Container 142 to the secured environment engine (SEE) 141.

12) Formulate_Public_Exponent, Formulate_ModulusValue, SEE

This message defines of formulating the public exponent and modulus value of the private key in secured environment engine (SEE) 141.

13) Send_Public_Exponent, Send_ModulusValue, NEE←SEE

This message defines of forwarding the public exponent and modulus value of the private key from secured environment engine (SEE) 141 to the normal Environment engine (NEE) 130.

14) Send_Public_Exponent, Send_ModulusValue, SS←NEE

This message defines of forwarding the public exponent and modulus value of the private key from normal Environment engine (NEE) 130 to the secure storage (SS) 120.

15) Validate_VNFC_Certificate(Public_Exponent, ModulusValue), SS

This message defines the validation of VNFC certificate using public exponent and modulus value of the private key ($P_S$) to achieve authenticity.

16) Notify_Validation_Status(Success/Failure), NFVI←SS,

This message defines the validation status of the VNFC certificate from secure storage (SS) 120 to NFVI 113.

17) Notify_Validation_Status(Success/Failure), VIM←NFVI

This message defines the validation status of the VNFC certificate from NFVI 113 to VIM 112.

18) Check_Validation_Status, Perform_Scaling_Configuration, VIM

This message defines the check the validation status of VNFC certificate and perform scaling configuration for VNFC 1233 if the validation status was success, otherwise it will reject the request.

19) Request_Store_NFStatus, VIM→NFVI

This message defines of storing the NF status in secure storage (SS) 120 from VIM 112 to NFVI 113.

20) Request_Store_NFStatus, NFVI→SS

This message defines of storing the NF status in secure storage (SS) 120 by NFVI 113.

21) Ack_Store_NFStatus, NFVI←SS

This message defines the acknowledgement of storing the NF status in secure storage (SS) 120.

22) Ack_Store_NFStatus, VIM←NFVI

This message defines the acknowledgement of storing the NF status in secure storage (SS) 120 by NFVI 113 to VIM 112.

23) Ack_NewVNFCAllocation, Ack_Store_NFStatus, VNFM←VIM

This message defines the acknowledgement of storing the NF status in secure storage (SS) 120 and new VNFC allocation by VIM 112 to VNFM 118.

24) Update_NewVNFCAllocation, Update_Store_NFStatus, VNFM

This message defines the updation of storing the NF status in secure storage (SS) 120 and new VNFC allocation by VNFM 118.

25) Notify_NewVNFCAllocation, Notify_Store_NFStatus, VNFC←VNFM

This message defines the notification of storing the NF status in secure storage (SS) 120 and new VNFC allocation by VNFM 118 to VNFC 1233.

26) Notify_Store_NFStatus, VNF←VNFC

This message defines the notification of storing the NF status in secure storage (SS) 120 and by VNFC 1233 to VNF.

As described above usecases, the proposed method is a scheme that enables the authentication of a HISEE and also achieving the privacy for the trusted third party servers or vendor by not revealing their identity. HISEE can prove and validate the trusted third party that it is a trusted system without revealing its identity. In the proposed scheme, private key ($P_S$) of HISEE can be accessed using the proposed scheme using unique identifier of the NFV secure credentials. The proposed method not only secures the trusted third party keys from malicious user in the case of a host compromise, but also restricts access to secure key credentials by admin domains. The use of the proposed method will solves many of the potential attacks such as insider attacks, brute force attack, implementation failure attack, algorithmic attack like secret key tampering, duplicating the security credentials.

The proposed scheme improvises security strength and offers additional trust properties for the trusted third party system. With this proposed method, trusted third party credentials in NFV system will have secured private memory that they can use to store data and proprietary sensitive credentials. The proposed framework also offers security for critical components in NFV system by implementing authentication mechanism, which acts as an additional security zone for secure credentials.

While the preferred exemplary embodiment of the present invention has been described, it is to be understood that the present invention is not limited to the exemplary embodiment above and that further modifications, replacements, and adjustments may be added without departing from the basic technical concept of the present invention. For example, the NFV system 100 and 100a to 100g in the usecases above may be implemented as a dedicated server.

Finally, the following summarizes the preferred exemplary embodiments of the present invention.

FIRST EXEMPLARY EMBODIMENT (See the network function virtualization system in a first aspect above)

SECOND EXEMPLARY EMBODIMENT

The network function virtualization system according to the first exemplary embodiment wherein
the private key generator that re-generates a first private key information using a second private key information stored in the hardware-based isolated secure execution environment when the predetermined condition is satisfied.

THIRD EXEMPLARY EMBODIMENT

The network function virtualization system according to the first or second exemplary embodiment wherein
the private key generator that generates a first private key using the second private key, trusted third party's private key and the unique attributes.

FOURTH EXEMPLARY EMBODIMENT

The network function virtualization system according to one of the first to third exemplary embodiments wherein the private key generator is selected and used by the user based on the security requirement.

FIFTH EXEMPLARY EMBODIMENT

The network function virtualization system according to one of the first to fourth exemplary embodiments wherein the second private key information is distributed to service providers through a secure channel.

SIXTH EXEMPLARY EMBODIMENT

The network function virtualization system according to one of the first to fifth exemplary embodiments wherein the network function virtualization system verifies at least one of the PKI certificate, VNF Package and the Trusted third party private key for authentication.

SEVENTH EXEMPLARY EMBODIMENT

The network function virtualization system according to one of the first to sixth exemplary embodiments wherein the network function virtualization system verifies the scaling triggered request from the component of network function virtualization system.

EIGHTH EXEMPLARY EMBODIMENT

The network function virtualization system according to one of the first to seventh exemplary embodiments wherein the network function virtualization system verifies the VNFC failure request or VNFC failure service state.

NINTH EXEMPLARY EMBODIMENT (See the verifying method in a second aspect above)

TENTH EXEMPLARY EMBODIMENT

The network function virtualization system can be expressed as follows.

The network function virtualization comprising: a NFVO/MANO that receives a request to certificate of at least one of data exchanging parties; a HISEE architecture that generates a first private key information using a second private key information stored in the hardware-based isolated secure execution environment, in response to a request from NFVO/MANO. The HISEE architecture extracts and stores a public key information of the first private key information. The network function virtualization system further comprising a secure storage that is accessible from the request receiving unit. And the secure storage verifies the certificate using the public key information corresponding to the certificate. The communication between the secure storage and secured environment engine in the HISEE is relayed by a normal environment engine.

The disclosure of Patent Literatures and Non Patent Literatures given above is hereby incorporated by reference into this disclosure.

The exemplary embodiments may be changed and adjusted in the scope of the entire disclosure (including claims) of the present invention and based on the basic technological concept. In the scope of the claims of the present invention, various disclosed elements may be combined and selected in a variety of ways. That is, it is to be understood that modifications and changes that may be made by those skilled in the art within the disclosure of the present invention are included.

[Explanation on the Change of the Term in the Standards]

The term "HISEE: Hardware Isolated Secured Execution Environment" was changed to "HMEE: Hardware Mediated Execution Environment" by ETSI (European Telecommunications Standards Institute) in the NFV standards (NFV—SECO 12 V 3.1. 1, Jan. 2017). Accordingly, it is noted that the term "HISEE" used in the present application is to be called as "HMEE" under the new NFV Standards.

REFERENCE SIGNS LIST 10, 100, 100a-100g network function virtualization system
11 Request receiving unit
12 Verifying unit
13 Public key information storage unit
14 Public key extractor
15 Private key generator
110 MANO (Management and Orchestration)
111 NFVO
112 VIM
113 NFVI
118 VNFM
119 EM/VNFN
120 Secure storage
121 TTP Private Key
122 OSS/BSS
1231, 1232, 1233 VNFC
124 NF
130 Normal environment engine (NEE)
140 HISEE
141 Secured environment engine (SEE)
142 PKC container
143 Private Key ($P_S$)
144 Private Key ($P_H$)
200 Cloud
210 Cloud sever

The invention claimed is:

1. A network function virtualization system, comprising:
a memory storing program instructions;
at least one processor configured to execute the program instructions stored in the memory to:
receive a request to a certificate of at least one of data exchanging parties;
generate first private key information using second private key information comprising a Nonce of a second private key stored in a hardware-based isolated secure execution environment, trusted third party private key information, and unique attributes, in response to the request;
extract public key information of the first private key information;
store the public key information in a public key information storage; and
verify the certificate using the public key information corresponding to the certificate,
wherein the unique attributes comprise an International Mobile Equipment Identifier (IMEI) or location coordinates.

2. The network function virtualization system of claim 1, wherein the at least one processor is further configured to:
re-generate the first private key information using the second private key information stored in the hardware-based isolated secure execution environment when a predetermined condition is satisfied.

3. The network function virtualization system of claim 1, wherein the at least one processor is further configured to generate the first private key information using a private key generator that is selected by a user based on a security requirement.

4. The network function virtualization system of claim 1, wherein the second private key information is distributed to service providers through a secure channel.

5. The network function virtualization system of claim 1, wherein the at least one processor is further configured to verify at least one selected from a group consisting of a PKI certificate, VNF Package and trusted third party private key information for authentication.

6. The network function virtualization system of claim 1, wherein the at least one processor is further configured to verify a scaling triggered request from a component of the network function virtualization system.

7. The network function virtualization system of claim 1, wherein the at least one processor is further configured to verify a VNFC failure request or VNFC failure service state.

8. A verifying method in a network function virtualization system, the method comprising:
- receiving a request to a certificate of at least one of data exchanging parties;
- generating first private key information using second private key information comprising a Nonce of a second private key stored in a hardware-based isolated secure execution environment, trusted third party private key information, and unique attributes, in response to the request;
- extracting public key information corresponding to the first private key information; and
- verifying the certificate or the request using the public key information corresponding to the certificate through an application programming interface,
- wherein the unique attributes comprise an International Mobile Equipment Identifier (IMEI) or location coordinates.

* * * * *